(12) United States Patent  
Omiya et al.

(10) Patent No.: US 7,477,308 B2  
(45) Date of Patent: Jan. 13, 2009

(54) DIGITAL CAMERA HAVING COLLAPSABLE LENS BARREL

(75) Inventors: Akio Omiya, Saitama (JP); Yoshihiro Ito, Asaka (JP); Takehiko Senba, Asaka (JP); Hiroshi Endo, Asaka (JP)

(73) Assignees: FUJIFILM Corporation, Tokyo (JP); Fujinon Corporation, Saitama-shi (JP)

( * ) Notice: Subject to any disclaimer, the term of this patent is extended or adjusted under 35 U.S.C. 154(b) by 790 days.

(21) Appl. No.: 10/693,930

(22) Filed: Oct. 28, 2003

(65) Prior Publication Data

US 2004/0179130 A1 Sep. 16, 2004

(30) Foreign Application Priority Data

Mar. 14, 2003 (JP) ............................. 2003-070454  
Mar. 31, 2003 (JP) ............................. 2003-094201

(51) Int. Cl.  
*H04N 5/225* (2006.01)  
*G02B 13/16* (2006.01)

(52) U.S. Cl. ........................................ 348/335; 396/73

(58) Field of Classification Search ................. 348/344, 348/345, 349, 335, 341, 373, 374, 375, 340; 396/341, 350, 75, 343, 73, 270, 814, 824, 396/349, 72; 359/363, 379, 823, 704, 814, 359/824; 358/906  
See application file for complete search history.

(56) References Cited

U.S. PATENT DOCUMENTS 4,937,609 A * 6/1990 Wakabayashi et al. ........ 396/73  
2003/0156832 A1 8/2003 Nomura et al.

FOREIGN PATENT DOCUMENTS

| JP | 05-034769 A | 2/1993 |
|----|-------------|--------|
| JP | 08-304875 A | 11/1996 |
| JP | 09-163240 A | 6/1997 |
| JP | 2001-061165 A | 3/2001 |
| JP | 2003-149723 A | 5/2003 |
| JP | 2003-315861 | 11/2003 |

* cited by examiner

*Primary Examiner*—Lin Ye  
*Assistant Examiner*—Nelson D Hernández Hernández  
(74) *Attorney, Agent, or Firm*—Sughrue Mion, PLLC

(57) ABSTRACT

In a digital camera, a solid state imaging device is used to catch subject light so that an image signal is created. The digital camera contributes to effectively implementing further thinness in such a manner that a part of image taking lenses is saved to a suitable position at the time of the collapse. Both the rear elements lens and the focus lens are revolved between a position on the optical axis and a saving position coming into a hollow portion beside the CCD solid state imaging device, or between the position on the optical axis and a saving position in which the front elements lens, the rear elements lens and focus lens form a line substantially on a plane.

13 Claims, 45 Drawing Sheets

DIGITAL CAMERA HAVING COLLAPSABLE LENS BARREL

BACKGROUND OF THE INVENTION

1. Field of the Invention

The present invention relates to a digital camera in which a solid state imaging device is used to catch subject light so that an image signal is created.

2. Description of the Related Art

Hitherto, such a type of camera that photography is performed on a silver halide film comes into wide use. And recently, in addition to such a type of camera, there rapidly comes into wide use a digital camera in which a subject is image-formed on a solid state imaging device such as a CCD imaging device or a MOS imaging device to create an image signal.

Also in such a digital camera, there is strongly needed a portability as well as a photographic efficiency, and there is performed such a matter that a image taking lens is collapsed and stored in a thin type of body so that photography of a desired angle of view is possible while a focal length is variable, and the camera is convenient to carry about.

There is widely adopted such a type of image taking lens, which is variable in a focal length, comprising three groups of a front elements lens, a rear elements lens, and a focus lens in the named order with respect to the optical axis direction, wherein the focusing is performed by a movement of the focus lens. Usually, a member for light quantity control, such as a shutter or an aperture, is provided between the front lens and the rear lens or the rear lens and the focus lens.

Hitherto, it is attempted to provide thinness of the lens structure by collapsing an image taking lens so as to narrow intervals between the lenses and intervals between the lens and the shutter as far as possible. However, there is a limit to this in connection with providing thinness.

In order to provide further thinness of the lens structure, it is considered that image taking lenses are collapsed in such a manner any group of the image taking lenses is saved so as to be out of an optical axis. However, there are not proposed matters as to what group is saved to where makes it possible to provide further thinness of the lens structure, or what saving mechanism is provided makes it possible to save the image taking lenses to a predetermined position at the time of the collapse and to properly advance the image taking lenses to an optical axis at the time of the extension, with a simple structure.

Hitherto, it is known that in order to alter the focal length, the rear lens is disposed on an optical axis to form a telephoto lens, and the rear lens is out of the optical axis to form a wide-angle lens (cf. Japanese Patent Application Laid Open Gazette TokuKai Hei. 5-34769). However, this proposal is one for simply altering the focal length, and does not contribute to providing thinness of a camera.

As technology related to the present invention, which will be described later, there is known a shutter using an electrooptical element, such as a liquid crystal shutter using liquid crystal (cf. Japanese Patent Application Laid Open Gazette TokuKai Hei. 9-163240, and Japanese Patent Application Laid Open Gazette TokuKai 2001-61165), and a PLZ shutter using a deflection plate (cf. Japanese Patent Application Laid Open Gazette TokuKai Hei. 8-304875).

SUMMARY OF THE INVENTION

In view of the foregoing, it is an object of the present invention to provide a digital camera contributing to effectively implementing thinness in such a manner that a part of image taking lenses is saved to a suitable position at the time of the collapse.

To achieve the above-mentioned objects, the present invention provides a first digital camera that creates an image signal through catching a subject light, the digital camera comprising:

an image taking lens, which is variable in a focal length, comprising three groups of a first lens group, a second lens group, and a third lens group in the named order with respect to an optical axis direction;

a lens barrel that incorporates therein the image taking lens, having in front an aperture through which the image taking lens appears and having in rear an internal space defined by a wall, the lens barrel being free in extension and collapse and performing a focal length control; and a solid state imaging device that receives the subject light formed by the image taking lens to create the image signal, the solid state imaging device being supported by the wall, wherein the lens barrel has:

a second lens group advancing and saving mechanism in which at the time of the collapse of the lens barrel, the second lens group is saved to a second lens group saving position out of an optical axis of the image taking lens, and at the time of the extension of the lens barrel, the second lens group is advanced onto the optical axis of the image taking lens; and a third lens group advancing and saving mechanism in which at the time of the collapse of the lens barrel, the third lens group is saved to a third lens group saving position out of the optical axis of the image taking lens, and at the time of the extension of the lens barrel, the third lens group is advanced onto the optical axis of the image taking lens.

According to the present invention, in a digital camera having the image taking lens comprising three groups of a first lens group, a second lens group, and a third lens group, the second lens group and the third lens group are saved to the second lens group saving position and the third lens group saving position out of the optical axis of the image taking lens. This feature makes it possible to contribute to implementing further thinness at the time of the collapse as compared with the conventional ones.

In the digital camera according to the present invention as mentioned above, it is acceptable that the digital camera further comprises a focusing mechanism wherein a focusing is performed by a movement of the third lens group in the optical axis direction.

In the digital camera according to the present invention as mentioned above, it is preferable that the lens barrel has:

a second lens group guide frame that moves in the optical axis direction in accordance with the extension, the collapse and the focal length control so as to determine a position related to the optical axis direction of the second lens group; and a second lens group holding frame that holds the second lens group and is pivotally supported by the second lens group guide frame, the second lens group holding frame causing the second lens group to revolve on the optical axis of the image taking lens at the time of the extension, and the second lens group holding frame causing the second lens group to revolve on the second lens group saving position at the time of the collapse, and wherein the lens barrel has:

a third lens group guide frame that moves in the optical axis direction in accordance with the extension, the collapse and the focusing so as to determine a position related to the optical axis direction of the third lens group; and a third lens group holding frame that holds the third lens group and is pivotally supported by the third lens group guide frame, the third lens group holding frame causing the third lens group to revolve on the optical axis of the image taking lens at the time of the extension, and the third lens group holding frame causing the third lens group to revolve onto the third lens group saving position at the time of the collapse.

In case of the conventional camera wherein lens groups constituting the image taking lens are simply moved in the optical axis direction, there is each provided a lens frame for determining a position of the associated lens group in the optical axis direction to move the lens frame in the optical axis direction. On the other hand, according to the digital camera of the present invention, of the lens frames, each of the lens frame of the second lens group and the lens frame of the third lens group is divided into the guide frame and the holding frame, and the holding frame is pivotally supported by the guide frame on a rotatably movable basis, and whereby the second lens group held by the second lens group holding frame and the third lens group held by the third lens group holding frame may revolve. Thus, according to the digital camera of the present invention, it is possible with the simple mechanism to save the second lens group and the third lens group to the respective saving positions at the time of the collapse, and to accurately advance the second lens group and the third lens group onto the optical axis at the time of the extension.

In the digital camera according to the present invention as mentioned above, it is acceptable that the second lens group holding frame is enabled in a direction that the second lens group is revolved on the optical axis of the image taking lens, the wall has a revolving affecting section having a geometry projecting into the internal space, the revolving affecting section being in contact with the second lens group holding frame at the time of the collapse to affect revolving of the second lens group holding frame, and
the second lens group holding frame has an affect receiving section that is pushed by the revolving affecting section at the time of the collapse so that the second lens group revolves into the second lens group saving position.

In the digital camera according to the present invention as mentioned above, it is preferable that the second lens group holding frame causes the second lens group to advance onto the optical axis of the image taking lens by affect of the enabling, at the time of the extension, in such a manner that the affect receiving section is separated from the revolving affecting section.

In the digital camera according to the present invention as mentioned above, it is acceptable the revolving affecting section has a taper on the top, and
the affect receiving section causes the second lens group to be saved from the optical axis of the image taking lens to the second lens group saving position through revolving by means of pushing by the taper of the revolving affecting section, at the time of the collapse.

In the digital camera according to the present invention as mentioned above, it is acceptable the third lens group holding frame is enabled in a direction that the third lens group is revolved on the optical axis of the image taking lens,
the wall has a revolving affecting section having a geometry projecting into the internal space, the revolving affecting section being in contact with the third lens group holding frame at the time of the collapse to affect revolving of the third lens group holding frame, and
the third lens group holding frame has an affect receiving section that is pushed by the revolving affecting section at the time of the collapse so that the third lens group revolves into the third lens group saving position.

In the digital camera according to the present invention as mentioned above, it is preferable that the third lens group holding frame causes the third lens group to advance onto the optical axis of the image taking lens by affect of the enabling, at the time of the extension, in such a manner that the affect receiving section is separated from the revolving affecting section.

In the digital camera according to the present invention as mentioned above, it is acceptable that the affect receiving section is an object shaped as a plate moving to the wall side while rotating around the periphery of the revolving affecting section through pushing by the revolving affecting section, at the time of the collapse, the object shaped as a plate being inclined with respect to the optical axis.

In the digital camera according to the present invention as mentioned above, it is acceptable that the revolving affecting section has a taper on the top, and
the affect receiving section causes the third lens group to be saved from the optical axis of the image taking lens to the third lens group saving position through revolving by means of pushing by the taper of the revolving affecting section, at the time of the collapse.

In the digital camera according to the present invention as mentioned above, it is preferable that the solid state imaging device being disposed at a position projecting from the wall to the internal space and being supported by the wall, and
the second lens group holding frame and the third lens group holding frame cause the second lens group and the third lens group to revolve onto the second lens group saving position set up to a hollow portion divided by the solid state imaging device and the wall beside the solid state imaging device and the third lens group saving position, respectively, at the time of the collapse.

In case of a digital camera having a solid state imaging device such as a CCD imaging device, the hollow portion by the side of the solid state imaging device is apt to be a dead space. The first digital camera of the present invention is to effectively utilize the hollow portion. According to the first digital camera of the present invention, the second lens group and the third lens group are saved to the hollow portion and thereby contributing to implementing further thinness of the camera.

In the digital camera according to the present invention as mentioned above, it is preferable that the second lens group holding frame and the third lens group holding frame cause the second lens group and the third lens group to revolve onto the second lens group saving position and the third lens group saving position set up to positions beside the first lens group, respectively, at the time of the collapse, wherein there is defined a plane vertical to the optical axis, which crosses, at the time of the collapse, the first lens group, the second lens group and the third lens group.

According to the preset invention as mentioned above, the second lens group and the third lens group are saved in such a manner that the first lens group, the second lens group and the third lens group form a line substantially on a plane. This feature makes it possible to contribute to implementing further thinness at the time of the collapse.

In the digital camera according to the present invention as mentioned above, it is preferable that the the second lens group holding frame and the third lens group holding frame have their centers of rotatable movement with respect to the second lens group guide frame and the third lens group guide frame at mutually opposite positions with respect to the optical axis.

According to the present invention, the centers of rotatable movement of the second lens group holding frame and the third lens group holding frame with respect to the second lens group guide frame and the third lens group guide frame are set up to mutually opposite positions with respect to the optical axis. This feature makes it possible to revolve the second lens group and the third lens group without any interference therebetween, while contributing to implementing to further thinness.

In the digital camera according to the present invention as mentioned above, it is preferable that the digital camera further comprises a light quantity control member that moves in one united body together with the second lens group in the optical axis direction of the image taking lens stored in the lens barrel to control a light quantity of the subject light passing through the image taking lens, and the second lens group advancing and saving mechanism provides such a performance that at the time of the collapse of the lens barrel, the light quantity control member is saved in one united body together with the second lens group to the rear elements saving position, and at the time of the extension of the lens barrel, the light quantity control member is advanced in one united body together with the second lens group onto the optical axis of the image taking lens.

In the digital camera according to the present invention as mentioned above, it is preferable that the digital camera further comprises a light quantity control member that moves in one united body together with the third lens group in the optical axis direction of the image taking lens stored in the lens barrel to control a light quantity of the subject light passing through the image taking lens, and the third lens group advancing and saving mechanism provides such a performance that at the time of the collapse of the lens barrel, the light quantity control member is saved in one united body together with the third lens group to the third lens group saving position, and at the time of the extension of the lens barrel, the light quantity control member is advanced in one united body together with the third lens group onto the optical axis of the image taking lens.

Here, it is preferable that the light quantity control member consists of an electrooptical element.

Here, it is acceptable that the light quantity control member is an aperture member that controls an aperture caliber to control the subject light passing through the image taking lens. Or alternatively, it is acceptable that the light quantity control member is a shutter member that controls a shutter speed to control the subject light passing through the image taking lens.

Saving of the light quantity control member in united body together with the second lens group or the third lens group at the time of the collapse makes it possible to implement further thinness of the digital camera at the time of the collapse in accordance with the specific structure of the lens barrel including the image taking lens and the light quantity control member.

In the digital camera according to the present invention as mentioned above, it is preferable that the digital camera further comprises first and second light quantity control members that moves in one united body together with the second lens group and the third lens group in the optical axis direction of the image taking lens stored in the lens barrel to control a light quantity of the subject light passing through the image taking lens, respectively, and the second lens group advancing and saving mechanism provides such a performance that at the time of the collapse of the lens barrel, the first light quantity control member is saved in one united body together with the second lens group to the rear elements saving position, and at the time of the extension of the lens barrel, the first light quantity control member is advanced in one united body together with the second lens group onto the optical axis of the image taking lens, and the third lens group advancing and saving mechanism provides such a performance that at the time of the collapse of the lens barrel, the second light quantity control member is saved in one united body together with the third lens group to the third lens group saving position, and at the time of the extension of the lens barrel, the second light quantity control member is advanced in one united body together with the third lens group onto the optical axis of the image taking lens.

In the digital camera according to the present invention as mentioned above, it is preferable that at least one of the first and second light quantity control members consists of an electrooptical element.

In the digital camera according to the present invention as mentioned above, it is acceptable that one and another are an aperture member that controls an aperture caliber to control a light quantity of the subject light passing through the image taking lens, and a shutter member that controls a shutter speed to control a light quantity of the subject light passing through the image taking lens.

To achieve the above-mentioned objects, the present invention provides a second digital camera that creates an image signal through catching a subject light, the digital camera comprising:

an image taking lens, which is variable in a focal length, comprising three groups of a front elements lens, a rear elements lens, and a focus lens in the named order with respect to an optical axis direction, wherein a focusing is performed by a movement of the focus lens;

a lens barrel that incorporates therein the image taking lens, having in front an aperture through which the image taking lens appears and having in rear an internal space defined by a wall, the lens barrel being free in extension and collapse and performing a focal length control; and a solid state imaging device that receives the subject light formed by the image taking lens to create the image signal, the solid state imaging device being supported by the wall, wherein the lens barrel has:

a rear elements lens advancing and saving mechanism in which at the time of the collapse of the lens barrel, the rear elements lens is saved to a rear elements lens saving position out of an optical axis of the image taking lens, and at the time of the extension of the lens barrel, the rear elements lens is advanced onto the optical axis of the image taking lens; and a focus lens advancing and saving mechanism in which at the time of the collapse of the lens barrel, the focus lens is saved to a focus lens saving position out of the optical axis of the image taking lens, and at the time of the extension of the lens barrel, the focus lens is advanced onto the optical axis of the image taking lens.

According to the present invention, in a digital camera having the image taking lens comprising three groups of a front elements lens, a rear elements lens, and a focus lens, the rear elements lens and the focus lens are saved to the rear elements lens saving position and the focus lens saving position out of the optical axis of the image taking lens. This feature makes it possible to contribute to implementing further thinness at the time of the collapse as compared with the conventional ones.

In the digital camera according to the present invention as mentioned above, it is preferable that the lens barrel has:

a rear elements guide frame that moves in the optical axis direction in accordance with the extension, the collapse and the focal length control so as to determine a position related to the optical axis direction of the rear elements lens; and a rear elements holding frame that holds the rear elements lens and is pivotally supported by the rear elements guide frame, the rear elements holding frame causing the rear elements lens to revolve on the optical axis of the image taking lens at the time of the extension, and the rear elements holding frame causing the rear elements lens to revolve on the rear elements lens saving position at the time of the collapse, and wherein the lens barrel has:

a focus lens guide frame that moves in the optical axis direction in accordance with the extension, the collapse and the focusing so as to determine a position related to the optical axis direction of the focus lens; and a focus lens holding frame that holds the focus lens and is pivotally supported by the focus lens guide frame, the focus lens holding frame causing the focus lens to revolve on the optical axis of the image taking lens at the time of the extension, and the focus lens holding frame causing the focus lens to revolve onto the focus lens saving position at the time of the collapse.

In case of the conventional camera wherein lens groups constituting the image taking lens are simply moved in the optical axis direction, there is each provided a lens frame for determining a position of the associated lens group in the optical axis direction to move the lens frame in the optical axis direction. On the other hand, according to the digital camera of the present invention, of the lens frames, each of the lens frame of the rear elements and the lens frame of the focus lens is divided into the guide frame and the holding frame, and the holding frame is pivotally supported by the guide frame on a rotatably movable basis, and whereby the rear elements lens held by the rear elements holding frame and the focus lens held by the focus lens holding frame may revolve. Thus, according to the digital camera of the present invention, it is possible with the simple mechanism to save the rear elements lens and the focus lens to the respective saving positions at the time of the collapse, and to accurately advance the rear elements lens and the focus lens onto the optical axis at the time of the extension.

In the digital camera according to the present invention as mentioned above, it is preferable that the solid state imaging device being disposed at a position projecting from the wall to the internal space and being supported by the wall, and the rear elements holding frame and the focus lens holding frame cause the rear elements lens and the focus lens to revolve onto the rear elements lens saving position set up to a hollow portion divided by the solid state imaging device and the wall beside the solid state imaging device and the focus lens saving position, respectively, at the time of the collapse.

In case of a digital camera having a solid state imaging device such as a CCD imaging device, the hollow portion by the side of the solid state imaging device is apt to be a dead space. The first digital camera of the present invention is to effectively utilize the hollow portion. According to the first digital camera of the present invention, the rear elements lens and the focus lens are saved to the hollow portion and thereby contributing to implementing further thinness of the camera.

In the digital camera according to the present invention as mentioned above, it is preferable that the rear elements holding frame and the focus lens holding frame cause the rear elements lens and the focus lens to revolve onto the rear elements lens saving position and the focus lens saving position set up to positions beside the front elements lens, respectively, at the time of the collapse, wherein there is defined a plane vertical to the optical axis, which crosses, at the time of the collapse, the front elements lens, the rear elements lens and the focus lens.

According to the preset invention as mentioned above, the rear elements lens and focus lens are saved in such a manner that the front elements lens, the rear elements lens and focus lens form a line substantially on a plane. This feature makes it possible to contribute to implementing further thinness at the time of the collapse.

In the digital camera according to the present invention as mentioned above, it is preferable that the rear elements holding frame and the focus lens holding frame have their centers of rotatable movement with respect to the rear elements guide frame and the focus lens guide frame at mutually opposite positions with respect to the optical axis.

According to the present invention, the centers of rotatable movement of the rear elements holding frame and the focus lens holding frame with respect to the rear elements guide frame and the focus lens guide frame are set up to mutually opposite positions with respect to the optical axis. This feature makes it possible to revolve the rear elements lens and the focus lens without any interference therebetween, contributing to implementing to further thinness.

In the digital camera according to the present invention as mentioned above, it is preferable that the digital camera further comprises a light quantity control member that moves in one united body together with the rear elements lens in the optical axis direction of the image taking lens stored in the lens barrel to control a light quantity of the subject light passing through the image taking lens, and the rear elements lens advancing and saving mechanism provides such a performance that at the time of the collapse of the lens barrel, the light quantity control member is saved in one united body together with the rear elements lens to the rear elements saving position, and at the time of the extension of the lens barrel, the light quantity control member is advanced in one united body together with the rear elements lens onto the optical axis of the image taking lens.

In the digital camera according to the present invention as mentioned above, it is preferable that the digital camera further comprises a light quantity control member that moves in one united body together with the focus lens in the optical axis direction of the image taking lens stored in the lens barrel to control a light quantity of the subject light passing through the image taking lens, and the focus lens advancing and saving mechanism provides such a performance that at the time of the collapse of the lens barrel, the light quantity control member is saved in one united body together with the focus lens to the focus lens saving position, and at the time of the extension of the lens barrel, the light quantity control member is advanced in one united body together with the focus lens onto the optical axis of the image taking lens.

In the digital camera according to the present invention as mentioned above, it is preferable that the digital camera further comprises first and second light quantity control members that moves in one united body together with the rear elements lens and the focus lens in the optical axis direction of the image taking lens stored in the lens barrel to control a light quantity of the subject light passing through the image taking lens, respectively, and the rear elements lens advancing and saving mechanism provides such a performance that at the time of the collapse of the lens barrel, the first light quantity control member is saved in one united body together with the rear elements lens to the rear elements saving position, and at the time of the extension of the lens barrel, the first light quantity control member is advanced in one united body together with the rear elements lens onto the optical axis of the image taking lens, and the focus lens advancing and saving mechanism provides such a performance that at the time of the collapse of the lens barrel, the second light quantity control member is saved in one united body together with the focus lens to the focus lens saving position, and at the time of the extension of the lens barrel, the second light quantity control member is advanced in one united body together with the focus lens onto the optical axis of the image taking lens.

DETAILED DESCRIPTION OF PREFERRED EMBODIMENTS

Embodiments of the present invention will be described with reference to the accompanying drawings.

Figure 1:
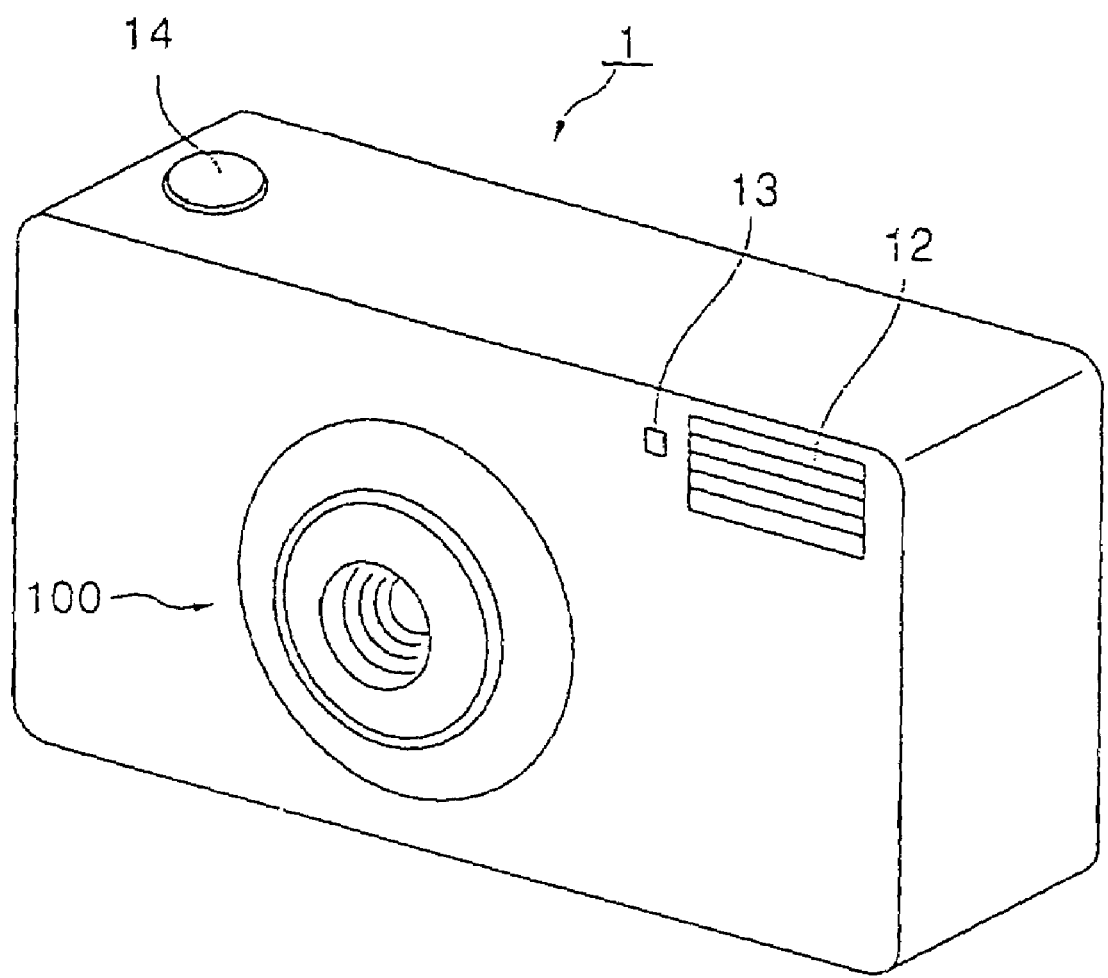
FIG. 1 is a perspective view of a digital camera of a first embodiment of the present invention.
Figure 2:
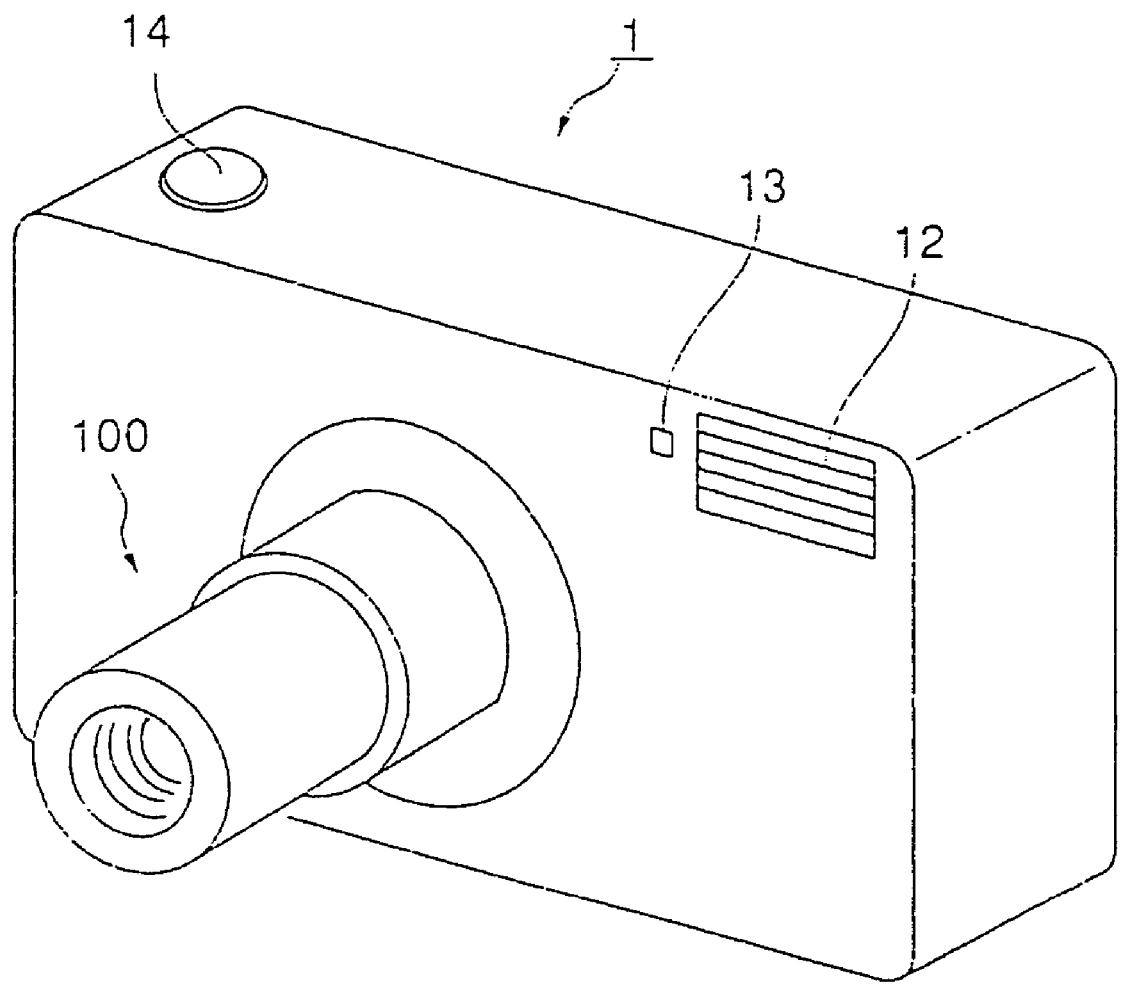
FIG. 2 is a perspective view of the digital camera of the first embodiment of the present invention.

Each of FIG. 1 and FIG. 2 is a perspective view of the digital camera of the first embodiment of the present invention.

FIG. 1 shows a collapsed state of a lens barrel 100 incorporating therein a zoom lens of a digital camera 1 of the present embodiment. FIG. 2 shows an extended state of the lens barrel 100 of the digital camera 1.

The lens barrel 100 of the camera 1 shown in FIG. 1 and FIG. 2 incorporates therein an image taking lens consisting of three lens groups as will be explained later. A movement of those three lens groups in an optical axis direction makes it possible to perform an adjustment of a focal length. And movements of the third group of focus lens in the optical axis direction make it possible to perform an adjustment of a focusing.

In upper front of the digital camera 1 shown in FIG. 1 and FIG. 2, there are disposed a flash window 12 and a finder objective window 13. On the top of the digital camera 1, there is disposed a shutter button 14.

On the back (not illustrated) of the digital camera 1, there is disposed a zoom operation switch. When one end of the zoom operation switch is depressed, the lens barrel 100 is extended to a telephoto side while the zoom operation switch is depressed. And when another end of the zoom operation switch is depressed, the lens barrel 100 is moved to a wide-angle side while the zoom operation switch is depressed.

Figure 3:
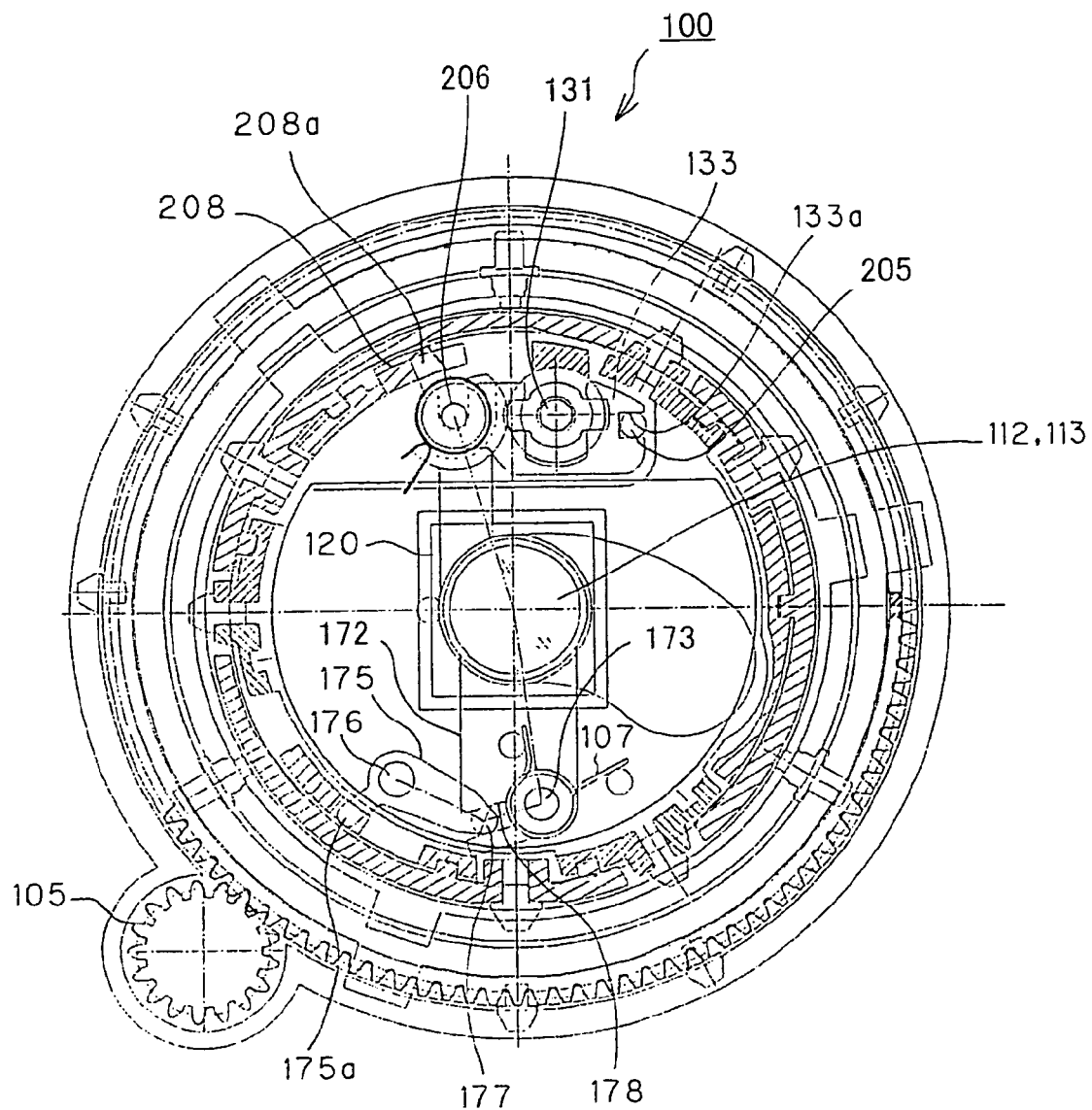
FIG. 3 is a typical illustration showing main parts of the digital camera of the first embodiment of the present invention, looking from an optical axis direction a lens barrel in a state of an extension.
Figure 4:
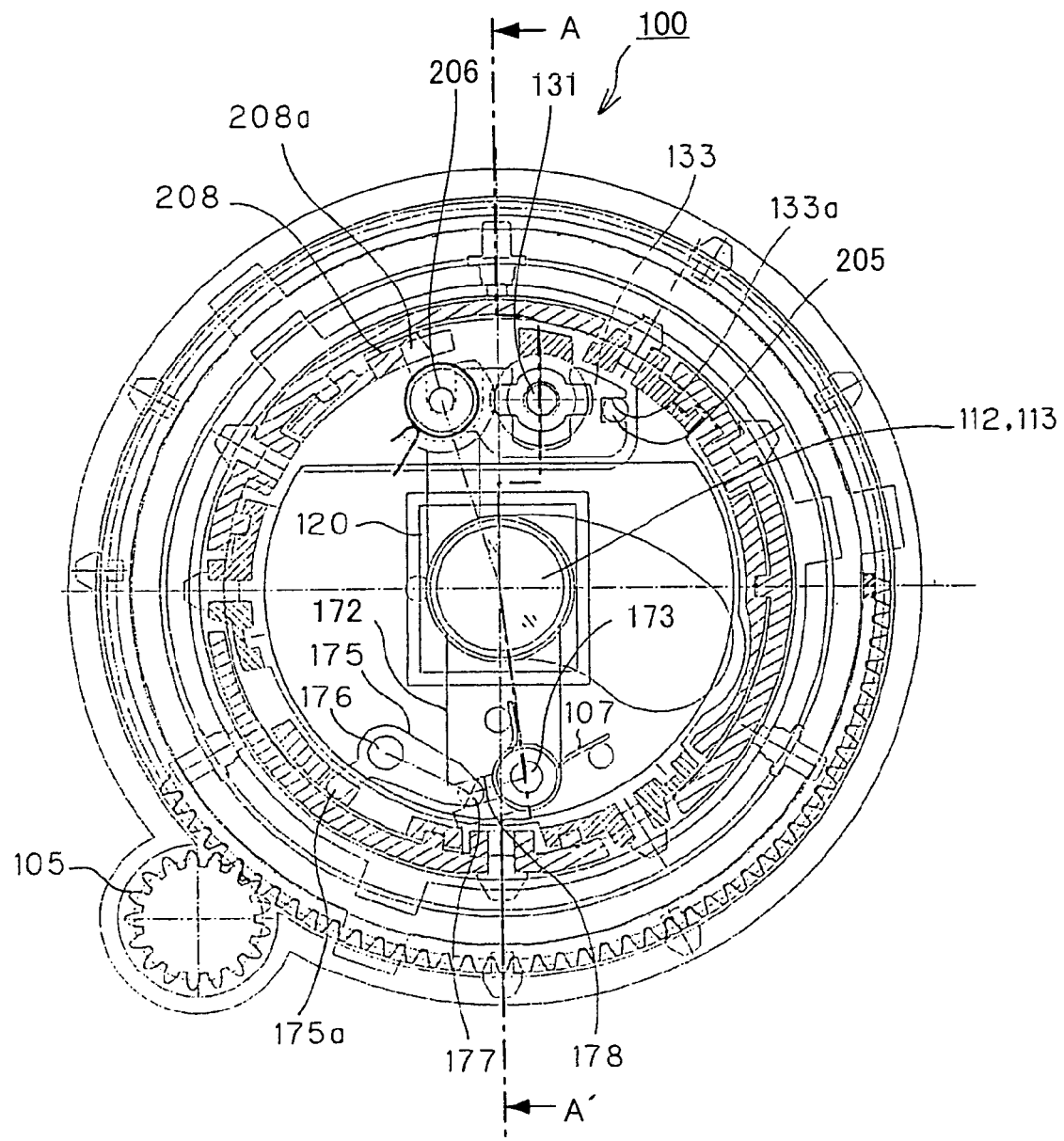
FIG. 4 is a view showing the line A-A' on the same sectional view as FIG. 3.
Figure 5:
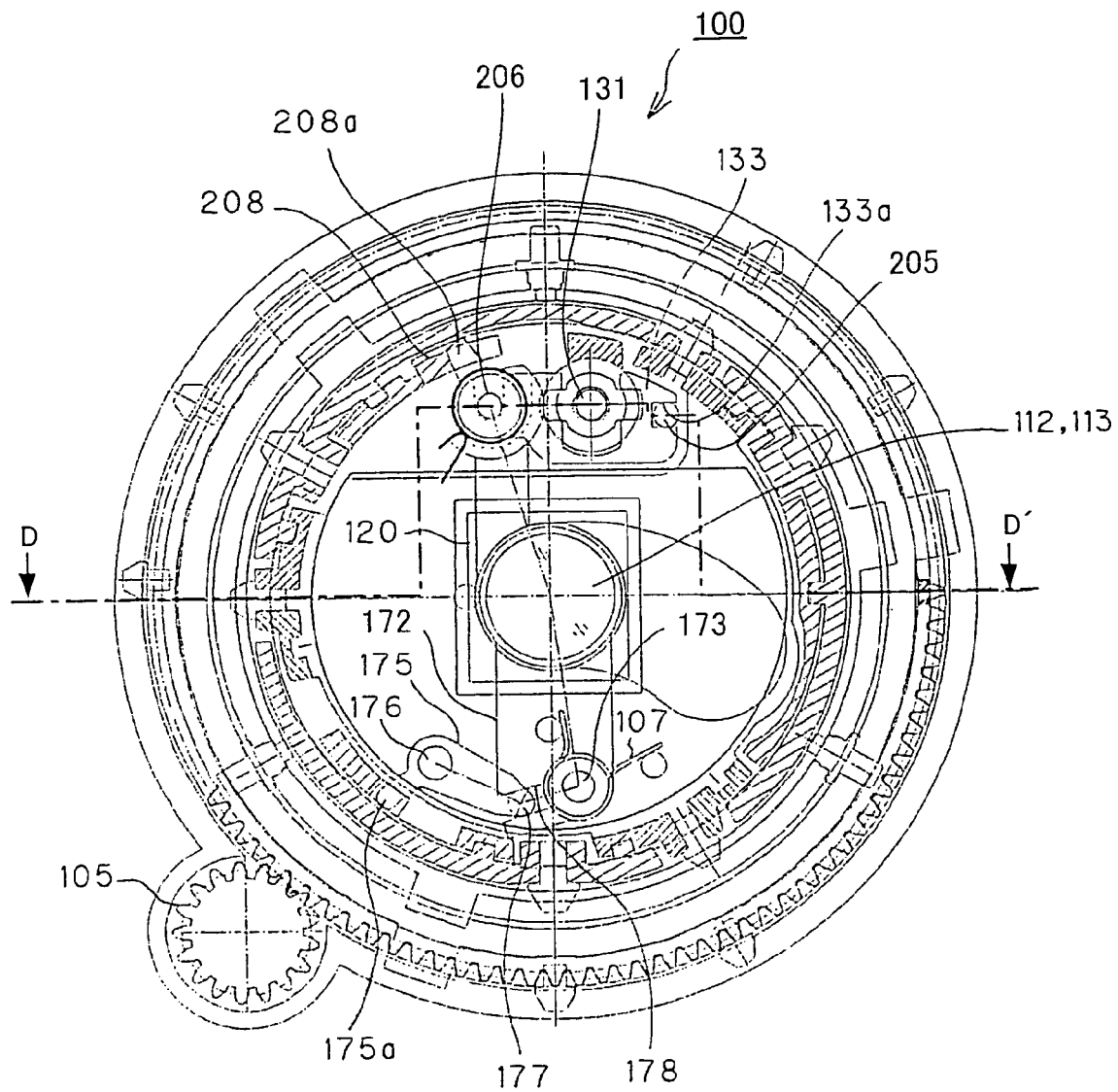
FIG. 5 is a view showing the line D-D' on the same sectional view as FIG. 3.
Figure 6:
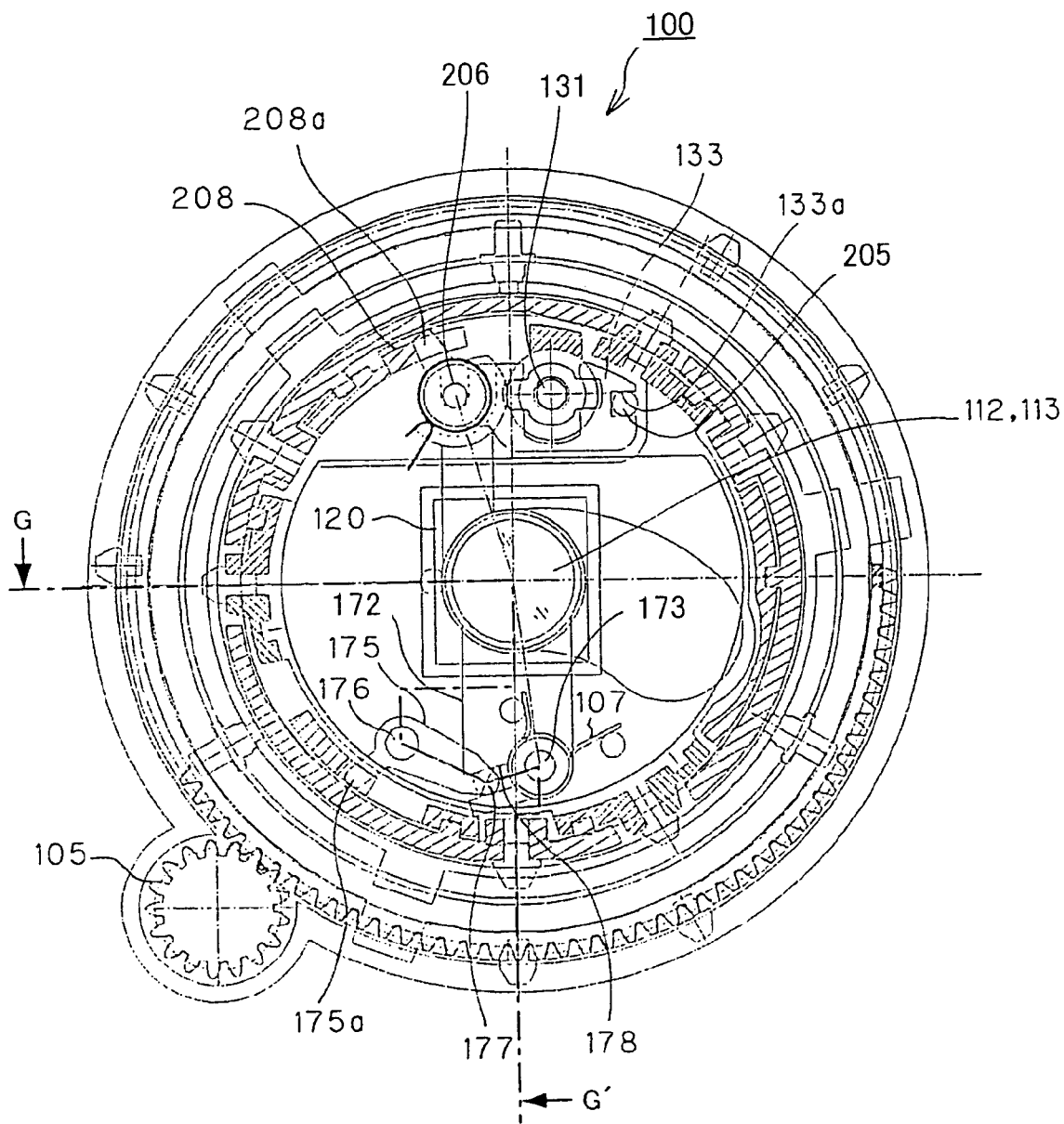
FIG. 6 is a view showing the line G-G' on the same sectional view as FIG. 3.
Figure 7:
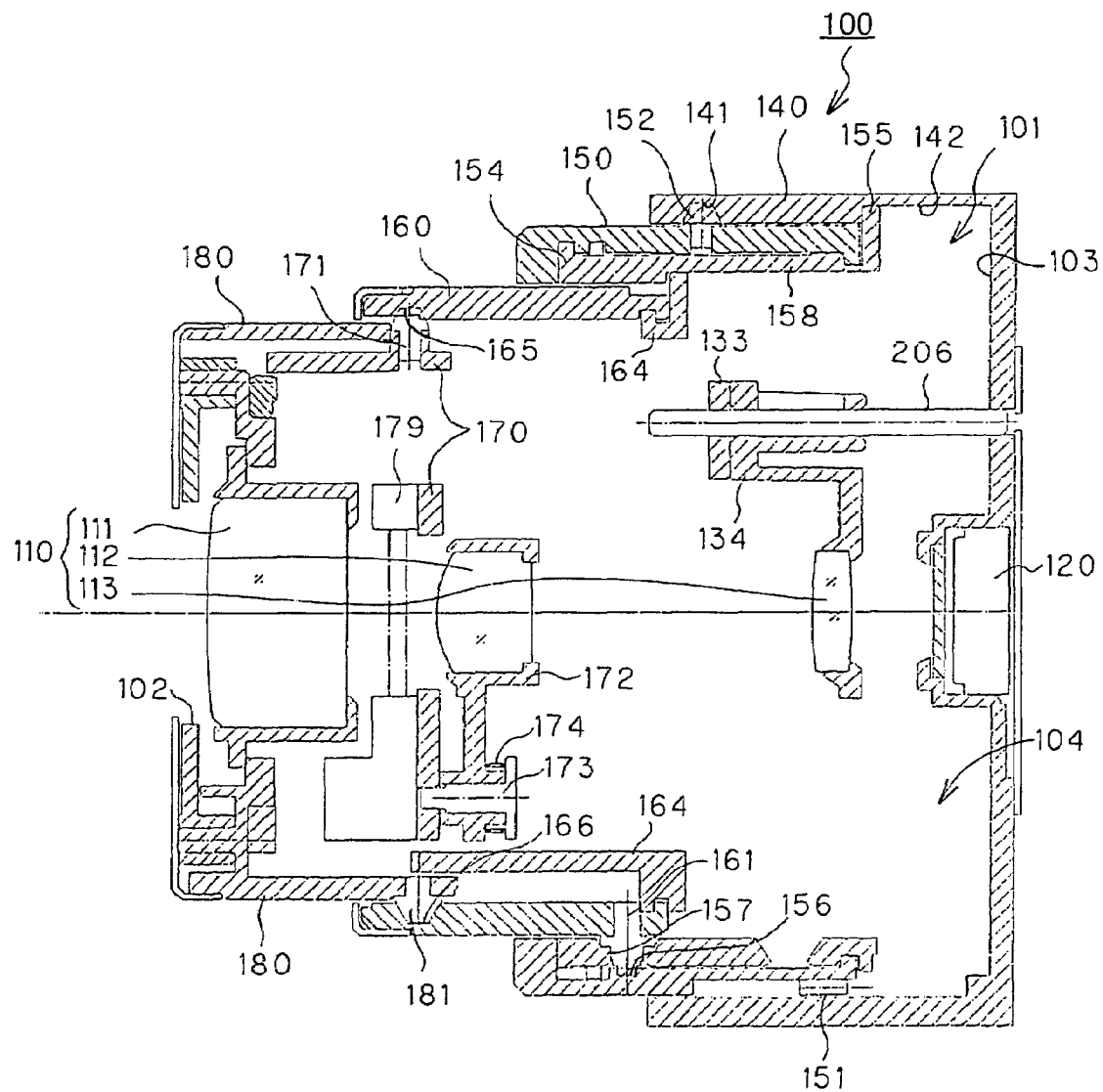
FIG. 7 is a sectional view showing a state of a tele-edge where the focal length is longest, taken along the line A-A' in FIG. 4.
Figure 8:
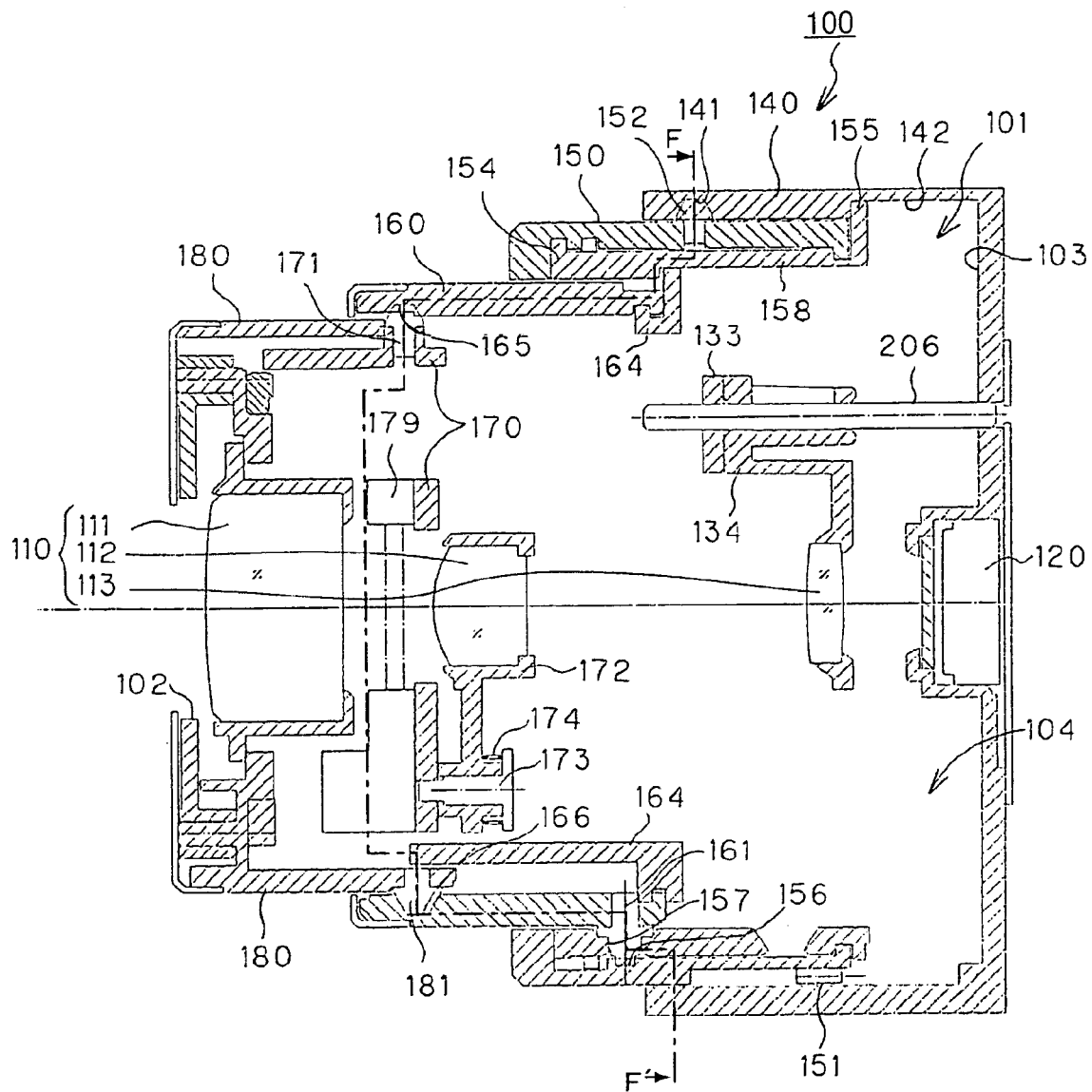
FIG. 8 is a view showing the line F-F' on the same sectional view as FIG. 7.
Figure 9:
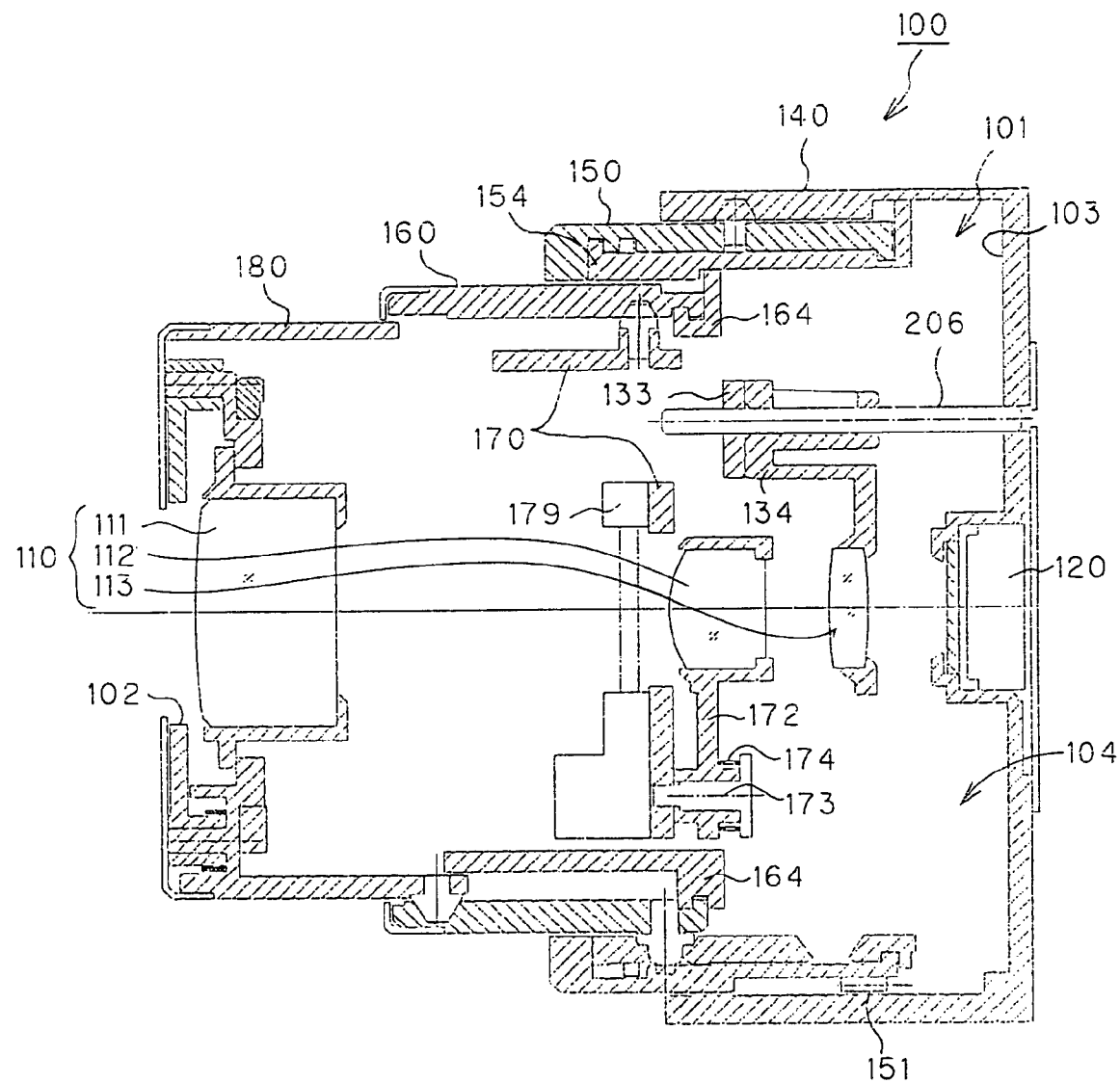
FIG. 9 is a sectional view showing a state of a wide-edge where the focal length is shortest, taken along the line A-A' in FIG. 4.
Figure 10:
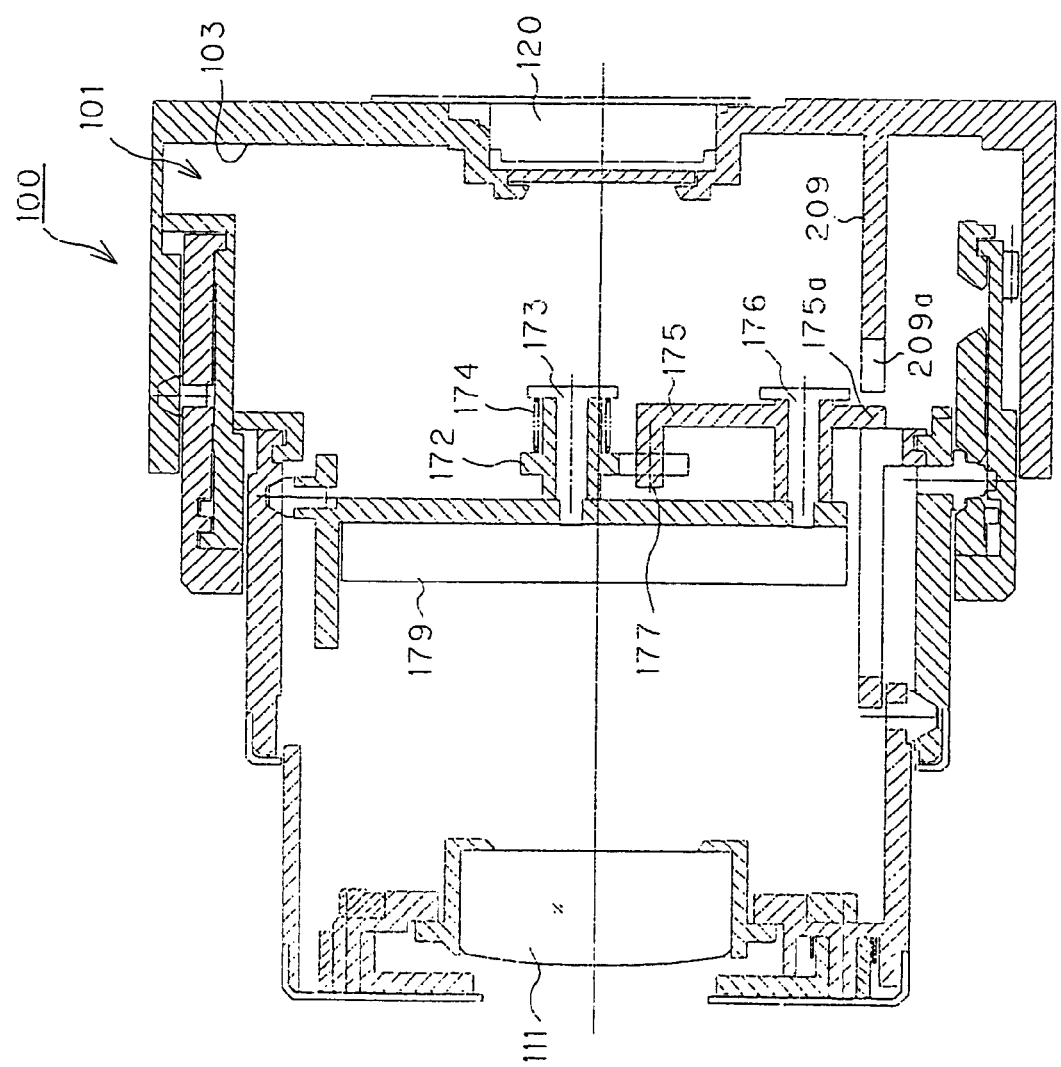
FIG. 10 is a sectional view taken along the line G-G' in FIG. 6.
Figure 11:
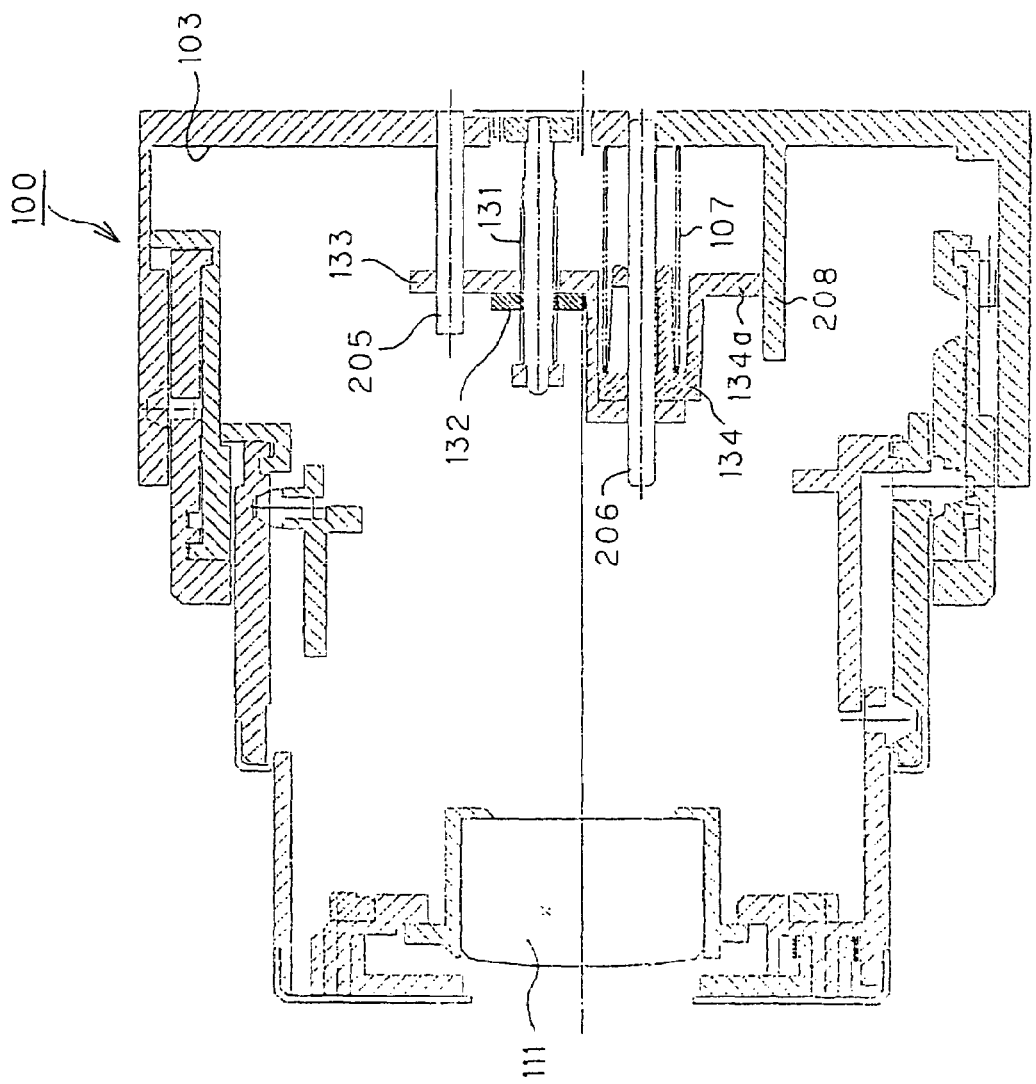
FIG. 11 is a sectional view showing main parts in a state of the wide-edge, taken along the line D-D' in FIG. 5.
Figure 12:
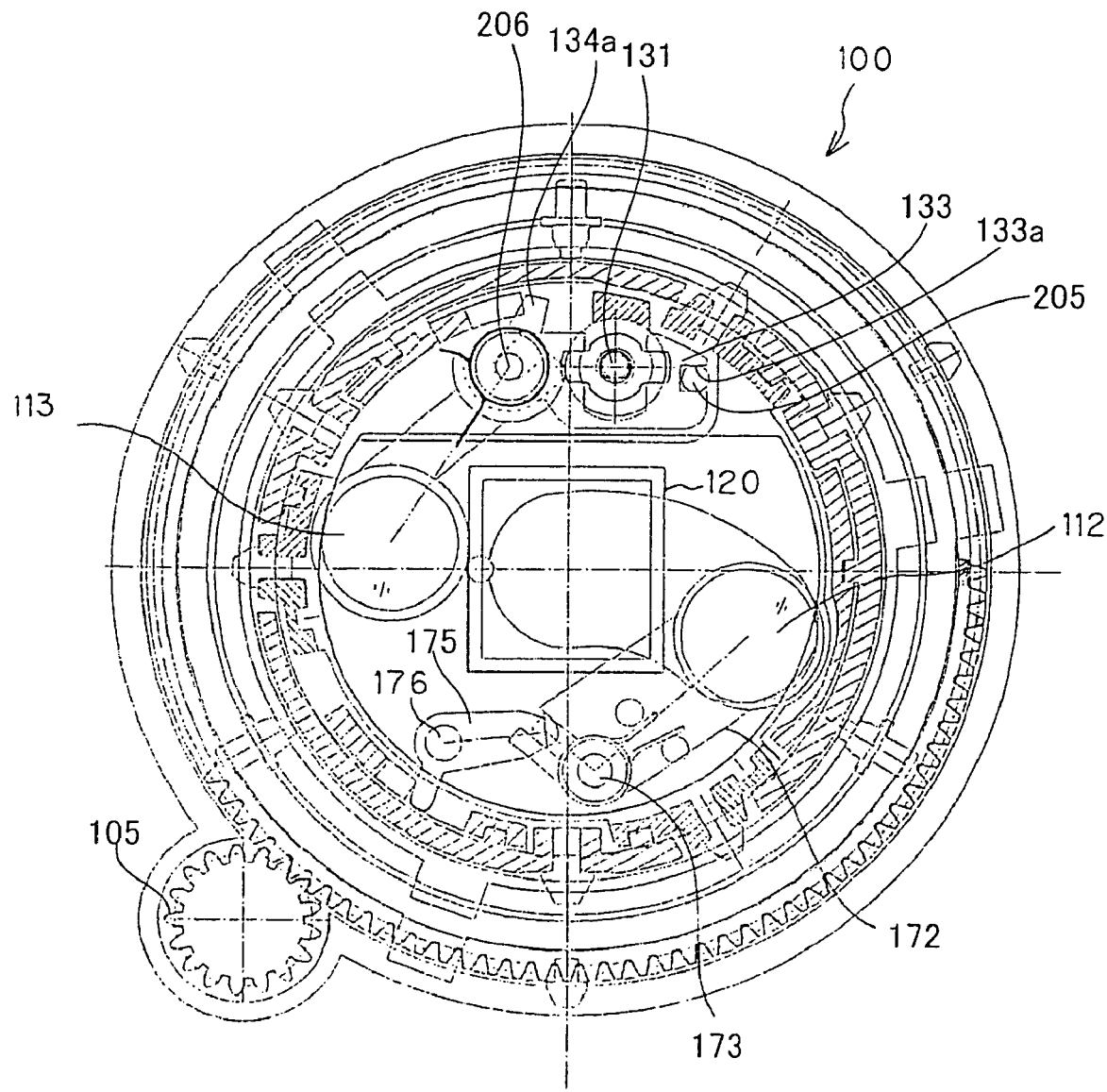
FIG. 12 is a typical illustration showing main parts of the digital camera of the first embodiment of the present invention, looking from an optical axis direction a lens barrel in a state of a collapse.
Figure 13:
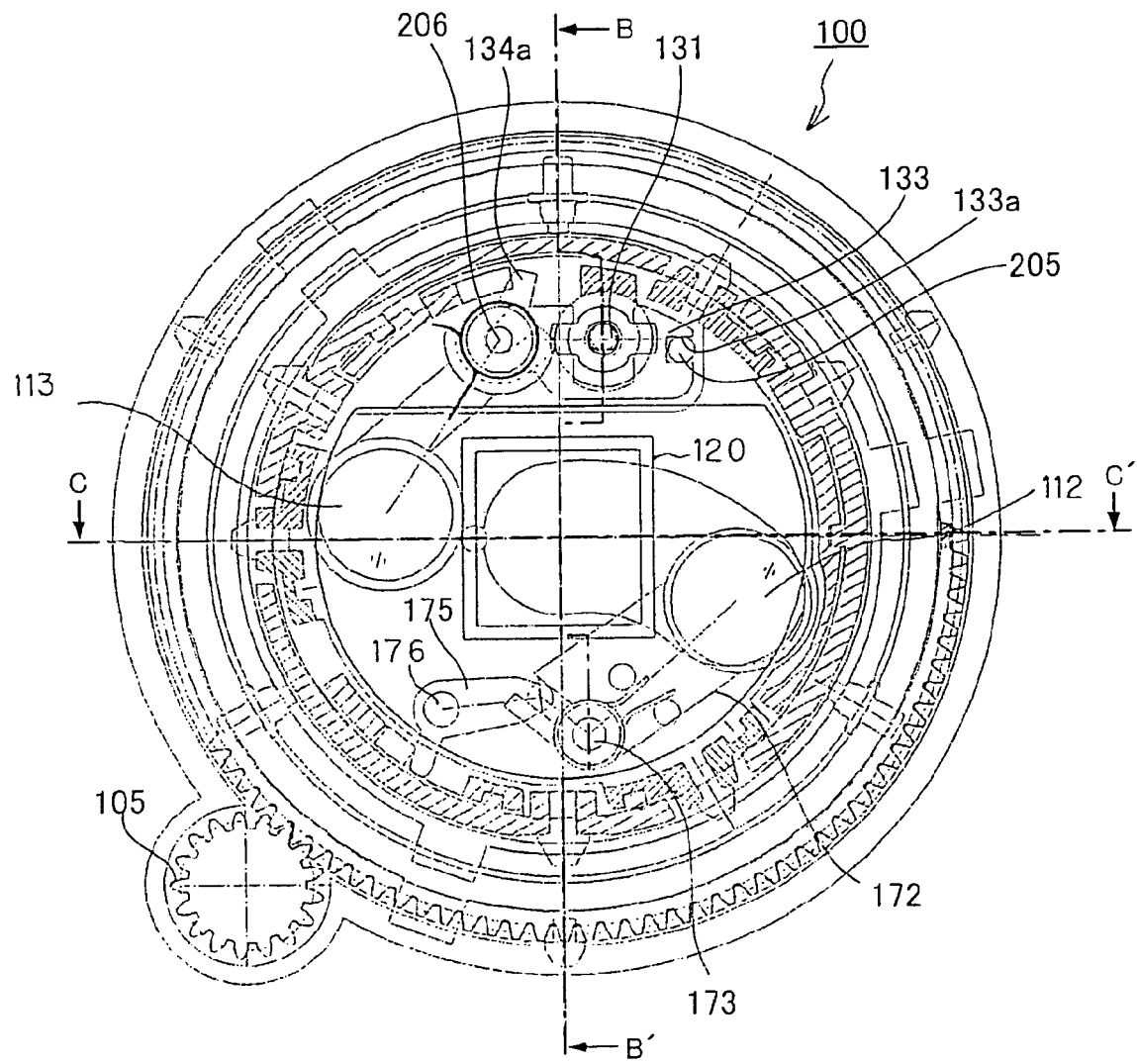
FIG. 13 is a view showing the line B-B' and the line C-C' on the same sectional view as FIG. 12.
Figure 14:
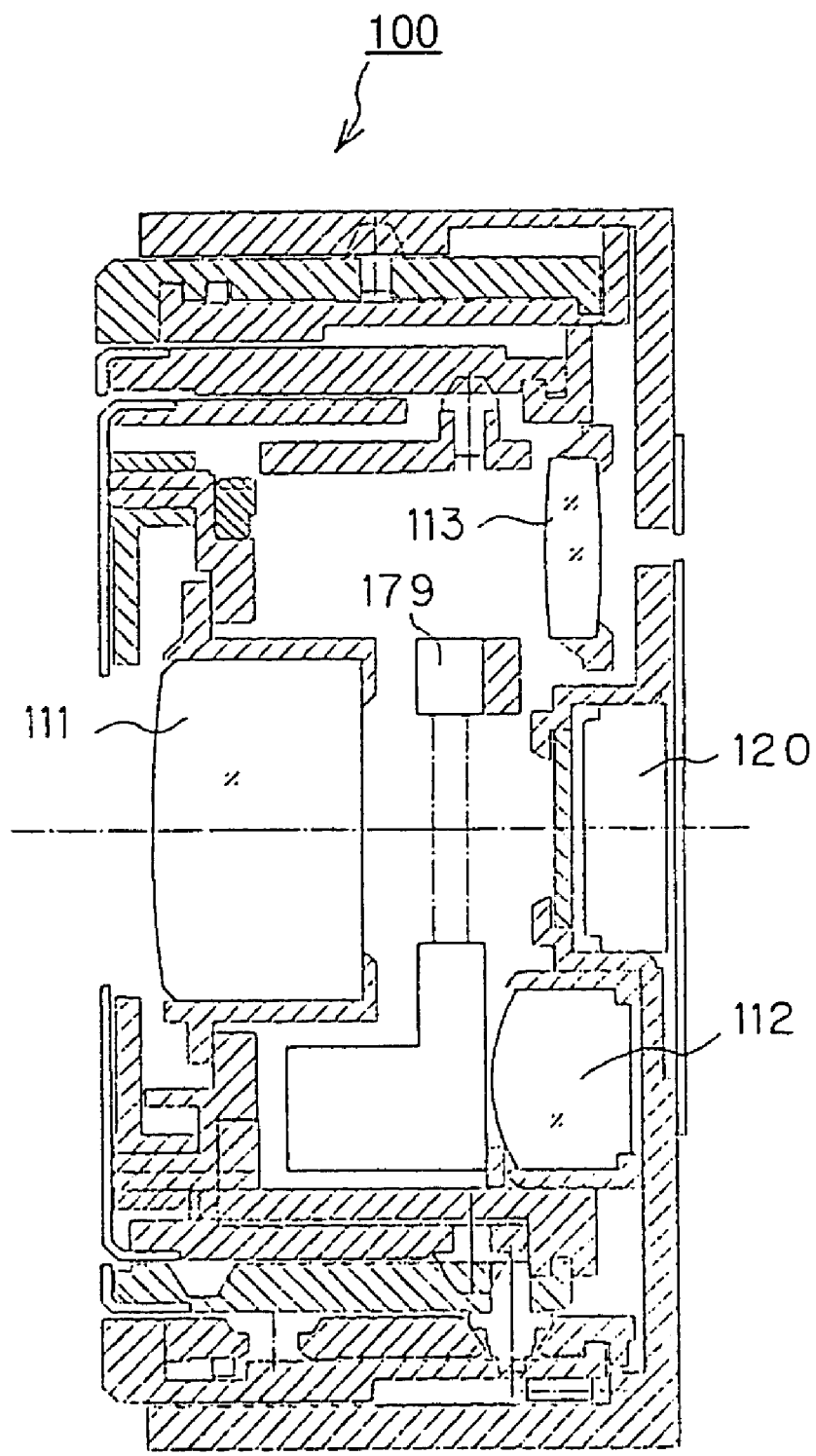
FIG. 14 is a sectional view taken along the line C-C' of FIG. 13.
Figure 15:
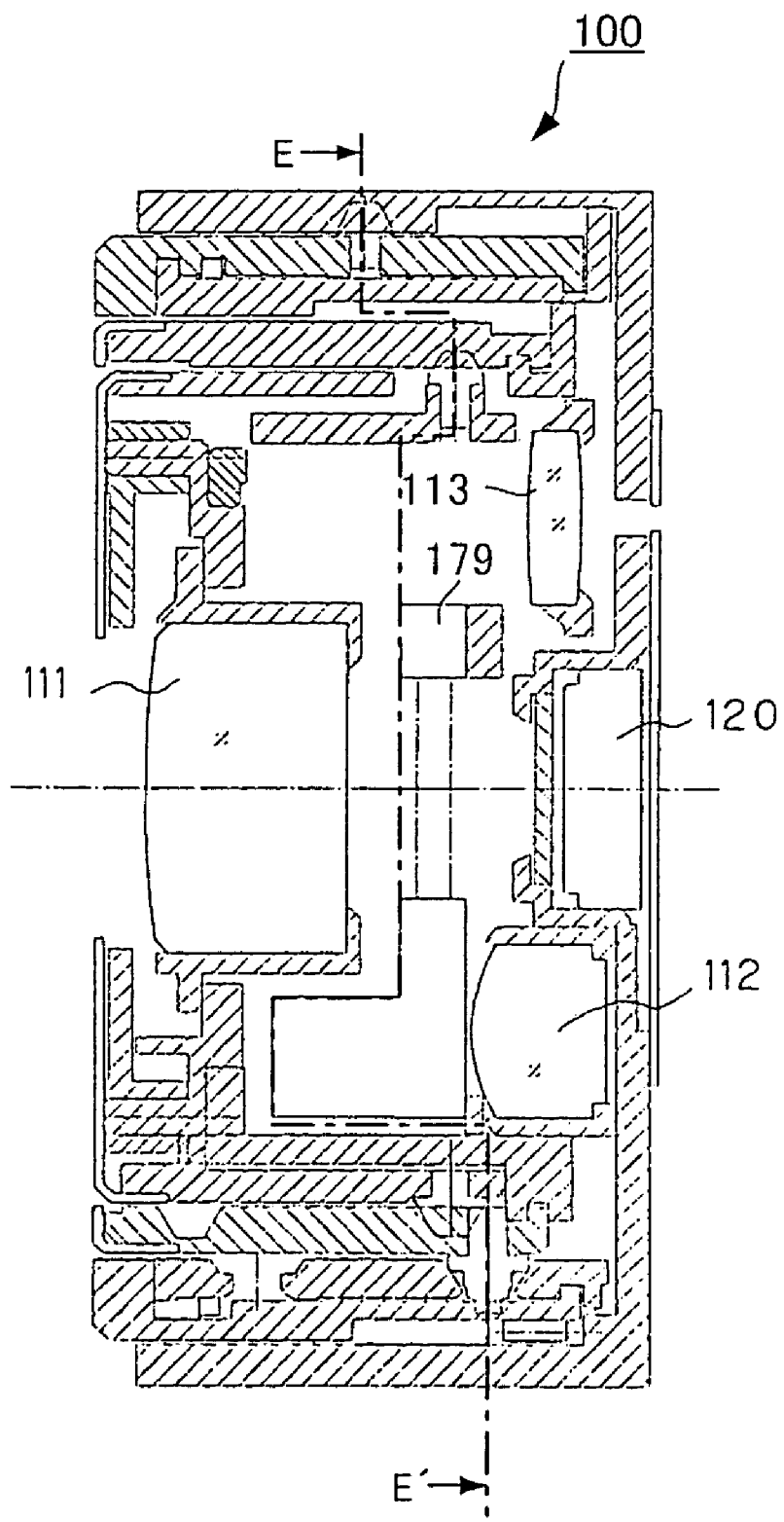
FIG. 15 is a view showing the line E-E' on the same sectional view as FIG. 14.
Figure 16:
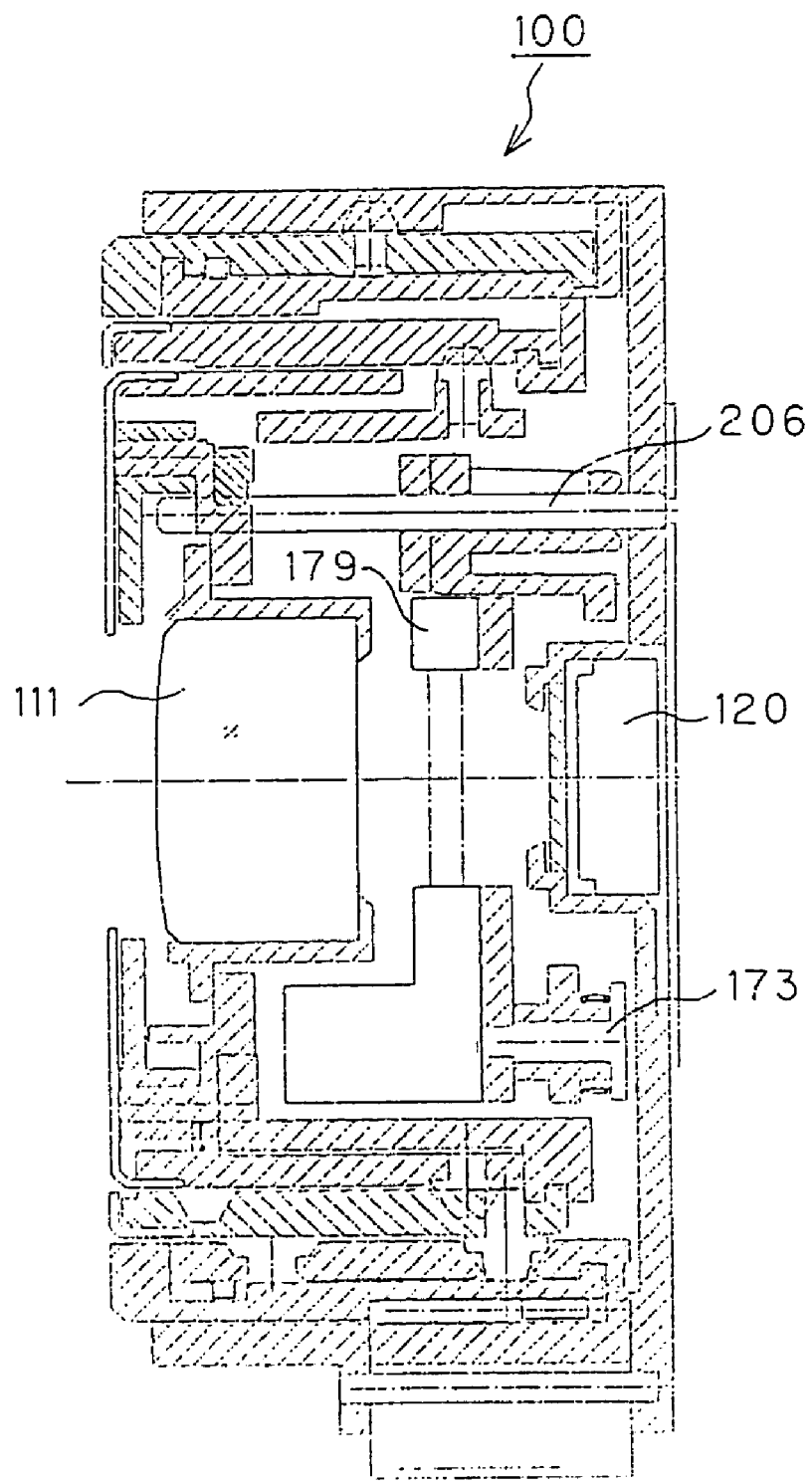
FIG. 16 is a sectional view taken along the line B-B' of FIG. 13.

FIG. 3 is a typical illustration showing main parts of the digital camera of the first embodiment of the present invention, looking from an optical axis direction a lens barrel in a state of an extension. And FIG. 3 is a sectional view taken along the line F-F' in FIG. 8 which will be described later. FIG. 4 is a view showing the line A-A' on the same sectional view as FIG. 3. FIG. 5 is a view showing the line D-D' on the same sectional view as FIG. 3. FIG. 6 is a view showing the line G-G' on the same sectional view as FIG. 3. In the following figures, in order to avoid troublesomeness and complication of the figures, there will sort out figures for explanation with reference numbers and figures to which lines are applied. FIG. 7 is a sectional view showing a state of a tele-edge where the focal length is longest, taken along the line A-A' in FIG. 4. FIG. 8 is a view showing the line F-F' on the same sectional view as FIG. 7. FIG. 9 is a sectional view showing a state of a wide-edge where the focal length is shortest, taken along the line A-A' in FIG. 4. FIG. 10 is a sectional view taken along the line G-G' in FIG. 6. FIG. 11 is a sectional view showing main parts in a state of the wide-edge, taken along the line D-D' in FIG. 5. FIG. 12 is a typical illustration showing main parts of the digital camera of the first embodiment of the present invention shown in FIG. 1 to FIG. 11, looking from an optical axis direction a lens barrel in a state of a collapse. And FIG. 12 is a sectional view taken along the line E-E' in FIG. 15 which will be described later. FIG. 13 is a view showing the line B-B' and the line C-C' on the same sectional view as FIG. 12. FIG. 14 is a sectional view taken along the line C-C' of FIG. 13. FIG. 15 is a view showing the line E-E' on the same sectional view as FIG. 14. FIG. 16 is a sectional view taken along the line B-B' of FIG. 13.

Hereinafter, the explanation will be continued mainly referring to FIG. 7 and in addition other figures as the demand arises.

An internal space 101 of a lens barrel 100 shown in FIG. 3 to FIG. 16 stores therein a image taking lens 110 comprising three groups of a front elements lens 111, a rear elements lens 112, and a focus lens 113 in the named order with respect to the optical axis direction. The image taking lens 110 is so arranged that a movement of the rear elements lens 112 between the tele-edge shown in FIG. 7 and the wide-edge shown in FIG. 9 makes it possible to vary the focal length, and a movement of the focus lens 113 in the optical axis direction makes it possible to perform a focusing.

At the front of the internal space, there is formed an aperture 102 through which the image taking lens 110 appears. At the rear of the internal space, there is disposed a wall member 103, which is fixed on a camera body, or which constitutes a part of the camera body. The internal space 101 is defined in its outline by the member 103 and a plurality of cylindrical members that will be described later.

A CCD solid state imaging device (hereinafter, it will be simply referred to as CCD) 120 is mounted on the wall member 103 in a state that the CCD 120 projects onto the internal space 101. The disposition of the CCD 120 at the position projecting onto the internal space 101 may form a hollow portion 104 divided by the CCD 120 and the wall member 103 by the side of the CCD 120.

A feed screw 131 (cf. FIG. 11) is rotatably supported on the wall member 103. A nut member 132 (cf. FIG. 11) is engaged with the feed screw 131. A focus lens guide frame 133 for guiding the focus lens 113 in the optical axis direction is fixed on the nut member 132. The focus lens guide frame 133 is fixed on the nut member 132, and a guide rod 205 projecting from the wall member 103 is engaged with a fork-shaped groove 133a (cf. FIG. 3) provided on the focus lens guide frame 133. Thus, the focus lens guide frame 133 moves in the optical axis direction by the rotation of the feed screw 131.

A focus lens holding frame 134 for holding the focus lens 113 is pivotally supported by a rotary shaft 206 so as to be rotatably movable around the rotary shaft 206. A coil spring enables the focus lens 113 in such a direction that the focus lens 113 is located on the optical axis of the image taking lens. A rotatably movable range of the focus lens holding frame 134 is a range that the focus lens 113 held in the focus lens holding frame 134 rotates between a position (cf. FIG. 7 and FIG. 9) in which the focus lens 113 advances on the optical axis of the image taking lens 110 and a focus lens saving position (cf. FIG. 14) in which the focus lens 113 comes in the hollow portion 104 beside the CCD 120.

With respect to a mechanism in which when the focus holding frame 134 rotatably moves, the focus lens 113 revolves and saves in the focus lens saving position set up in the hollow portion 104, it will be explained later.

The feed screw 131, which is engaged on a spiral basis with the nut member 132 on which the focus lens guide frame 133 is fixed, is driven by a focus motor (not illustrated) provided at the camera body side. Rotation of the feed screw 131 causes the focus lens guide frame 133 fixed on the nut member 132 and the focus lens holding frame 134 pivotally supported by the focus lens guide frame 133 to move in the optical axis direction. Thus, the focus lens 113 held by the focus lens holding frame 134 moves in the optical axis direction to control the position of the focus lens 113 so that the subject focused in front of the CCD 120 is projected.

A fixed cylinder 140 is fixed on the wall member 103. Inside the fixed cylinder 140 there is provided a rotary cylinder 150. The rotary cylinder 150 is provided with gear wheels 151, which mesh with pole-shaped gears 105 (cf. FIG. 3), around. A barrel driving motor (not illustrated) drives the pole-shaped gears 105 so that the rotary cylinder 150 rotates. On the inside wall of the fixed cylinder 140 there is formed a cam groove 141 with which a cam pin 152, which is fixed on the c, is engaged. Accordingly, when the rotary cylinder 150 receives a rotary driving force via the pole-shaped gears 105, the rotary cylinder 150 goes ahead or goes back in an optical axis while rotating.

Inside the rotary cylinder 150 there is provided a rotary cylinder side progressive key-ring 154 in such a way that the rotary cylinder side progressive key-ring 154 is rotatably with respect to the rotary cylinder 150, but inhibited from the relative movement to the rotary cylinder 150 in the optical axis direction. A key plate 155 is fixed on the rotary cylinder side progressive key-ring 154. The key plate 155 is engaged with a key groove 142 extending in the optical axis direction, which is formed on the inner wall of the fixed cylinder 140, whereby the rotary cylinder side progressive key-ring 154 is inhibited from being rotated on the fixed cylinder 140 while it is permitted to move in the optical axis direction. Accordingly, when the rotary cylinder 150 moves in the optical axis direction while rotating, the rotary cylinder side progressive key-ring 154 does not rotate since it is inhibited from being rotated on the fixed cylinder 140, but moves in the optical axis direction together with the rotary cylinder 150.

Further, inside the rotary cylinder 150 there is provided an intermediate cylinder 160 that is rotatable. At the inner wall of the rotary cylinder 150, there is formed a cam groove 156. Further, also at the rotary cylinder side progressive key-ring 154 there is formed a cam groove 157 penetrating through its outer periphery and inner periphery. The cam groove 156 of the rotary cylinder 150 is engaged with a cam pin 161 provided on the intermediate cylinder 160 in such a manner that the cam pin 161 penetrates through the cam groove 157 of the rotary cylinder side progressive key-ring 154. Thus, when the rotary cylinder 150 moves in the optical axis direction while rotating, the intermediate cylinder 160 also moves in the optical axis direction relatively to the rotary cylinder 150 while rotating in accordance with a geometry of the cam grooves of the rotary cylinder 150 and the rotary cylinder side progressive key-ring 154.

Inside the intermediate cylinder 160 there is disposed an intermediate cylinder side progressive key-ring 164. At the rotary cylinder side progressive key-ring 154 there is formed a progressive key 158. The intermediate cylinder side progressive key-ring 164 is engaged with the progressive key 158 of the rotary cylinder side progressive key-ring 154. The intermediate cylinder side progressive key-ring 164 is rotatable relatively with respect to the intermediate cylinder 160, but is inhibited in a relative movement in the optical axis direction with respect to the intermediate cylinder 160. Accordingly, when the intermediate cylinder 160 moves in the optical axis direction relatively with respect to the rotary cylinder 150 while rotating, the intermediate cylinder side progressive key-ring 164 progressively moves in the optical axis direction with the movement of the intermediate cylinder 160 in the optical axis direction, without rotation.

At the inner wall of the intermediate cylinder 160, there is formed a cam groove 165 for guiding a rear elements guide frame 170. The cam groove 165 is engaged with a cam pin 171 fixed on the rear elements guide frame 170 in a state that the cam pin 171 is inhibited from being rotated with respect to the intermediate cylinder side progressive key-ring 164. Accordingly, when the intermediate cylinder 160 rotates, the rear elements guide frame 170 progressively moves in the optical axis direction in accordance with the geometry of the cam groove 165 of the inner wall of the intermediate cylinder 160.

A shutter unit 179 is fixed on the rear elements guide frame 170 in the optical axis direction ahead. The shutter unit 179 is provided with an aperture member for controlling a light quantity of the subject light passing through the image taking lens 110 in such a manner that an aperture caliber is controlled, and a shutter member for controlling a light quantity of the subject light passing through the image taking lens 110 in such a manner that a shutter speed is controlled.

In the optical axis direction behind, a rear elements holding frame 172 for holding the rear elements lens 112 is pivotally supported by a rotary shaft 173 so as to be rotatably movable with respect to the rear elements guide frame 170. A rotatably movable range of the rear elements holding frame 172 is a range that the rear elements lens 112 held in the rear elements holding frame 172 rotates between a use position (cf. FIG. 7 and FIG. 9) in which the rear elements lens 112 advances on the optical axis of the image taking lens 110 and a saving position (cf. FIG. 14) in which the rear elements lens 112 comes in the hollow portion 104 beside the CCD 120. There is provided a coil spring 174 around the rotary shaft 173. The rear elements holding frame 172 is enabled by the coil spring 174 in a direction in which the rear elements lens 112 rotates on the optical axis of the image taking lens 110 and also in the optical axis direction.

With respect to a mechanism in which when the rear elements holding frame 172 rotatably moves, the rear elements lens 112 rotates and saves in the saving position set up in the hollow portion 104, it will be explained later.

At the intermediate cylinder 160, there is formed an additional cam groove 166 for guiding a front elements frame 180 holding the front elements lens 111. A cam pin 181, which is provided on the front elements frame 180, comes in the cam groove 166. The front elements frame 180 is inhibited from being rotated on the intermediate cylinder side progressive key-ring 164 but is permitted in a movement in the optical axis direction. Accordingly, when the intermediate cylinder 160 rotates, the front elements frame 180 progressively moves in the optical axis direction with respect to the intermediate cylinder 160 in accordance with the geometry of the cam groove 166.

With this mechanism, when the rear elements lens 112 is in the state of the tele-edge shown in FIG. 7, a transmission of the rotary driving force in the collapse direction via the pole-shaped gears 105 to the rotary cylinder 150 may collapse the image taking lens from the state of the tele-edge shown in FIG. 7 via the state of the wide-edge shown in FIG. 9 to the collapsed state shown in FIG. 14 and FIG. 16. Reversely, when the image taking lens is in the state of the collapsed state shown in FIG. 14 and FIG. 16, a transmission of the rotary driving force in the extension direction to the rotary cylinder 150 may extend the image taking lens from the collapsed state shown in FIG. 14 and FIG. 16 to the state of the wide-edge shown in FIG. 9, and offers the state of the tele-edge shown in FIG. 7 via the state of the wide-edge.

When a photograph is taken, the above-mentioned zoom operation switch is operated to control a focal length between the tele-edge shown in FIG. 7 and the wide-edge shown in FIG. 9, so that a desired photographic angle of view is set up. The focus lens 113 is subjected to focusing to the position wherein the best contrast is obtained by the contrast detection according to the image signal obtained in the CCD 120. Thereafter, when the shutter button is depressed, the CCD 120 creates an image signal representative of the subject, and the image signal is subjected to a suitable processing and then recorded.

Next, there will be explained the mechanism in which at the time of the collapse, the focus lens 113 is revolved to the focus lens saving position.

The focus lens holding frame 134 for holding the focus lens 113 is pivotally supported by the rotary shaft 206 so as to be rotatably movable with respect to the focus lens guide frame 133, as mentioned above. And the focus lens holding frame 134 is enabled by the coil spring 107 in a direction in which the focus lens 113 is located on the optical axis of the image taking lens 110.

On the wall member 103 defining the rear of the internal space 101 of the lens barrel 100, as shown in FIG. 11, there is formed a convex portion 208, which projects into the internal space 101, in the collapse direction travelling tracks of an engagement section 134a of the focus lens holding frame 134.

Figure 17:
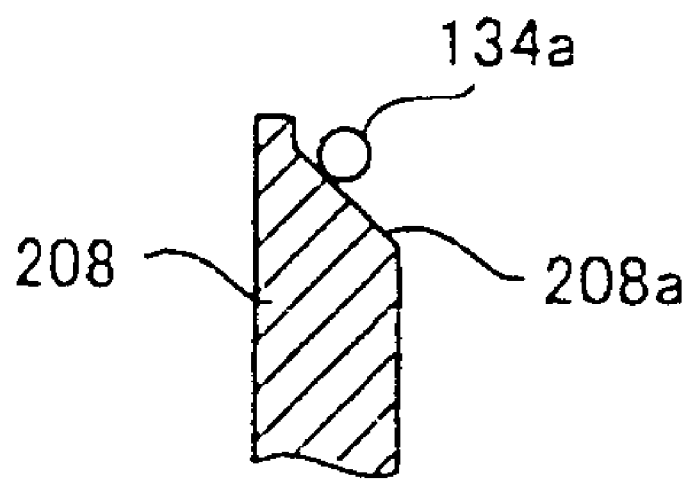
FIG. 17 is a typical illustration showing a convex portion provided on a wall member and an engagement section of a focus lens holding frame, looking from the direction different by 90 degree from the direction showing in FIG. 9.

FIG. 17 is a typical illustration showing the convex portion provided on the wall member and the engagement section 134a of the focus lens holding frame, looking from the direction different by 90 degree from the direction showing in FIG. 11.

As shown in FIG. 17, the convex portion 208 provided on the wall member has a taper surface 208a that engages with the engagement section 134a of the focus lens holding frame. Thus, when the feed screw 131 rotates and the focus lens 113 moves in a direction approaching the CCD 120, the engagement section 134a of the focus lens holding frame 134 is in contact with the taper surface 208a of the convex portion 208 and moves along the taper surface 208a, so that the focus lens holding frame 134 rotatably moves around the rotary shaft 206, and the focus lens 113 held by the focus lens holding frame 134 is out of the position on the optical axis of the image taking lens 110 and revolves, and thereby moving to the focus lens saving position (cf. FIG. 14) set up to the hollow portion 104 beside the CCD 120.

When the lens barrel 100 moves from the collapsed state shown in FIG. 14 and FIG. 16 to the extension state, the convex portion 208 projecting from the wall member 103 is disengaged from the focus lens holding frame 134, so that the focus lens holding frame 134 rotatably moves by enabling of the coil spring 107 from the state shown in FIG. 12 to the state shown in FIG. 3, whereby the focus lens 112 revolves from the focus lens saving position shown in FIG. 14 to the position in the optical axis.

Next, there will be explained the mechanism in which at the time of collapse, the rear elements lens 112 is revolved to the saving position. The mechanism for revolving the rear elements lens 112 to the saving position is similar to the mechanism for revolving the focus lens 113 to the saving position.

The rear elements holding frame 172 for holding the rear elements lens 112 is pivotally supported by the rotary shaft 173 so as to be rotatably movable with respect to the rear elements guide frame 170, as mentioned above. And the rear elements holding frame 172 is enabled by the coil spring 174 in a direction in which the rear elements lens 112 is located on the optical axis of the image taking lens 110. A lever member 175 shown in FIG. 3 and FIG. 10 is pivotally supported by a rotary shaft 176 so as to be rotatably movable with respect to the rear elements guide frame 170. The rear elements holding frame 172 is provided with a fork-shaped engagement groove 178 as shown in FIG. 3. An engagement pin 177, which is provided on one end of the lever member 175, comes into the engagement groove 178.

On the wall member 103 defining the rear of the internal space 101 of the lens barrel 100, as shown in FIG. 10, there is formed a convex portion 209, which projects to the internal space 101, in the collapse direction travelling tracks of an edge 175a opposite to the direction wherein the engagement pin 177 of the lever member 175 is provided. And on the tip of the convex portion 209 there is provided a taper plane 209a. Accordingly, when the rotary cylinder 150 rotates in the collapse direction, the intermediate cylinder 160 and the rear elements guide frame 170 cam-engaged with the intermediate cylinder 160 also move in the collapse direction and the edge 175a of the lever member 175 hits the taper plane 209a of the convex portion 209 and moves along the taper plane 209a, so that the lever member 175 rotatably moves from the rotary position shown in FIG. 3 to the rotary position shown in FIG. 12. Since the pin 177 of the lever member 175 comes into the fork-shaped engagement groove 178 of the rear elements holding frame 172, the rear elements holding frame 172 also rotatably moves around the rotary shaft 173, so that the rear elements lens 112 is saved from the position on the optical axis shown in FIG. 3 to a save position out of the optical axis, as shown in FIG. 12. The save position is the hollow portion 104 formed by the side of the CCD 120, as shown in FIG. 14.

When the lens barrel 100 moves from the collapsed state shown in FIG. 14 and FIG. 16 in the extension state, the convex portion 209 projecting from the wall member 103, which is shown in FIG. 10, is disengaged from the lever member 175, so that the rear elements holding frame 172 rotatably moves by enabling of the coil spring 174 from the state shown in FIG. 12 to the state shown in FIG. 3, whereby the rear elements lens 112 revolves from the saving position shown in FIG. 14 to the position in the optical axis.

According to the first embodiment, as mentioned above, at the time of the collapse, both the focus lens 113 and the rear elements lens 112 are saved to the hollow portion 104 by the side of the CCD 120. In case of the digital camera having the conventional collapse and extension mechanism which has no mechanism for saving a image taking lens from an optical axis wherein the image taking lens is collapsed while being disposed on the optical axis, the hollow portion is apt to be a dead space. To the contrary, according to the present embodiment, both the focus lens 113 and the rear elements lens 112 are out of the optical axis and is saved to the hollow portion 104. Thus, the hollow portion 104 is effectively used and thereby implementing further thinness of the lens structure as compared with the conventional ones.

Figure 18:
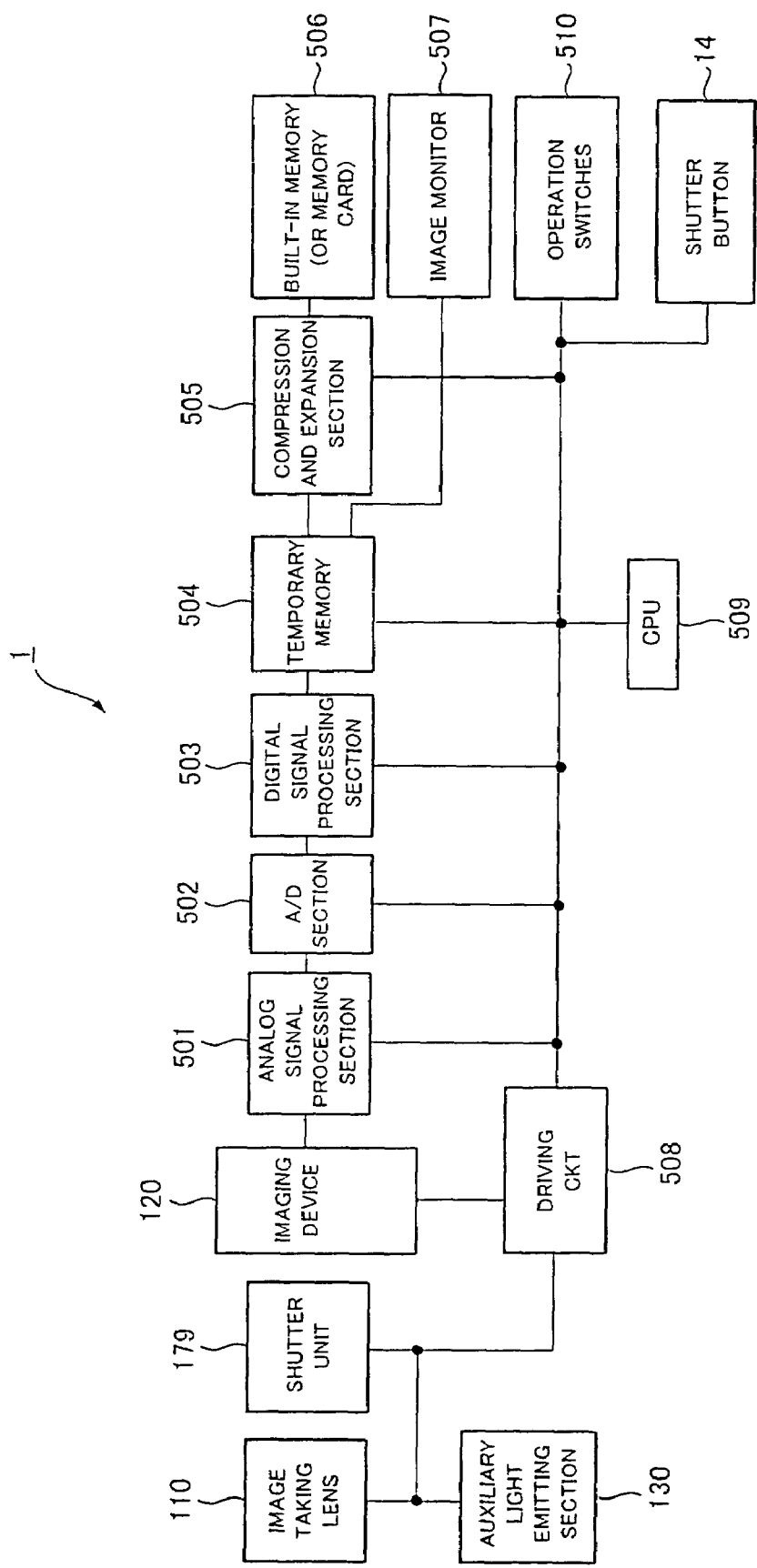
FIG. 18 is a block diagram of a circuit structure of the digital camera shown in FIG. 1 to FIG. 17.

FIG. 18 is a block diagram of a circuit structure of the digital camera shown in FIG. 1 to FIG. 16.

The digital camera 1 is provided with the image taking lens 110, the shutter unit 179, and the CCD imaging device 120, as mentioned above. A subject image formed on the CCD imaging device 120 via the image taking lens 110 and the shutter unit 179 is converted into an analog image signal by the CCD imaging device 120. The shutter unit 179 serves to suppress generation of smear due to light when analog signals are read from the CCD imaging device 120.

The digital camera 1 is further provided with an auxiliary light emitting section 130. The auxiliary light emitting section 130 emits an auxiliary light at the time of a low illumination. The auxiliary light emitting section 130 may emit the auxiliary light at any necessary time other than the low illumination.

The digital camera 1 is further provided with an analog signal processing section 501, an A/D section 502, a digital signal processing section 503, a temporary memory 504, a compression and expansion section 505, a built-in memory (or a memory card) 506, an image monitor 507, and a driving circuit 508. The CCD imaging device 120 is driven by a timing generated from a timing generating circuit (not illustrated) of the driving circuit 508, and outputs an analog image signal. The driving circuit 508 includes driving circuits for driving the image taking lens 110, the shutter unit 179 and the auxiliary light emitting section 130. The analog image signal outputted from the CCD imaging device 120 is subjected to an analog signal processing by the analog signal processing section 501, an A/D conversion by the A/D section 502, and a digital signal processing by the digital signal processing section 503. Data representative of the signal subjected to the digital signal processing is temporarily stored in the temporary memory 504. The data stored in the temporary memory 504 is compressed by the compression and expansion section 505 and is recorded into the built-in memory (or a memory card) 506. Incidentally, in some photographic mode, it is acceptable that the data is recorded directly into the built-in memory 506 omitting the process of the compression. The data stored in the temporary memory 504 is read to the image monitor 507 so that an image of the subject is displayed on the image monitor 507.

The digital camera 1 is further provided with a CPU 509 for controlling the camera in its entirety, operation switches 510 including a zoom operation switch, and a shutter button 14. Photography is performed when the shutter button 14 is depressed through setting to a desired photographic state including setting to a desired angle of view by operation of the operation switches 510.

Next, there will be explained the second embodiment of the present invention. The perspective view and the circuit structure of the digital camera of the following second embodiment are the same as the perspective view (cf. FIG. 1 and FIG. 2) and the schematic circuit structure (cf. FIG. 18) of the digital camera of the first embodiment, and thus here there will be explained only the lens barrel which is different therebetween. In the following figures, the same parts are denoted by the same reference numbers as those of FIG. 3 to FIG. 17, and the redundant explanation will be omitted.

Figure 19:
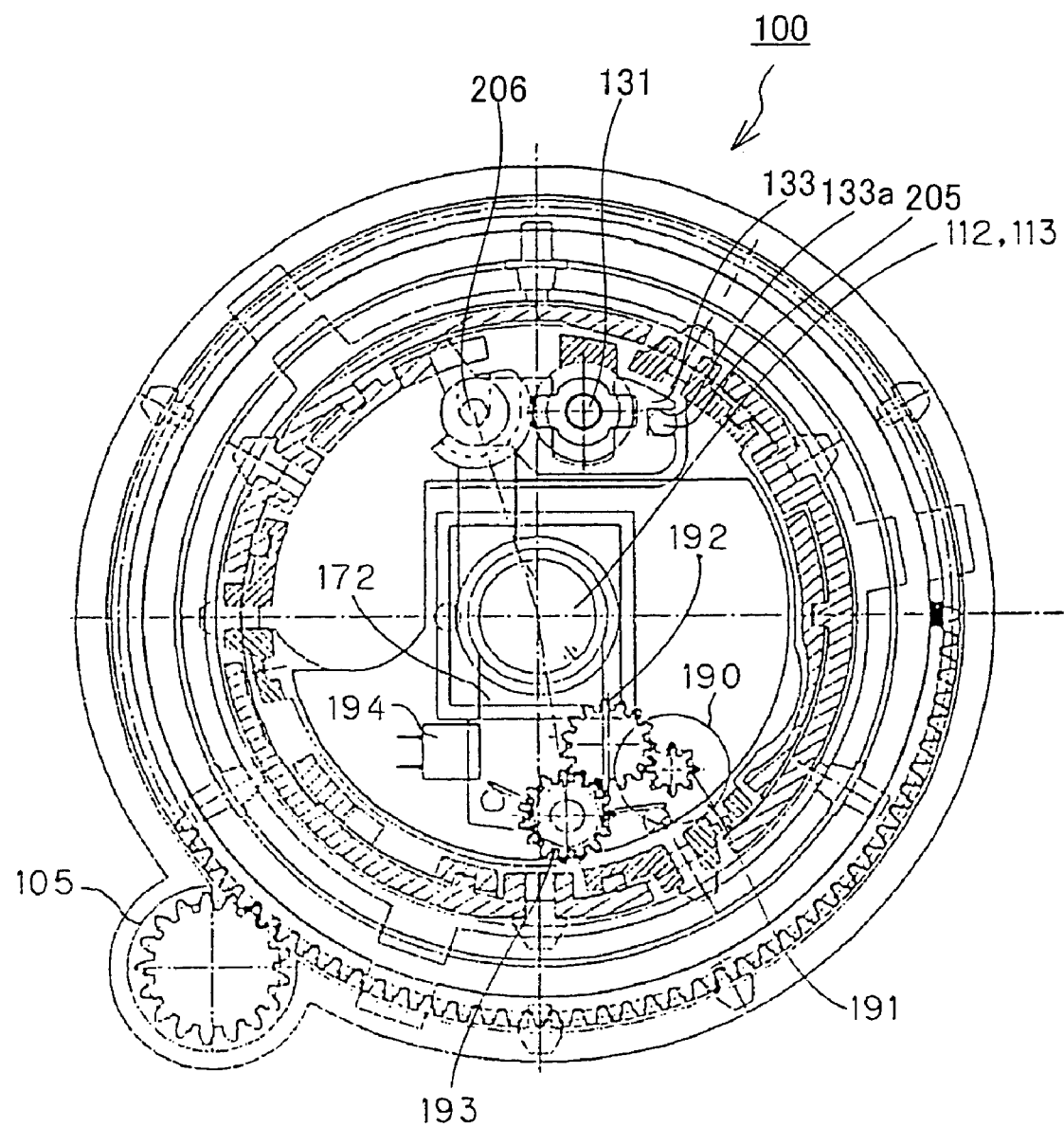
FIG. 19 is a typical illustration showing main parts of the digital camera of a second embodiment of the present invention, looking from an optical axis direction a lens barrel in a state of an extension.
Figure 20:
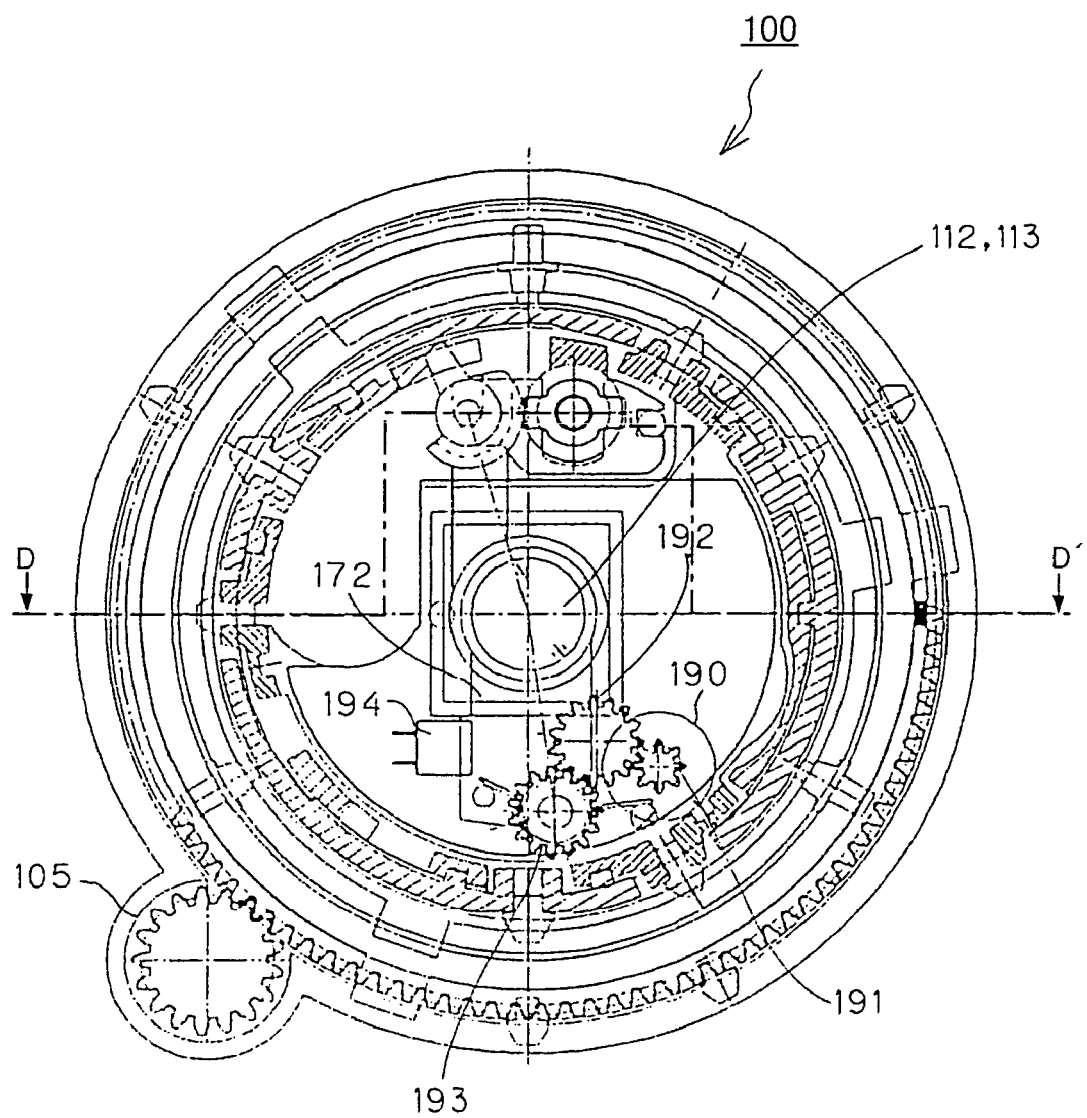
FIG. 20 is a view showing the line D-D' on the same sectional view as FIG. 19.
Figure 21:
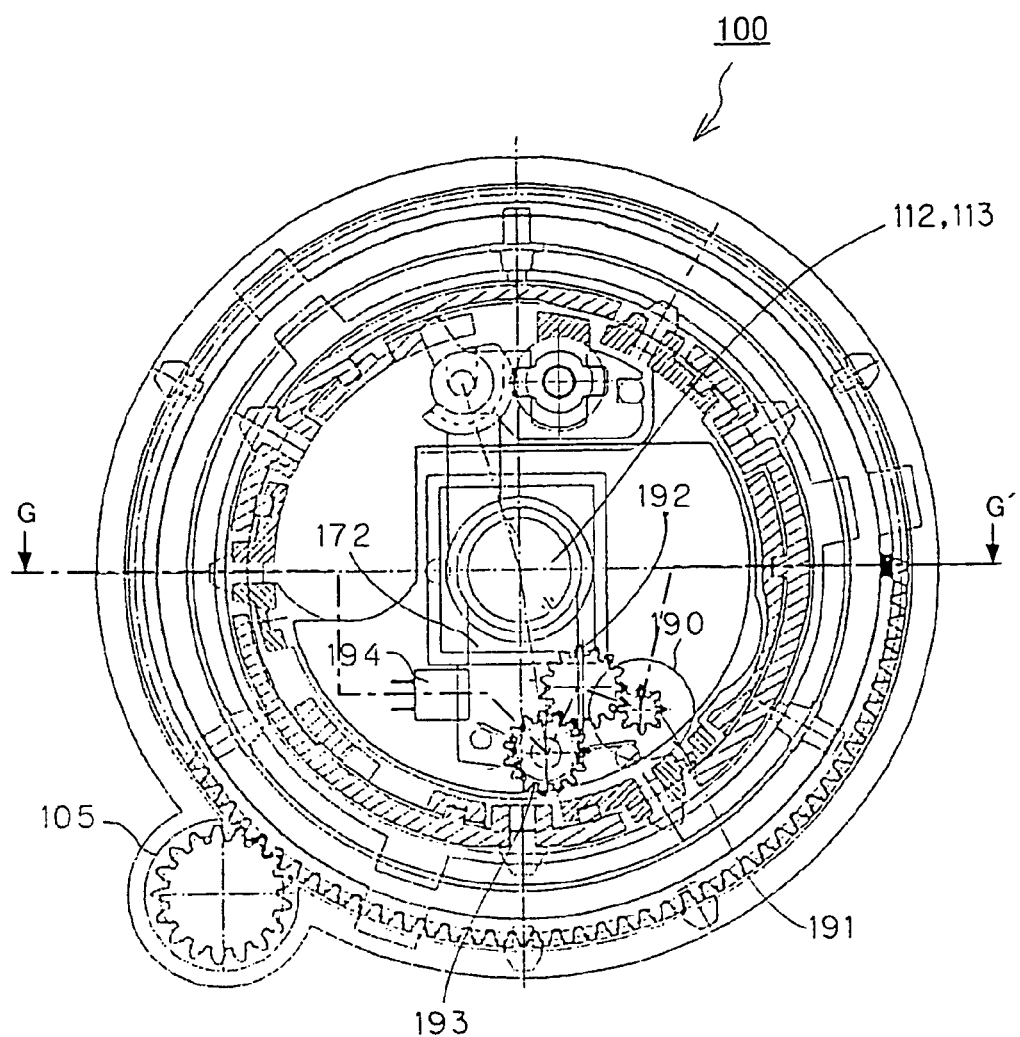
FIG. 21 is a view showing the line G-G' on the same sectional view as FIG. 19.
Figure 22:
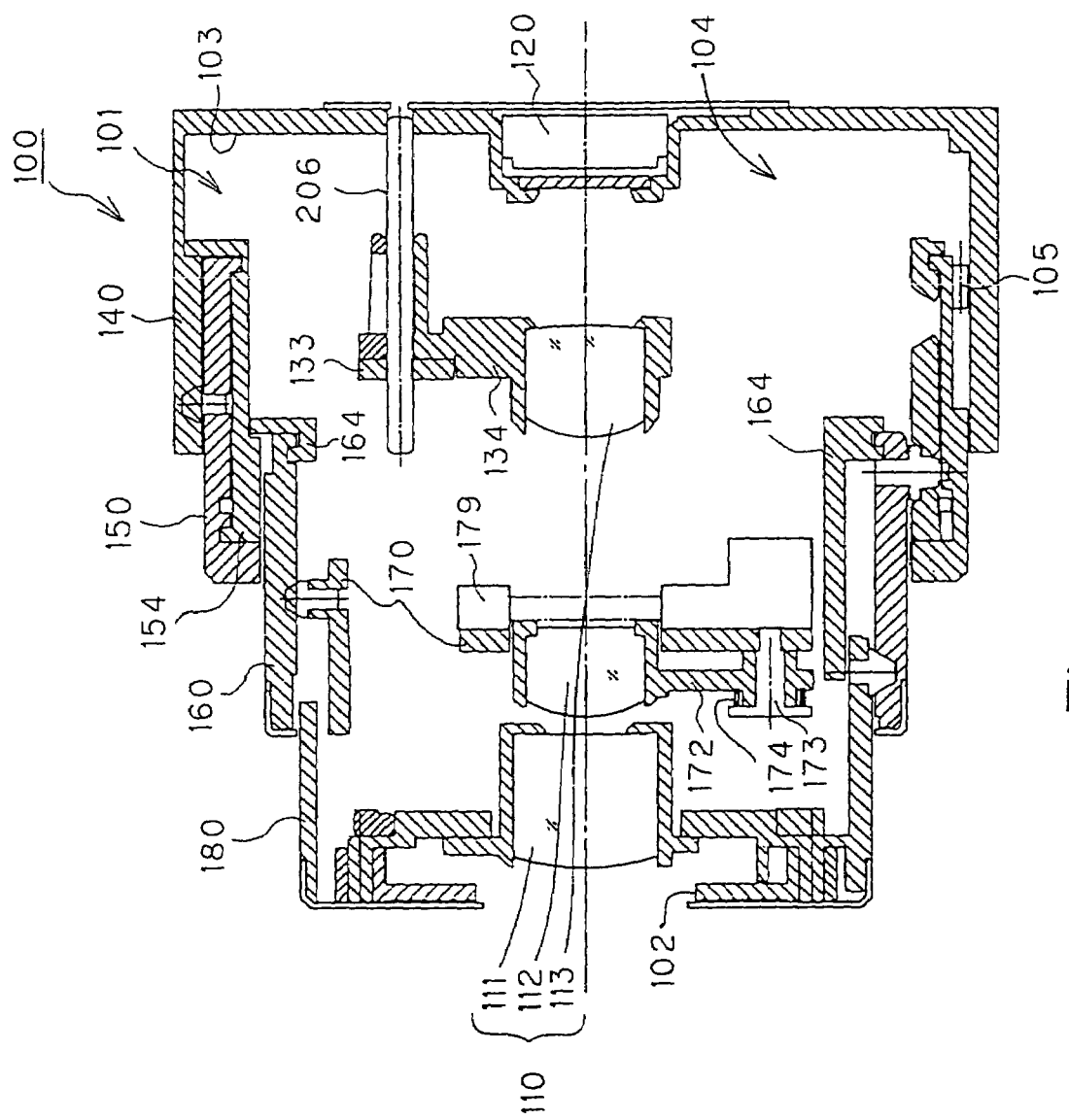
FIG. 22 is a sectional view showing a state of a tele-edge where the focal length is longest, taken along the same line as the line A-A' in FIG. 4 related to the first embodiment.
Figure 23:
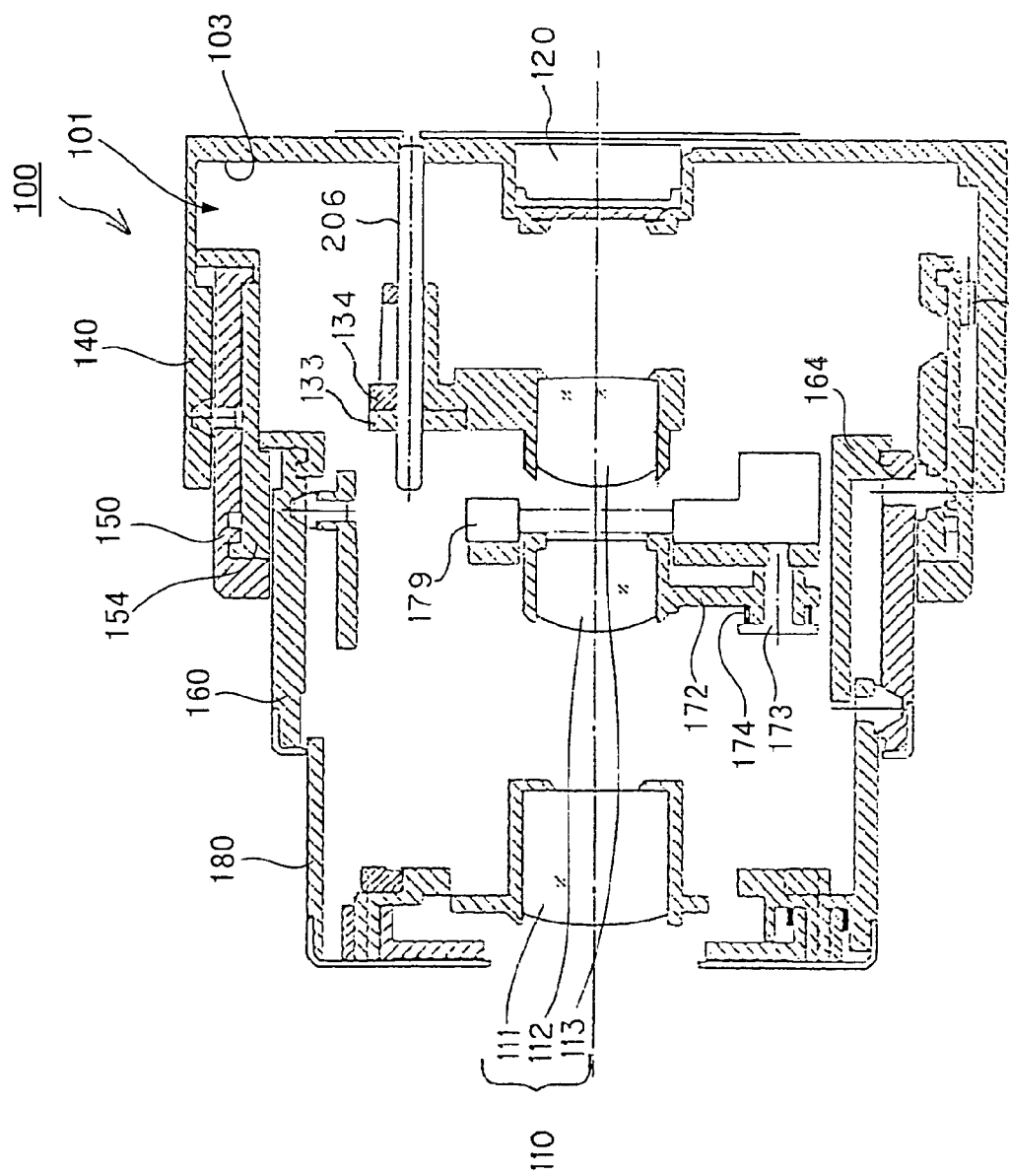
FIG. 23 is a sectional view showing a state of a wide-edge where the focal length is shortest, taken along the same line as FIG. 22.
Figure 24:
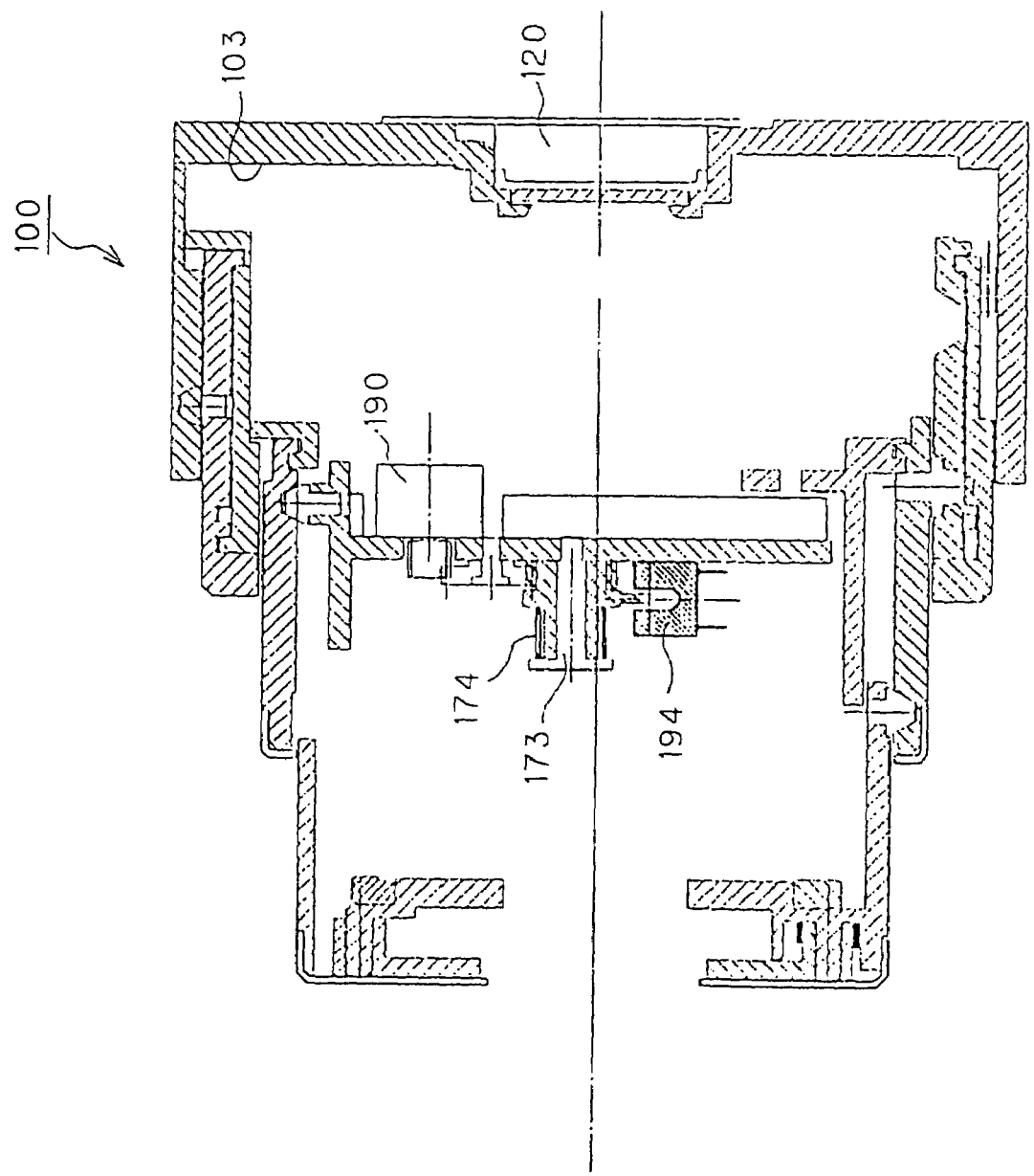
FIG. 24 is a sectional view showing main parts in a state of the wide-edge, taken along the line G-G' in FIG. 21.
Figure 25:
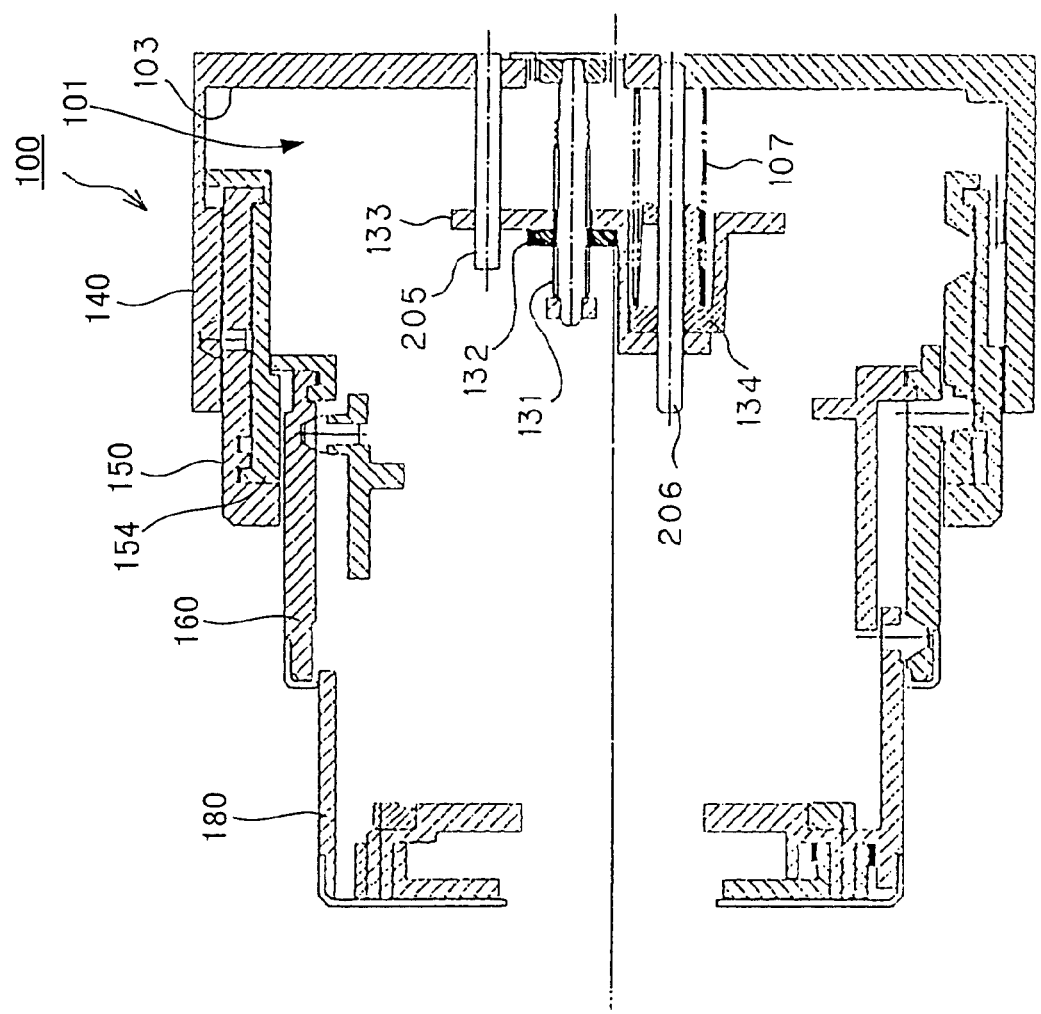
FIG. 25 is a sectional view showing main parts in a state of the wide-edge, taken along the line D-D' in FIG. 20.
Figure 26:
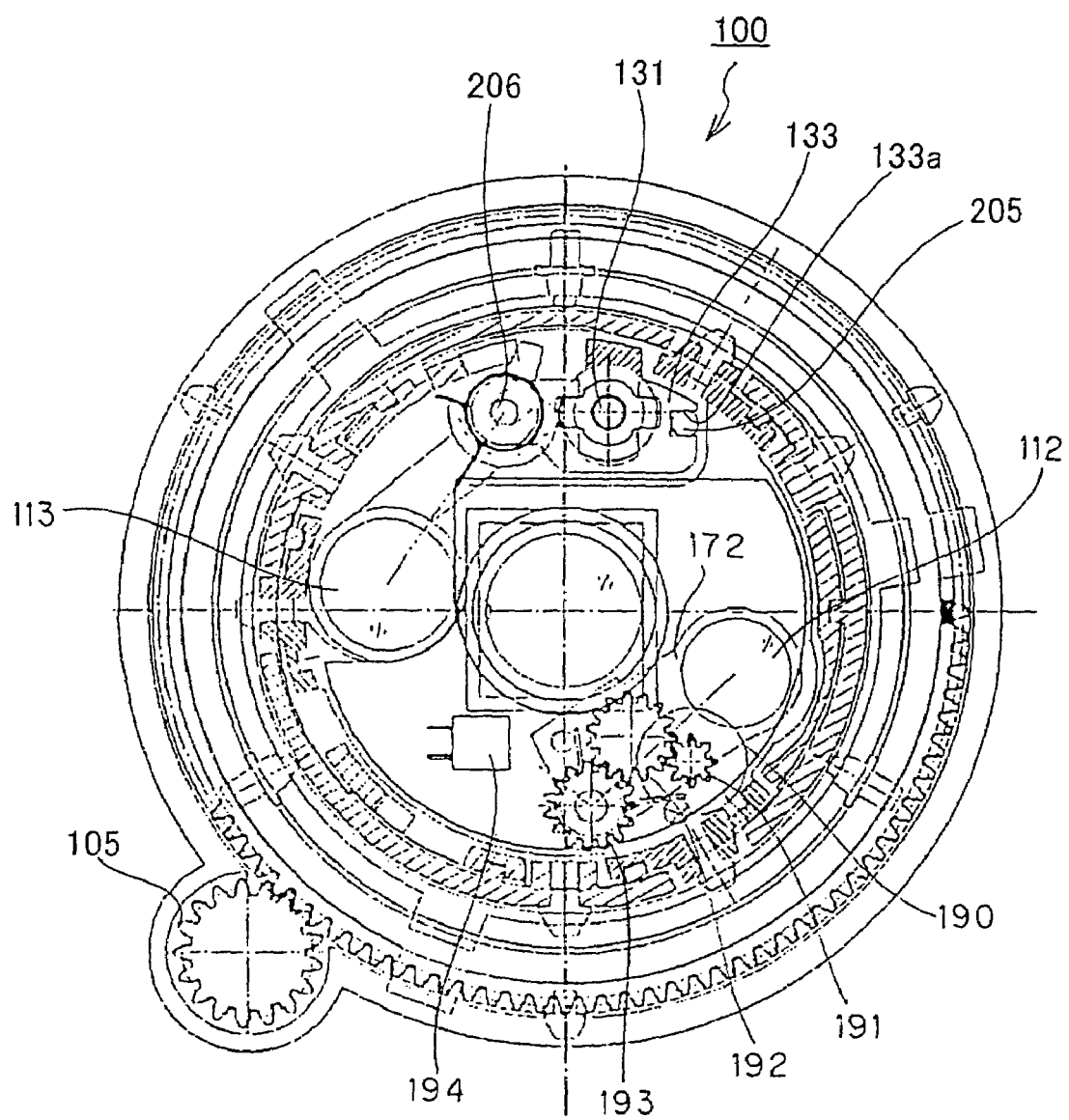
FIG. 26 is a typical illustration showing main parts of the digital camera of the second embodiment of the present invention, looking from an optical axis direction a lens barrel in a state of a collapse.
Figure 27:
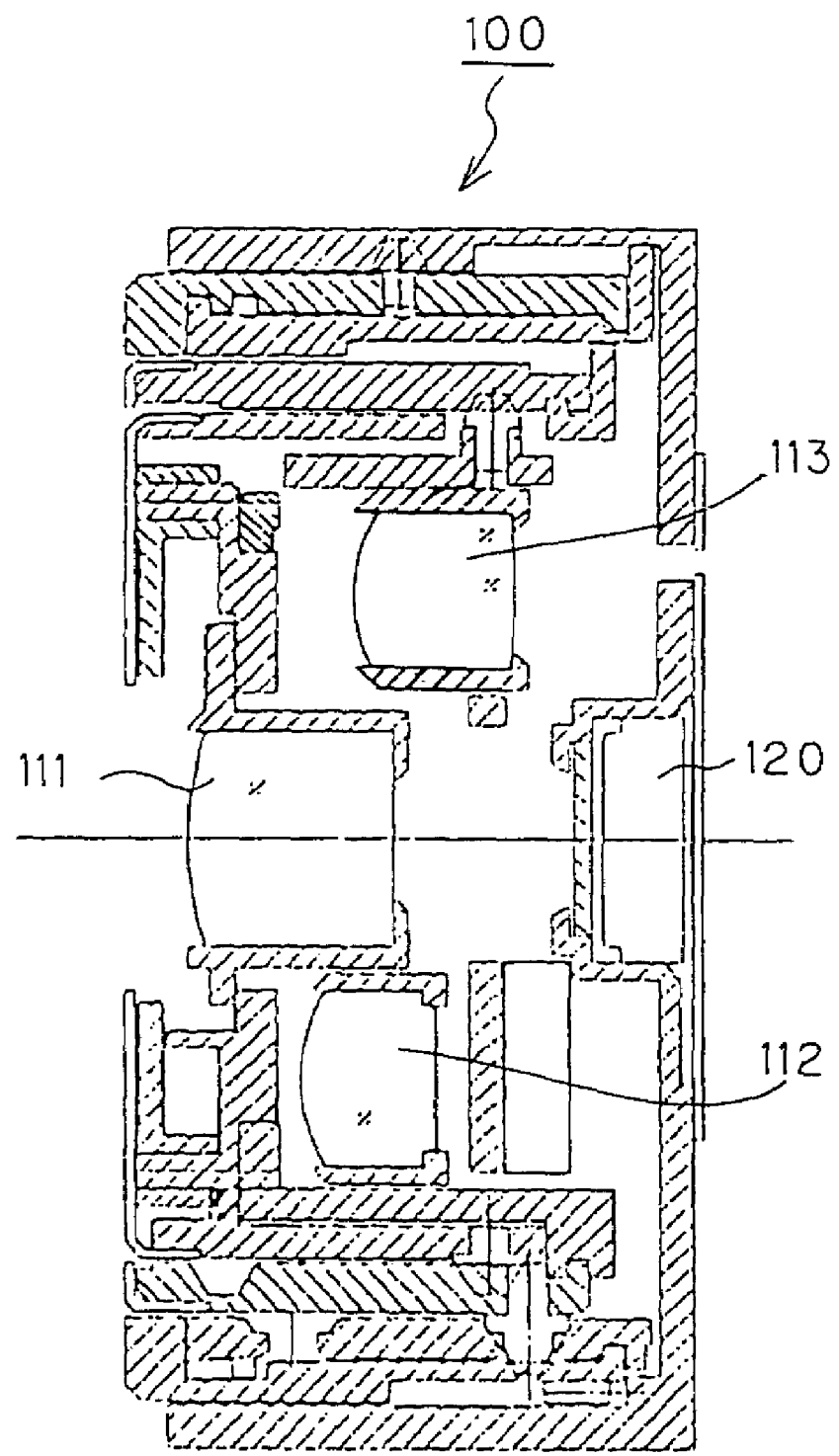
FIG. 27 is a sectional view taken along the same line as the line C-C' shown in FIG. 13 related to the first embodiment.
Figure 28:
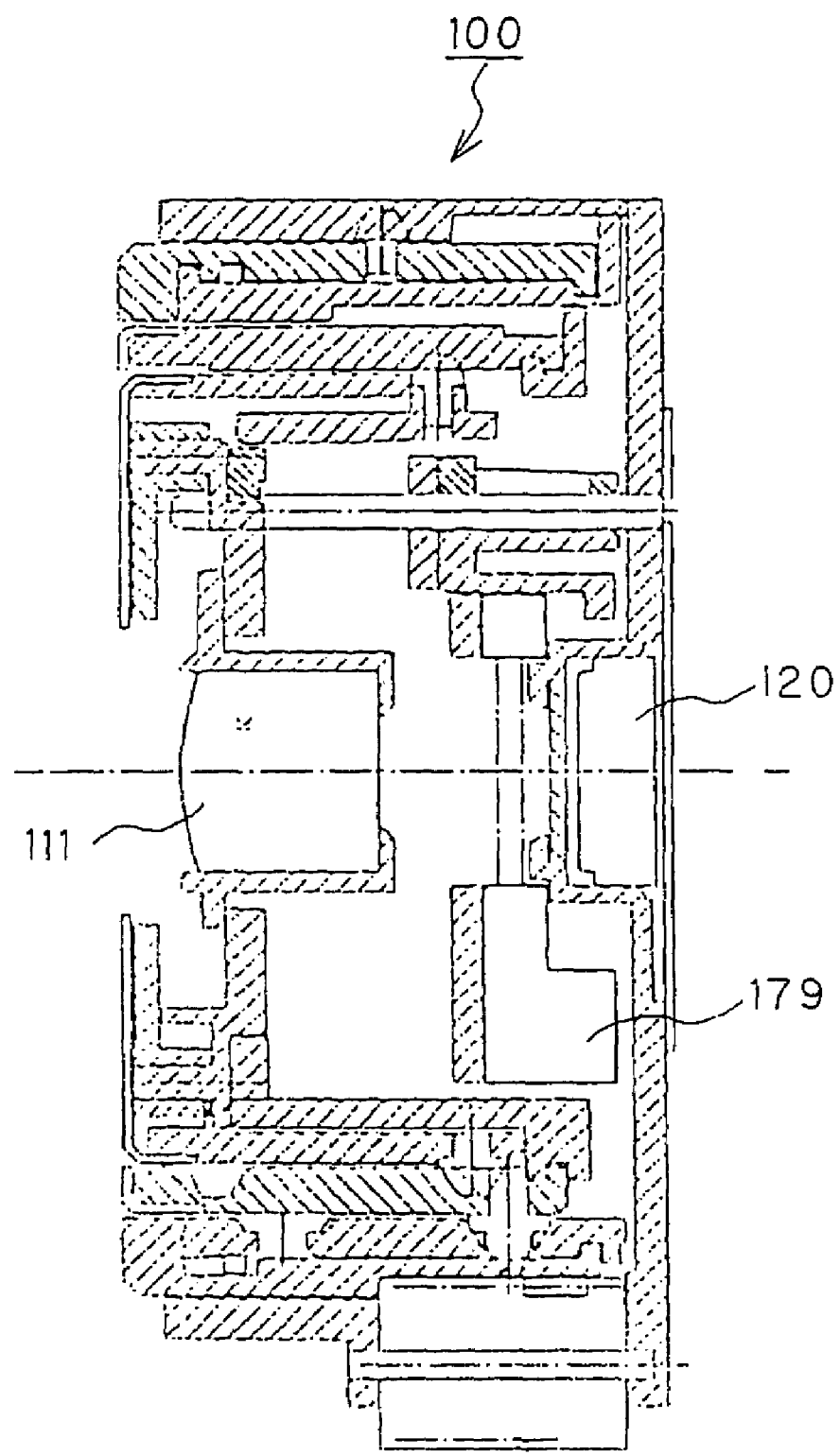
FIG. 28 is a sectional view taken along the same line as the line B-B' shown in FIG. 13 related to the first embodiment.

FIG. 19 is a typical illustration showing main parts of the digital camera of a second embodiment of the present invention, looking from an optical axis direction a lens barrel in a state of an extension. And FIG. 19 is a sectional view taken along the same line as the line F-F' in FIG. 8 related to the above-mentioned first embodiment associated with FIG. 22 which will be described later. FIG. 20 is a view showing the line D-D' on the same sectional view as FIG. 19. FIG. 21 is a view showing the line G-G' on the same sectional view as FIG. 19. FIG. 22 is a sectional view showing a state of a tele-edge where the focal length is longest, taken along the same line as the line A-A' in FIG. 4 related to the first embodiment associated with FIG. 19. FIG. 23 is a sectional view showing a state of a wide-edge where the focal length is shortest, taken along the same line as FIG. 22. FIG. 24 is a sectional view showing main parts in a state of the wide-edge, taken along the line G-G' in FIG. 21. FIG. 25 is a sectional view showing main parts in a state of the wide-edge, taken along the line D-D' in FIG. 20. FIG. 26 is a typical illustration showing main parts of the digital camera of the second embodiment of the present invention as shown in FIG. 19 to FIG. 25, looking from an optical axis direction a lens barrel in a state of a collapse. And FIG. 26 is a sectional view taken along the same line as the line E-E' shown in FIG. 15 related to the above-mentioned first embodiment associated with FIG. 27 which will be described later. FIG. 27 is a sectional view taken along the same line as the line C-C' shown in FIG. 13 related to the first embodiment. FIG. 28 is a sectional view taken along the same line as the line B-B' shown in FIG. 13 related to the first embodiment.

In case of the first embodiment, the shutter unit 179 is disposed in the optical axis direction ahead with respect to the rear elements guide frame 170, and the rear elements holding frame 172 is disposed in the optical axis direction back with respect to the rear elements guide frame 170. To the contrary, according to the second embodiment, the shutter unit 179 is disposed in the optical axis direction back with respect to the rear elements guide frame 170, and the rear elements holding frame 172 is disposed in the optical axis direction ahead with respect to the rear elements guide frame 170.

Further, according to the second embodiment, the geometry of the focus lens 113 and the geometry of the focus lens holding frame 134 for holding the focus lens 113 are different from those of the first embodiment.

Still further, according to the second embodiment, there is provided no convex portion 209, which projects from the wall member 103 in FIG. 10 related to the first embodiment, and also no lever member 175 which engages with the convex portion.

Instead, the digital camera according to the second embodiment is provided with a stepping motor 190, a driving gear 191 for transmitting a rotary driving force of the stepping motor 190 to the rear elements holding frame 172, the driving gear 191 being fixed on a rotary shaft of the stepping motor 190, a transmission gear 192 for transmitting the driving force, a receiving gear 193 fixed on the rear elements holding frame 172, and a photo-interrupter 194 for detecting that the rear elements holding frame 172 is on the optical axis.

The rear elements lens 112 revolves between a position on the optical axis and the saving position when the rotary driving force of the stepping motor 190 is transmitted via the driving gear 191, the transmission gear 192 and the receiving gear 193 to the rear elements holding frame 172, so that the rear elements holding frame 172 rotatably moves around the rotary shaft 173. Also in the second embodiment, as shown in FIG. 22, there is provided the coil spring 174 around the rotary shaft 173, so that the rear elements lens 112 may stably stop at the position on the optical axis by the enabling force of the coil spring 174.

As in the second embodiment, it is acceptable that there is provided an additional driving source for revolving the rear elements lens 112 by means of rotatably moving the rear elements holding frame 172, separately from the driving source for collapse and extension of the lens barrel.

In case of the second embodiment, as shown in FIG. 27, it is possible to define a plane vertical to the optical axis, which crosses all three groups constituting the image taking lens 110 at the time of the collapse, that is, the front elements lens 111, the rear elements lens 112 and the focus lens 113. Saving of the rear elements lens 112 and the focus lens 113 in such a manner that the three groups of lenses form a line substantially on a plane also makes it possible to contribute to effectively implementing further thinness of the digital camera.

Figure 29:
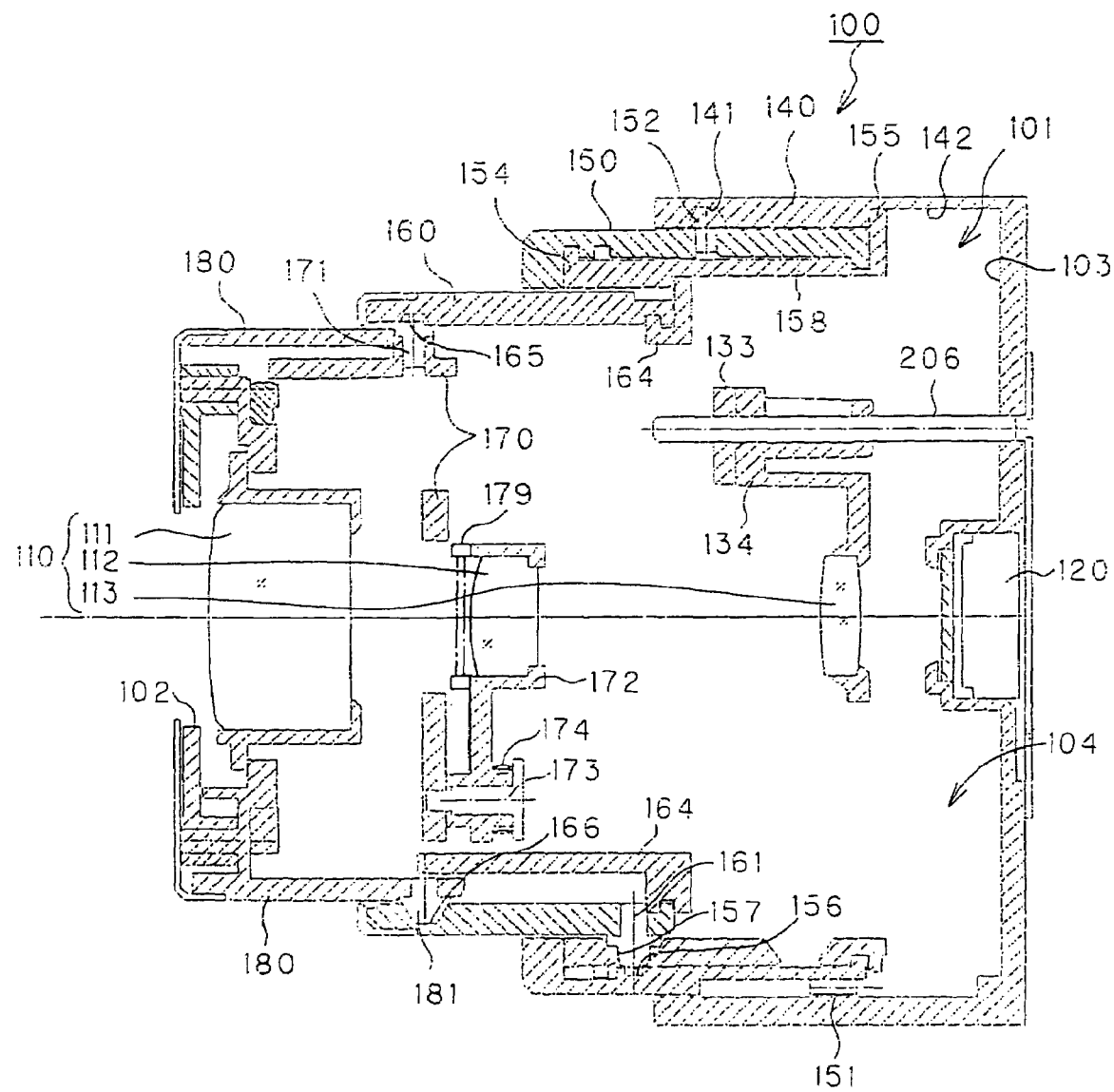
FIG. 29 is a sectional view showing a state of a tele-edge where the focal length is longest, of a digital camera of the third embodiment.
Figure 30:
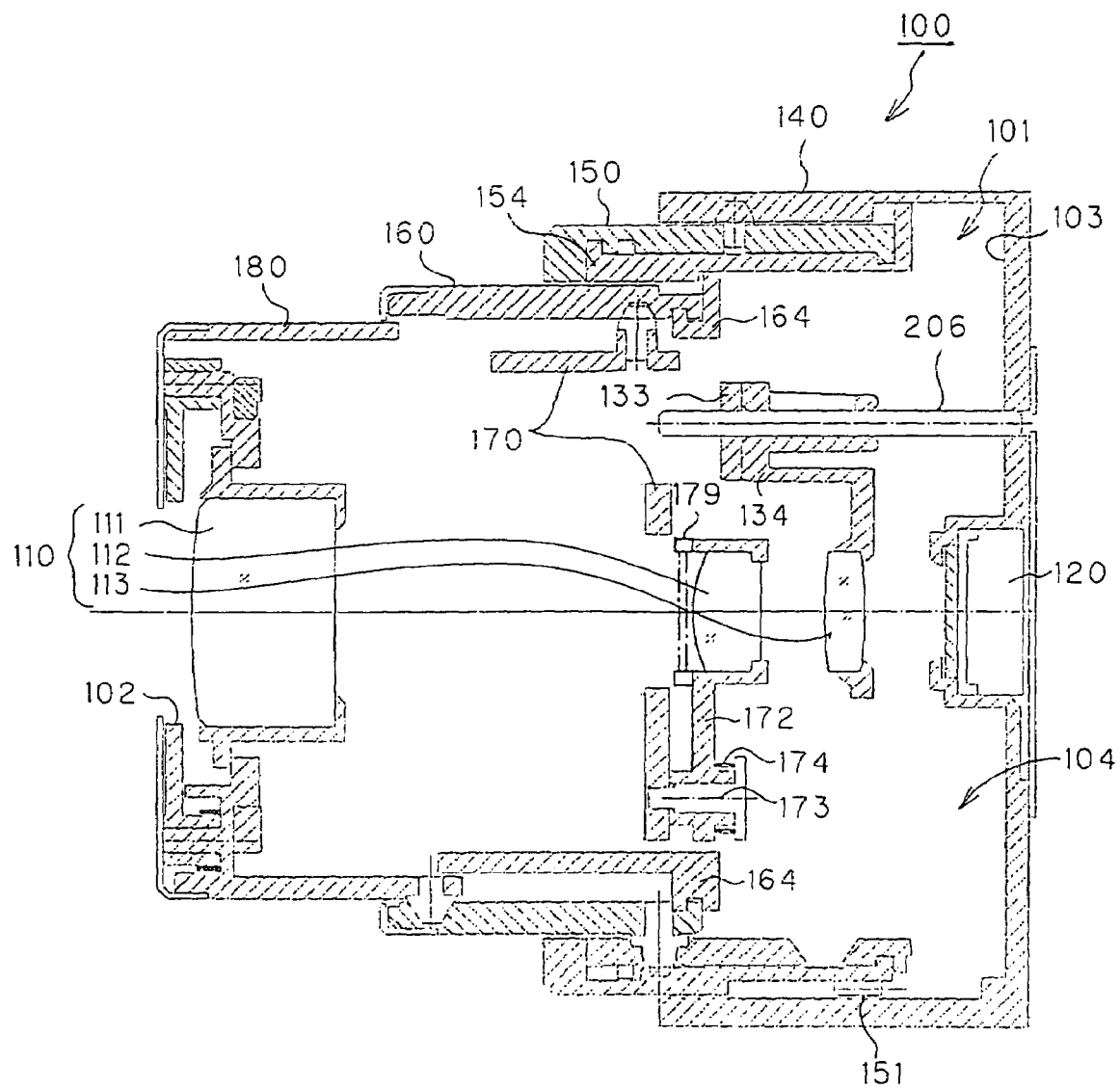
FIG. 30 is a sectional view showing a state of a wide-edge where the focal length is shortest, of the digital camera of the third embodiment.
Figure 31:
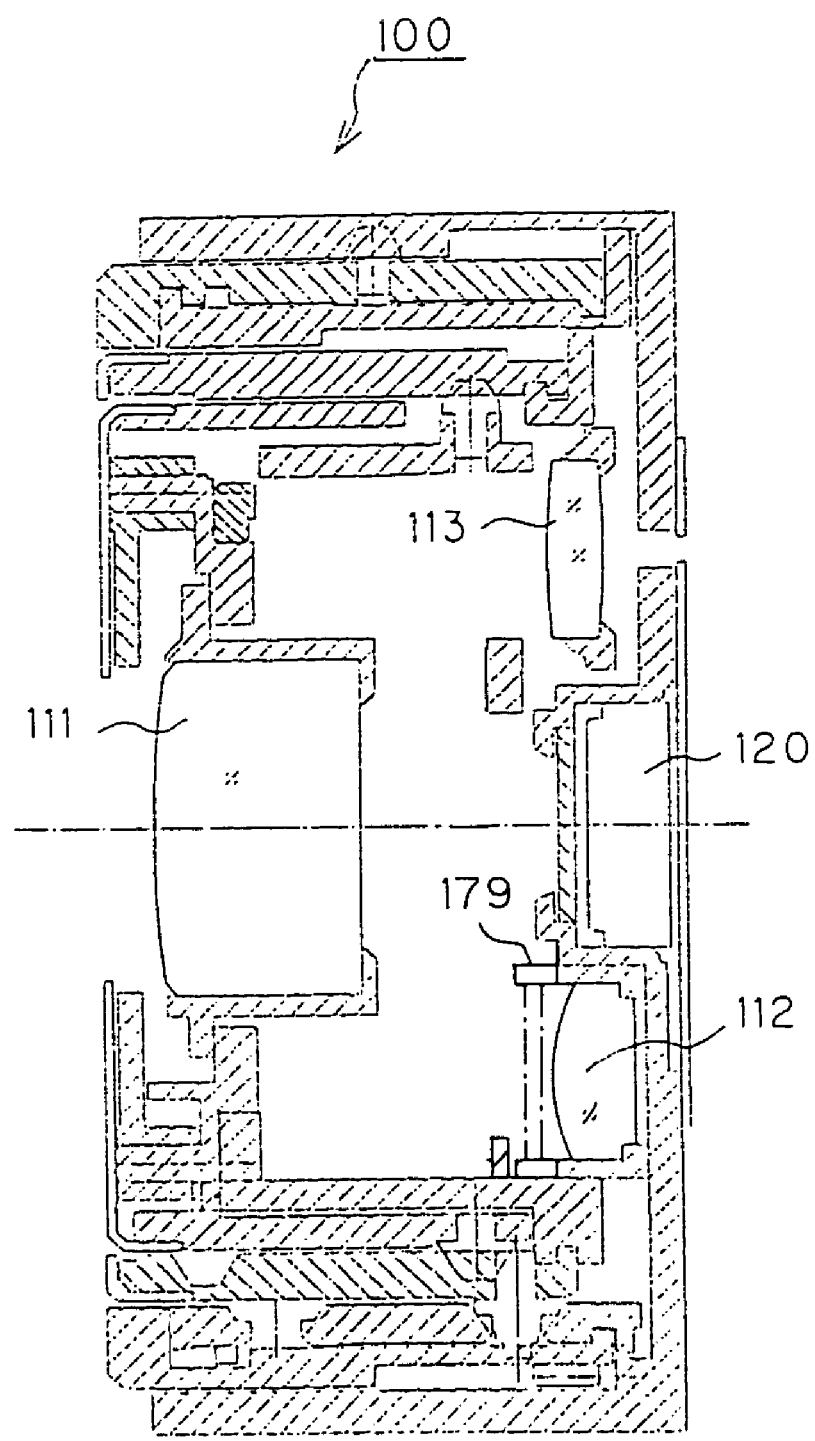
FIG. 31 is a sectional view showing a collapsed state of the digital camera of the third embodiment, taken along an optical axis.

FIG. 29 is a sectional view showing a state of a tele-edge where the focal length is longest, of a digital camera of the third embodiment. FIG. 30 is a sectional view showing a state of a wide-edge where the focal length is shortest, of the digital camera of the third embodiment. FIG. 31 is a sectional view showing a collapsed state of the digital camera of the third embodiment, taken along an optical axis.

FIG. 29, FIG. 30 and FIG. 31 correspond to FIG. 7, FIG. 9 and FIG. 14, respectively, which relate to the first embodiment. A different point from the first embodiment is as follows. According to the first embodiment, the shutter unit 179 is fixed on the rear elements guide frame 170. On the other hand, according to the third embodiment, the shutter unit 179 is fixed on the rear elements holding frame 172. The shutter unit 179 is disposed in front of the rear elements lens 112. The shutter unit 179 is concerned with a system in which a light quantity is controlled using an electrooptical element such as a liquid crystal and a PLZT (a polarizing plate). The shutter unit 179 incorporates thereinto an aperture for controlling a light quantity passing through the aperture by controlling the aperture caliber and a shutter for controlling a light quantity passing through the shutter by controlling the shutter time.

The shutter unit 179 is fixed on the rear elements holding frame 172 for holding the rear elements lens 112. And thus at the time of the collapse, as shown in FIG. 31, the shutter unit 179 saves to the rear elements saving position set up on the hollow portion 104 together with the rear elements lens 112, and at the time of the extension, as shown in FIG. 29 and FIG. 30, the shutter unit 179 advances on the optical axis together with the rear elements lens 112.

The mechanism for the save and advance involved in the collapse and extension is the same as that of the first embodiment, and thus redundant explanation will be omitted.

Figure 32:
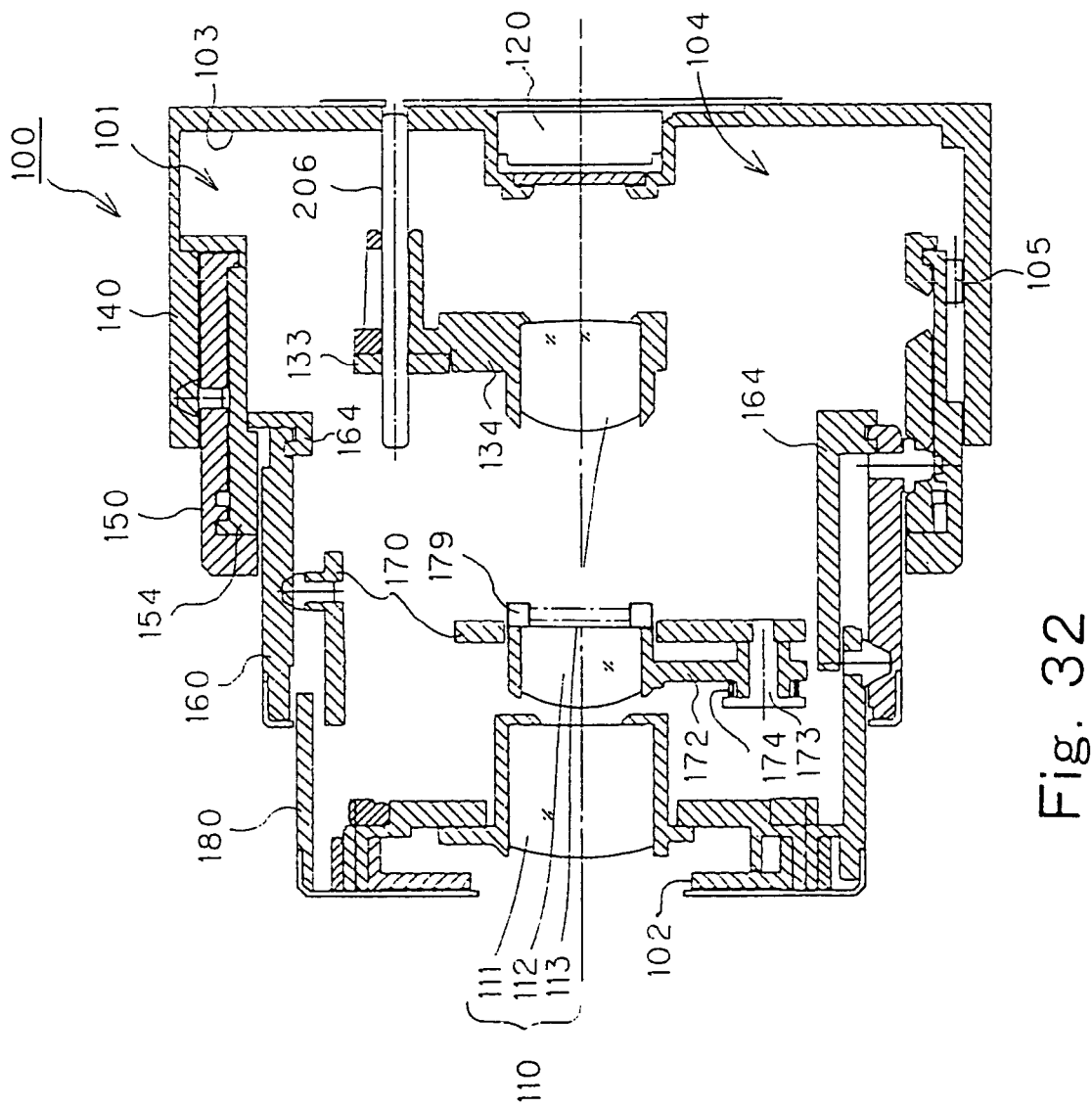
FIG. 32 is a sectional view showing a state of a tele-edge where the focal length is longest, of a digital camera of the fourth embodiment.
Figure 33:
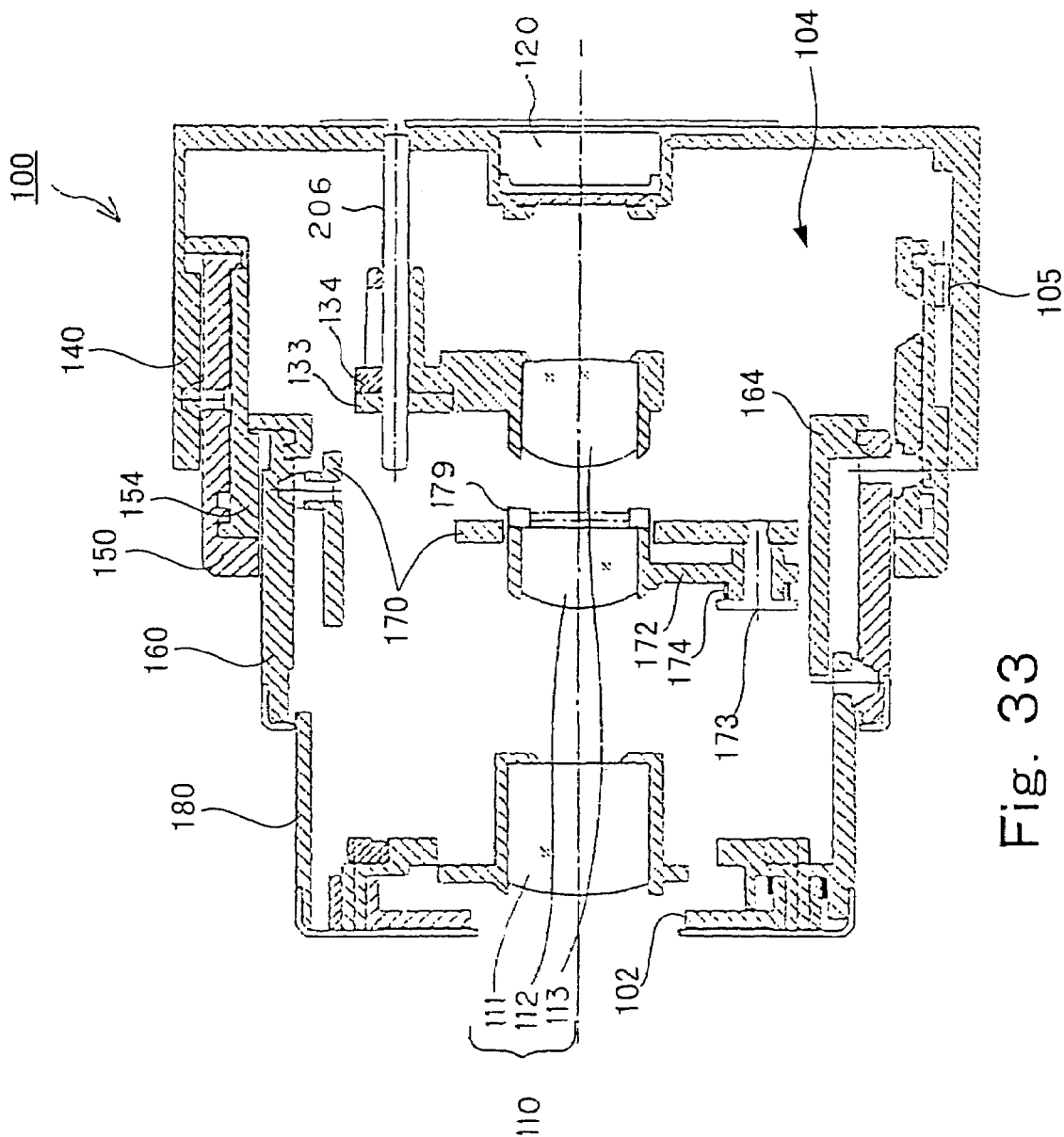
FIG. 33 is a sectional view showing a state of a wide-edge where the focal length is shortest, of the digital camera of the fourth embodiment.
Figure 34:
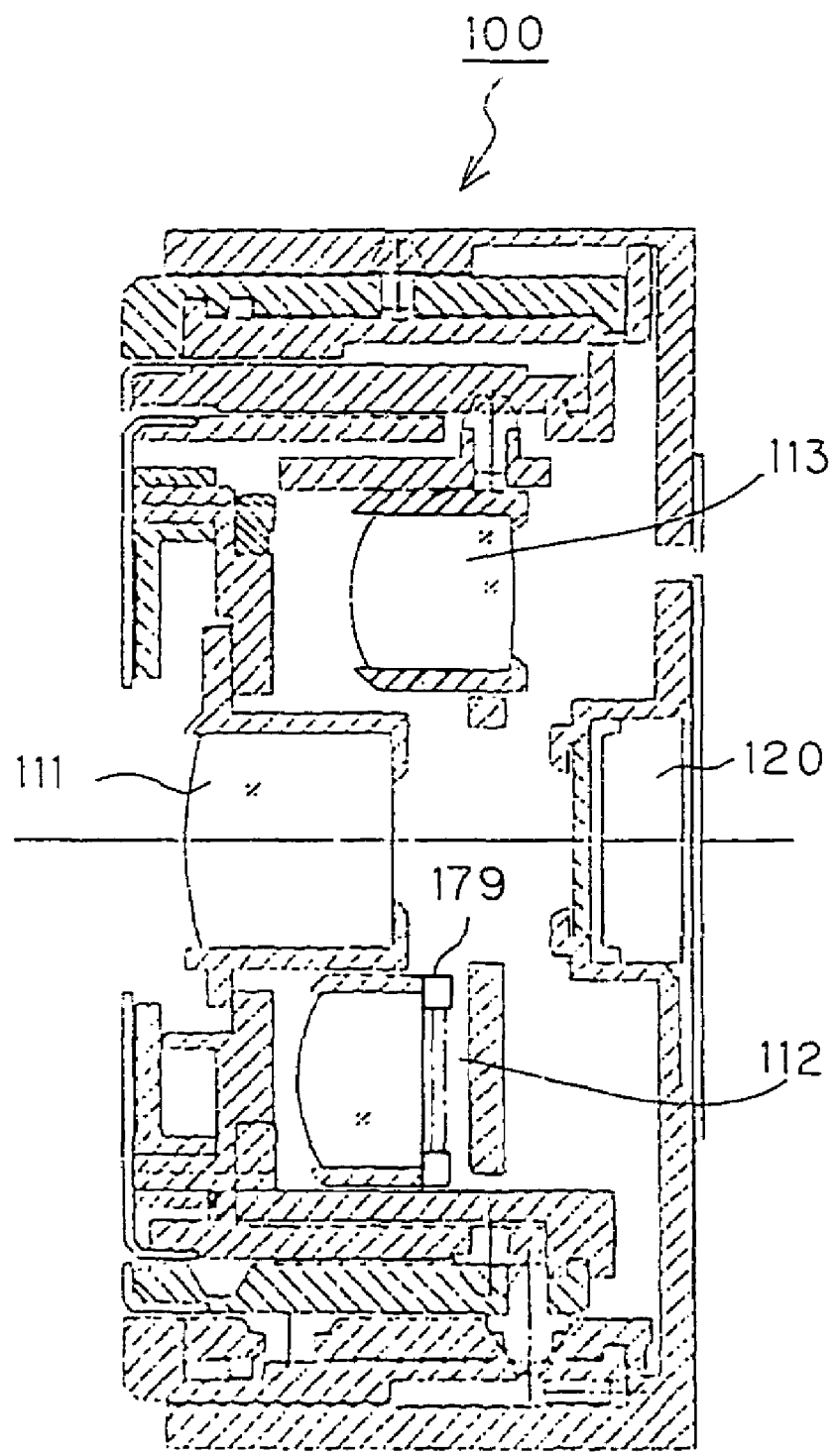
FIG. 34 is a sectional view showing a collapsed state of the digital camera of the fourth embodiment, taken along an optical axis.

FIG. 32 is a sectional view showing a state of a tele-edge where the focal length is longest, of a digital camera of the fourth embodiment. FIG. 33 is a sectional view showing a state of a wide-edge where the focal length is shortest, of the digital camera of the fourth embodiment. FIG. 34 is a sectional view showing a collapsed state of the digital camera of the fourth embodiment, taken along an optical axis.

FIG. 32, FIG. 33 and FIG. 34 correspond to FIG. 22, FIG. 23 and FIG. 27, respectively, which relate to the second embodiment. A different point from the second embodiment is as follows. According to the second embodiment, in a similar fashion to that of the first embodiment, the shutter unit 179 is fixed on the rear elements guide frame 170. On the other hand, according to the fourth embodiment, the shutter unit 179 is disposed backward in the optical axis direction of the rear elements lens 112 (this is different from the third embodiment shown in FIG. 29 to FIG. 31) and is fixed on the rear elements holding frame 172. The shutter unit 179 is concerned with a system in which a light quantity is controlled using an electrooptical element such as a liquid crystal and a PLZT (a polarizing plate), in a similar fashion to that of the third embodiment. The shutter unit 179 incorporates thereinto an aperture for controlling a light quantity passing through the aperture by controlling the aperture caliber and a shutter for controlling a light quantity passing through the shutter by controlling the shutter time.

The shutter unit 179 is fixed on the rear elements holding frame 172 for holding the rear elements lens 112. And thus at the time of the collapse, as shown in FIG. 34, the shutter unit 179 saves to the rear elements saving position set up to a position parallel to the front elements lens ill together with the rear elements lens 112, and at the time of the extension, as shown in FIG. 32 and FIG. 33, the shutter unit 179 advances on the optical axis together with the rear elements lens 112.

The mechanism for the save and advance involved in the collapse and extension is the same as that of the second embodiment, and thus redundant explanation will be omitted.

In the manner as mentioned above, according to the present invention, it is acceptable that the shutter unit is saved and advanced together with the rear elements lens in accordance with the collapse and extension.

Figure 35:
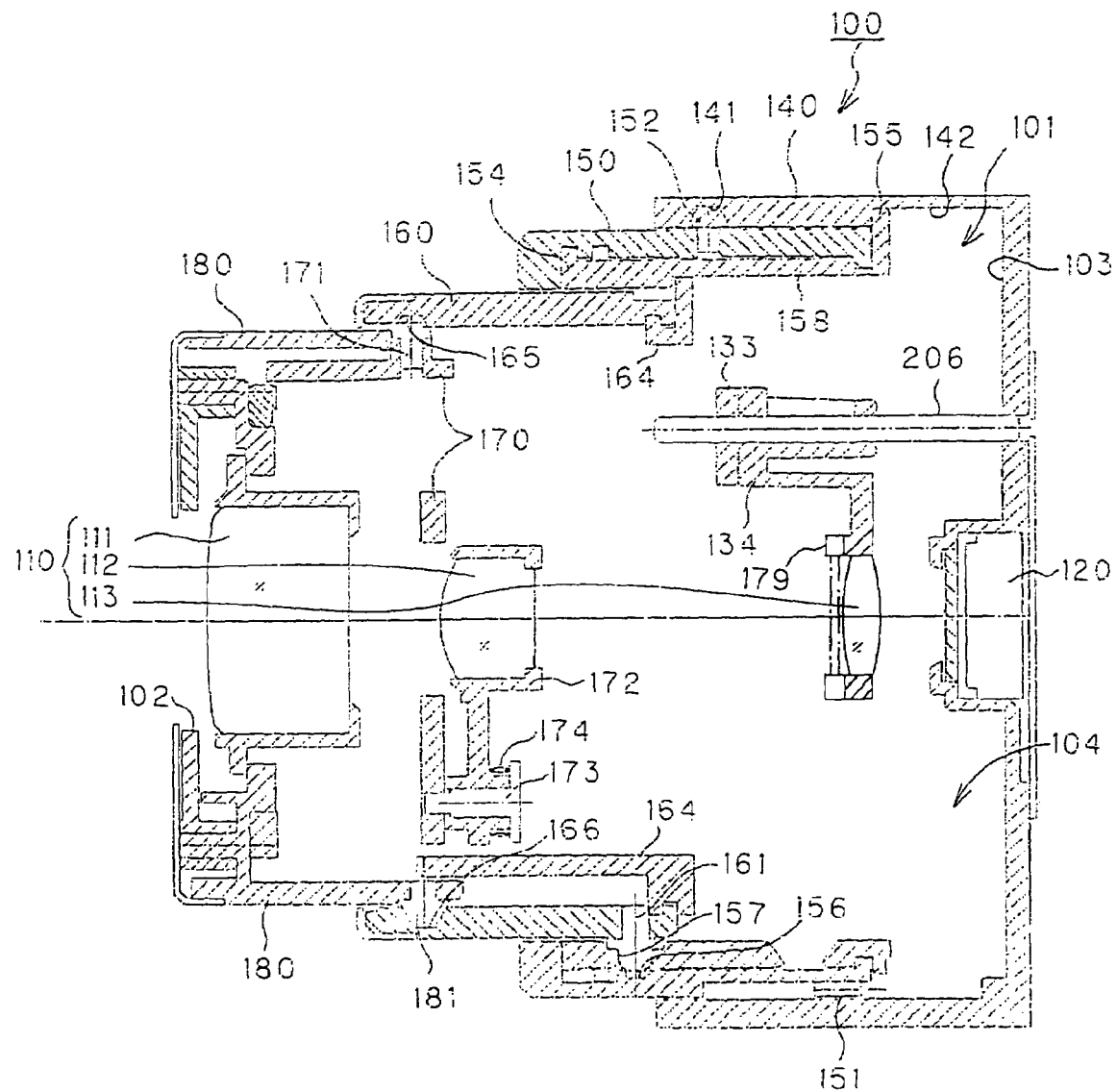
FIG. 35 is a sectional view showing a state of a tele-edge where the focal length is longest, of a digital camera of the fifth embodiment.
Figure 36:
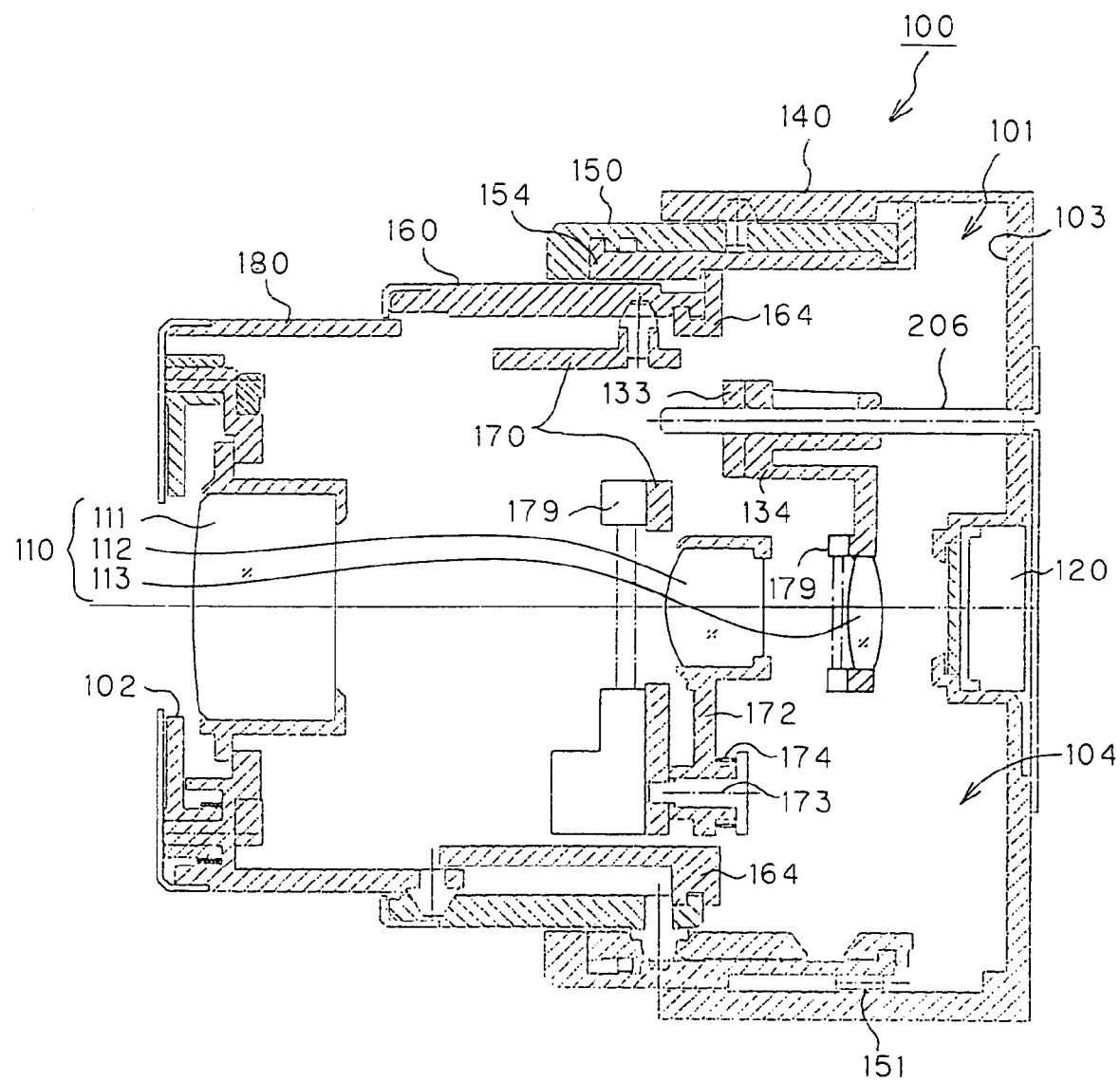
FIG. 36 is a sectional view showing a state of a wide-edge where the focal length is shortest, of the digital camera of the fifth embodiment.
Figure 37:
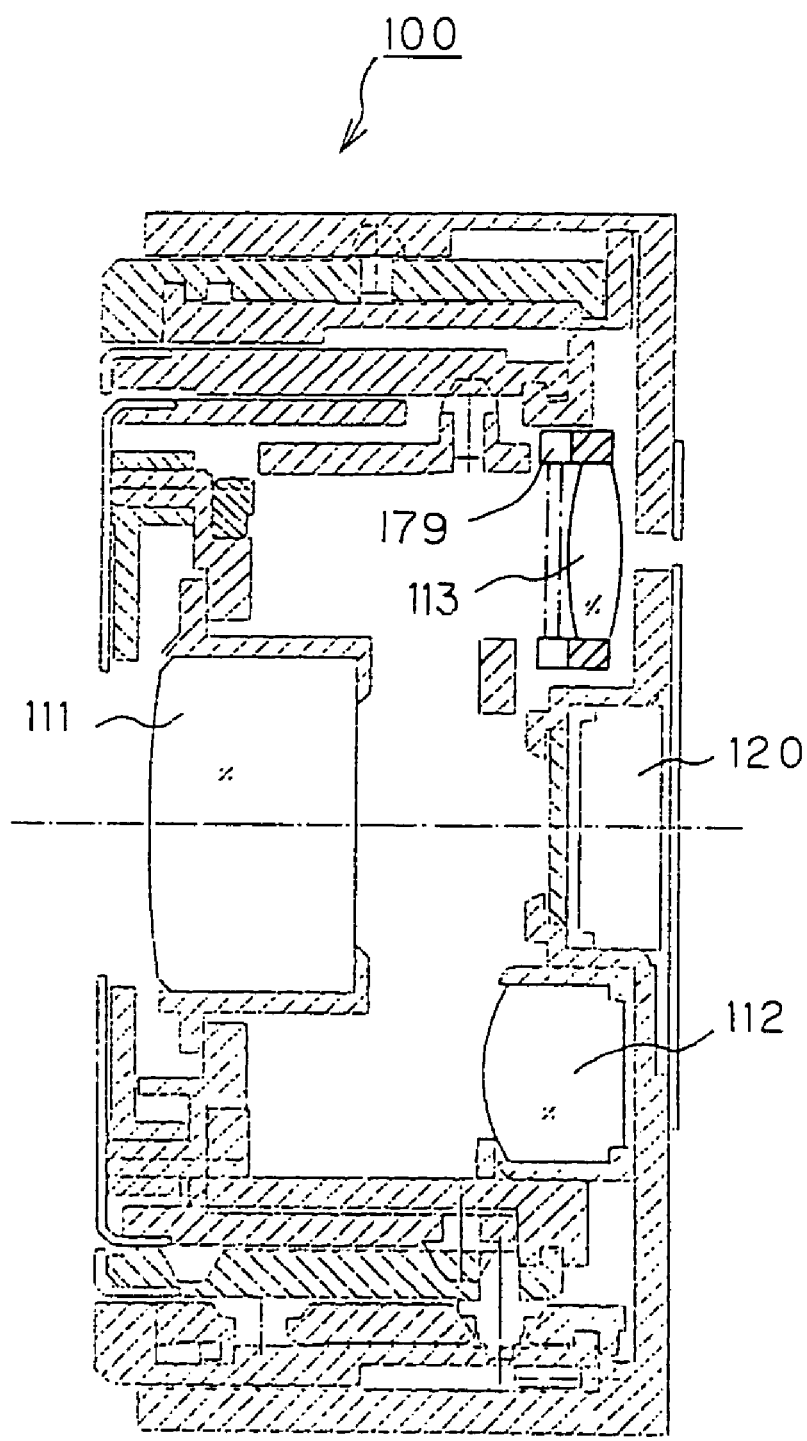
FIG. 37 is a sectional view showing a collapsed state of the digital camera of the fifth embodiment, taken along an optical axis.

FIG. 35 is a sectional view showing a state of a tele-edge where the focal length is longest, of a digital camera of the fifth embodiment, taken along the optical axis. FIG. 36 is a sectional view showing a state of a wide-edge where the focal length is shortest, of the digital camera of the fifth embodiment, taken along the optical axis. FIG. 37 is a sectional view showing a collapsed state of the digital camera of the fifth embodiment, taken along the optical axis.

FIG. 35, FIG. 36 and FIG. 37 correspond to FIG. 7, FIG. 9 and FIG. 14, respectively, which relate to the first embodiment. A different point from the first embodiment is follows. According to the first embodiment, the shutter unit 179 is fixed on the rear elements guide frame 170. On the other hand, according to the second embodiment, the shutter unit 179 is fixed on the focus lens holding frame 134. The shutter unit 179 is disposed in front of the focus lens 113. The shutter unit 179 is concerned with a system in which a light quantity is controlled using an electrooptical element such as a liquid crystal and a PLZT (a polarizing plate). The shutter unit 179 incorporates thereinto an aperture for controlling a light quantity passing through the aperture by controlling the aperture caliber and a shutter for controlling a light quantity passing through the shutter by controlling the shutter time.

The shutter unit 179 is fixed on the focus lens holding frame 134 for holding the focus lens 113. And thus at the time of the collapse, as shown in FIG. 37, the shutter unit 179 saves to the hollow portion 104 together with the focus lens 113, and at the time of the extension, as shown in FIG. 35 and FIG. 36, the shutter unit 179 advances on the optical axis together with the focus lens 113.

The mechanism for the save and advance involved in the collapse and extension is the same as that of the first embodiment, and thus redundant explanation will be omitted.

Figure 38:
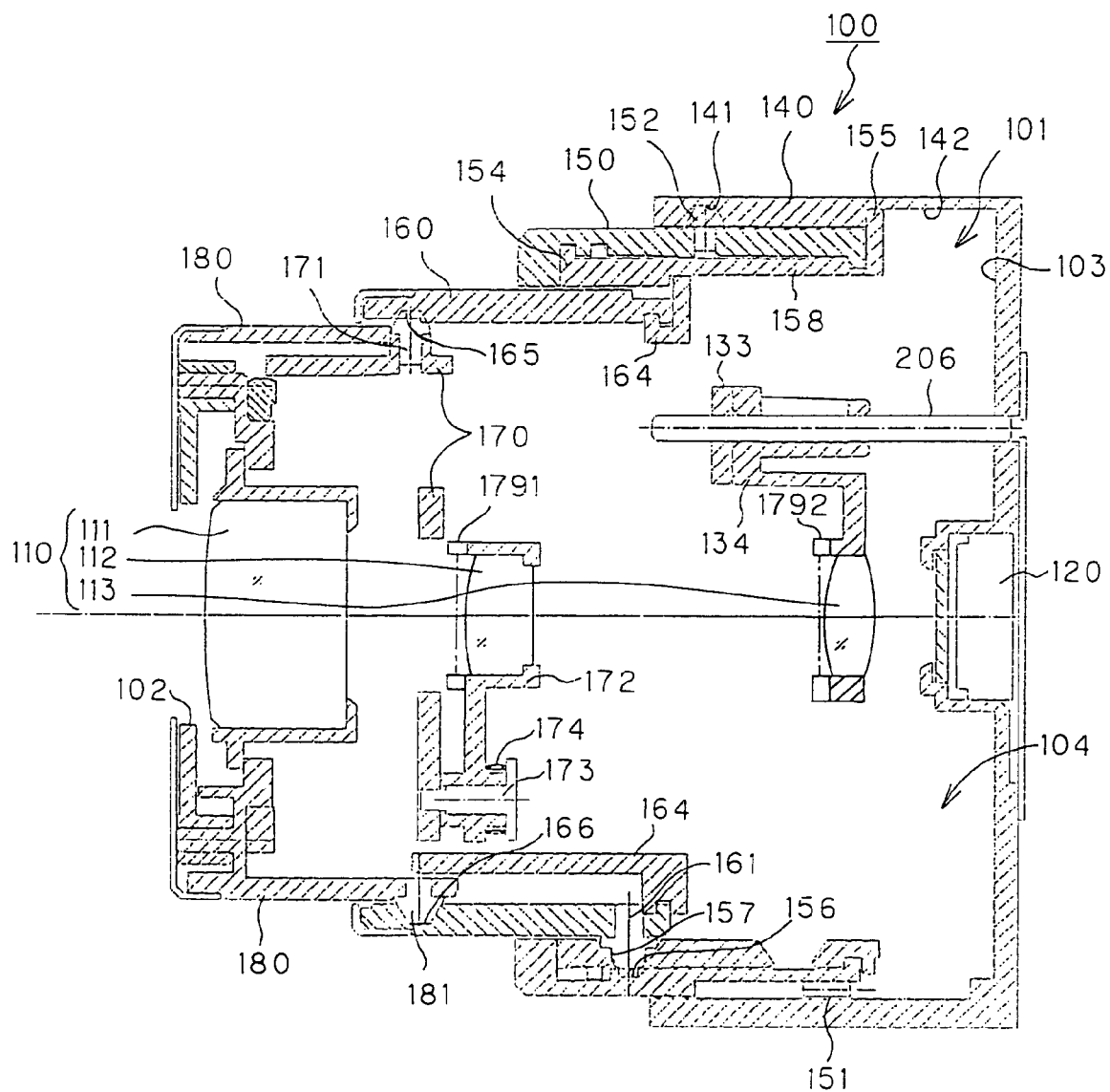
FIG. 38 is a sectional view showing a state of a tele-edge where the focal length is longest, of a digital camera of the sixth embodiment.
Figure 39:
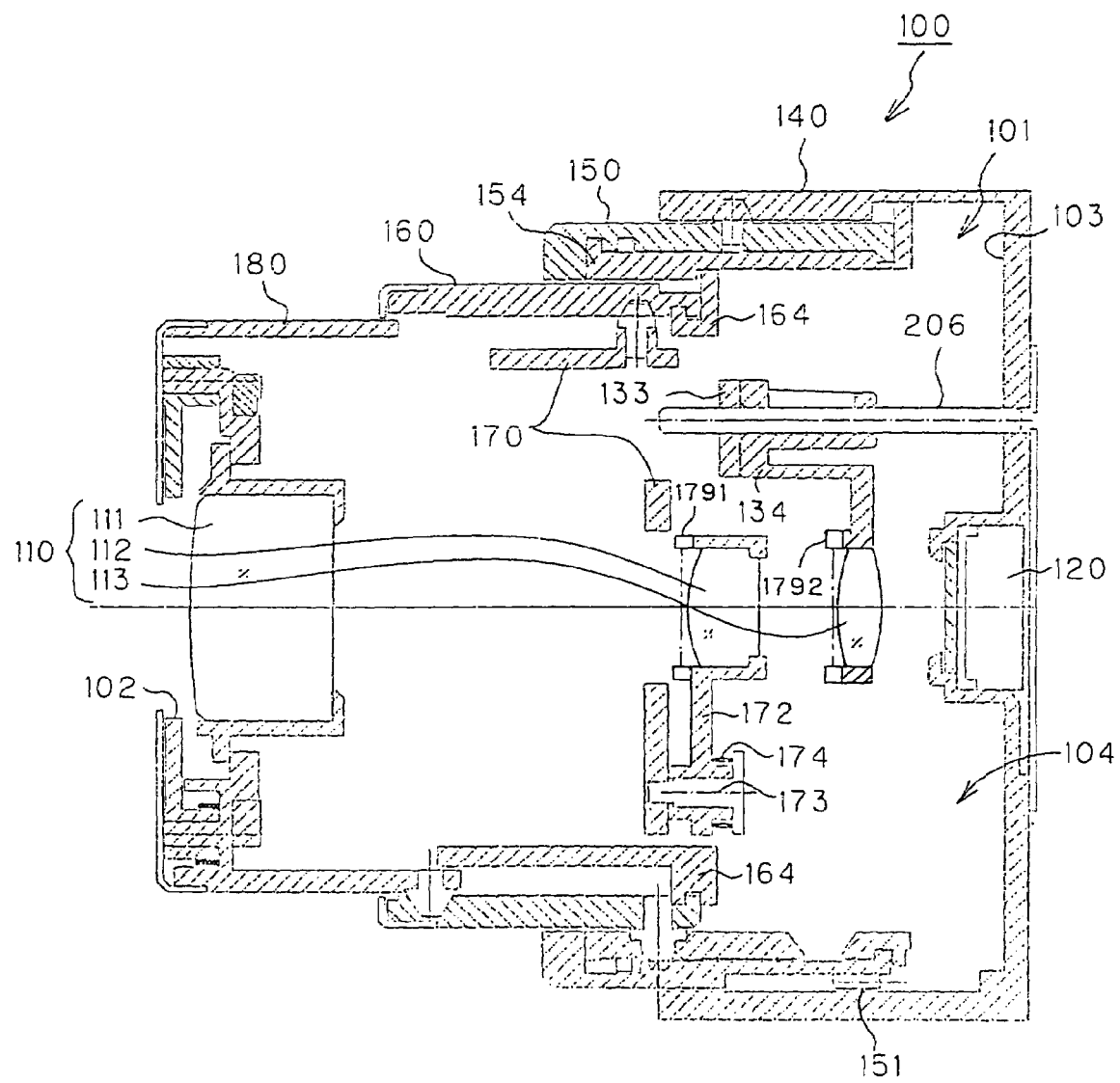
FIG. 39 is a sectional view showing a state of a wide-edge where the focal length is shortest, of the digital camera of the sixth embodiment.
Figure 40:
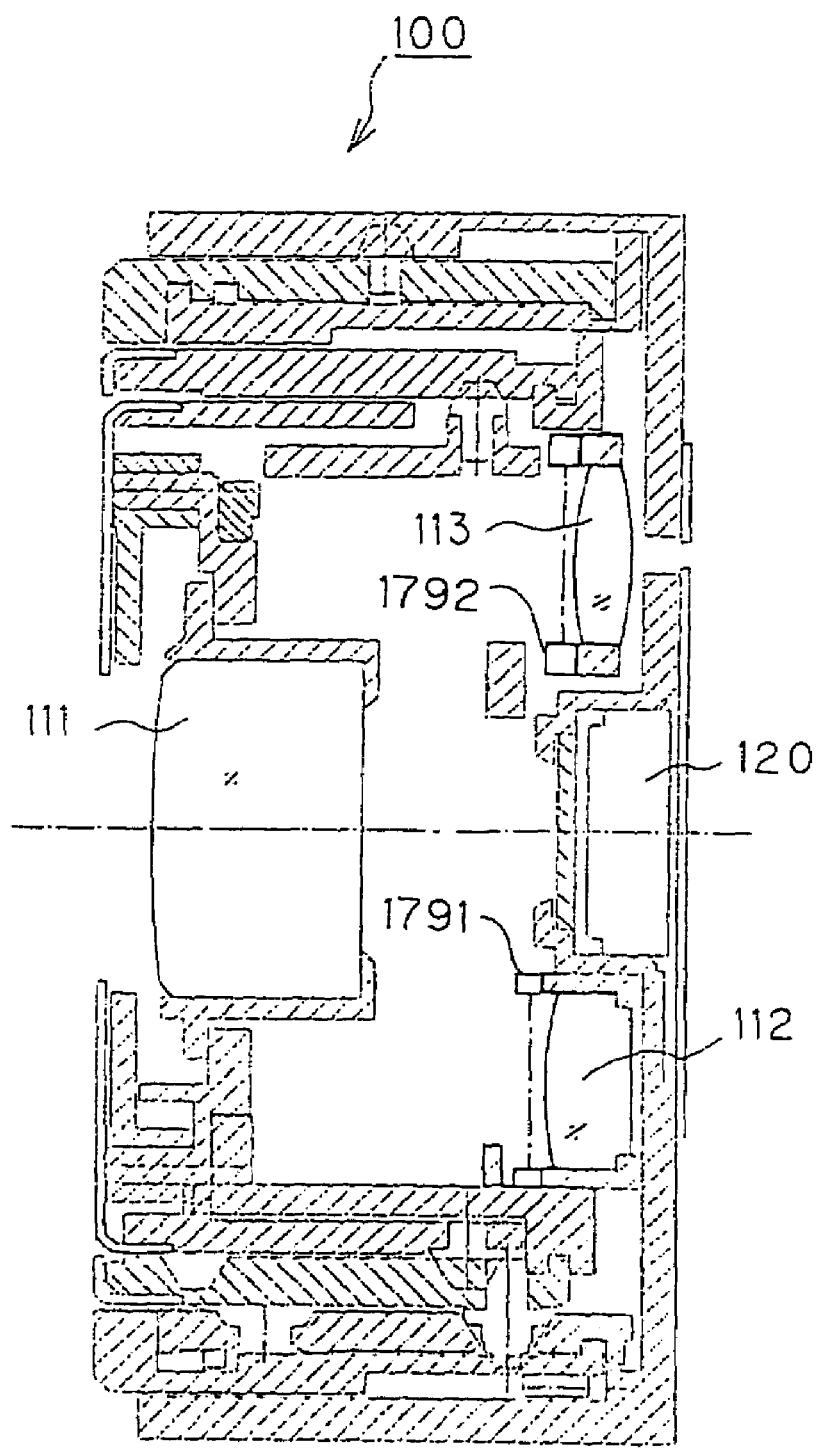
FIG. 40 is a sectional view showing a collapsed state of the digital camera of the sixth embodiment, taken along an optical axis.

FIG. 38 is a sectional view showing a state of a tele-edge where the focal length is longest, of a digital camera of the sixth embodiment. FIG. 39 is a sectional view showing a state of a wide-edge where the focal length is shortest, of the digital camera of the sixth embodiment. FIG. 40 is a sectional view showing a collapsed state of the digital camera of the sixth embodiment, taken along an optical axis.

FIG. 38, FIG. 39 and FIG. 40 correspond to FIG. 7, FIG. 9 and FIG. 14, respectively, which relate to the first embodiment. A different point from the first embodiment is as follows. According to the first embodiment, the shutter unit 179, which incorporates thereinto both the aperture and the shutter, is fixed on the rear elements guide frame 170. On the other hand, according to the sixth embodiment, instead of the shutter unit 179, which incorporates thereinto both the aperture and the shutter, there is provided an aperture unit 1791 incorporating an aperture for controlling a light quantity passing through the image taking lens by a control of an aperture caliber, and a shutter unit 1792 incorporating a shutter for controlling a light quantity passing through the image taking lens by a control of the shutter speed, excluding the aperture, and the aperture unit 1791 and the shutter unit 1792 are fixed on the rear elements holding frame 172 and the focus lens holding frame 134, respectively. The aperture unit 1791 and the shutter unit 1792 are disposed in front of the rear elements lens 112 with respect to the optical axis direction and in front of the focus lens 113 with respect to the optical axis direction. Both the aperture unit 1791 and the shutter unit 1792 are concerned with a system in which a light quantity is controlled using an electrooptical element such as a liquid crystal and a PLZT (a polarizing plate).

The aperture unit 1791 and the shutter unit 1792 are fixed on the rear elements holding frame 172 for holding the rear elements lens 112 and the focus lens holding frame 134 for holding the focus lens 113, respectively. And thus at the time of the collapse, as shown in FIG. 40, the aperture unit 1791 and the shutter unit 1792 save to the rear elements saving position set up on the hollow portion 104 together with the rear elements lens 112 and the focus lens 113, and at the time of the extension, as shown in FIG. 38 and FIG. 39, the aperture unit 1791 and the shutter unit 1792 advance on the optical axis together with the rear elements lens 112 and the focus lens 113.

The mechanism for the save and advance involved in the collapse and extension is the same as that of the first embodiment, and thus redundant explanation will be omitted.

Figure 41:
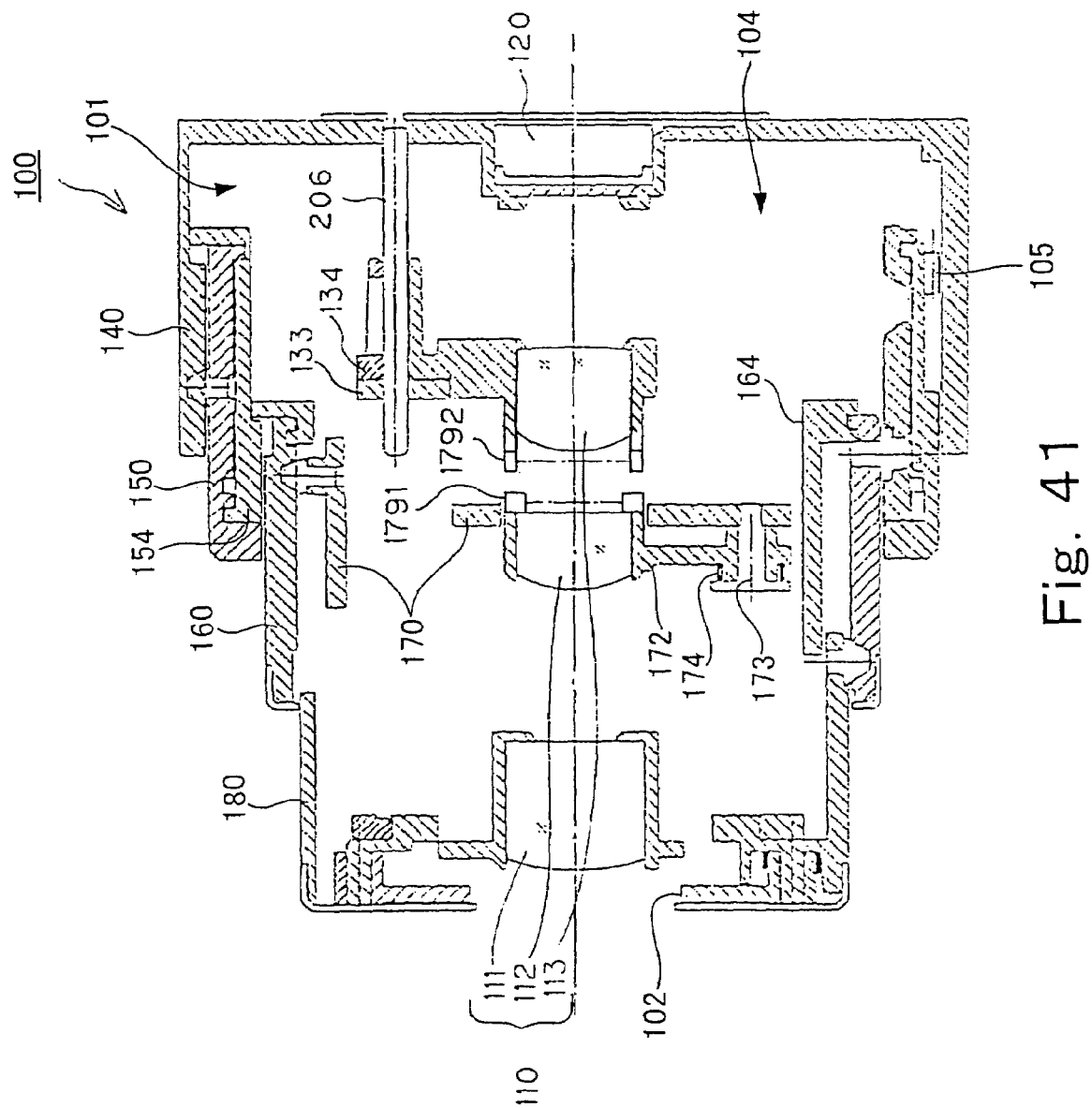
FIG. 41 is a sectional view showing a state of a tele-edge where the focal length is longest, of a digital camera of the seventh embodiment.
Figure 42:
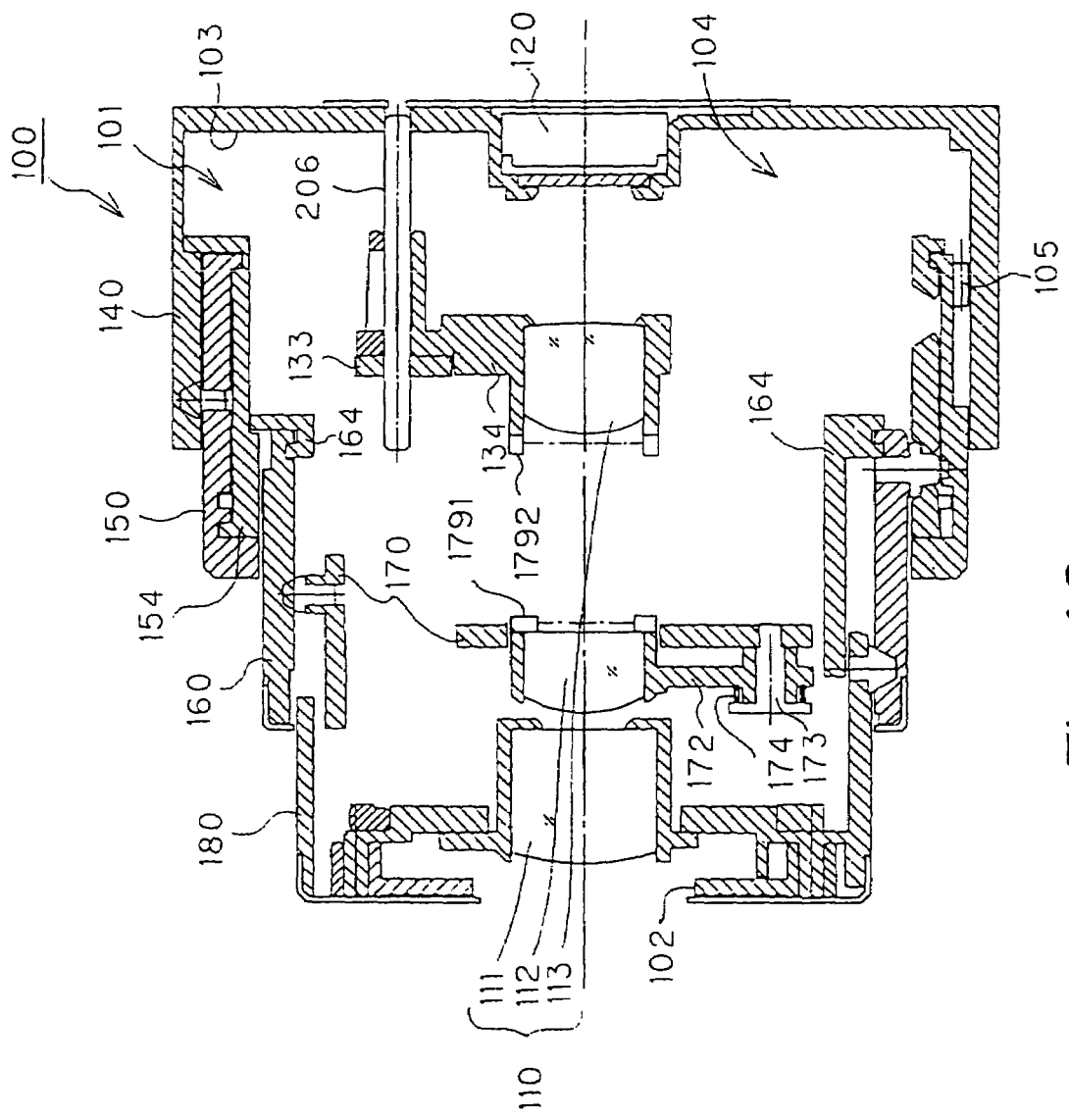
FIG. 42 is a sectional view showing a state of a wide-edge where the focal length is shortest, of the digital camera of the seventh embodiment.
Figure 43:
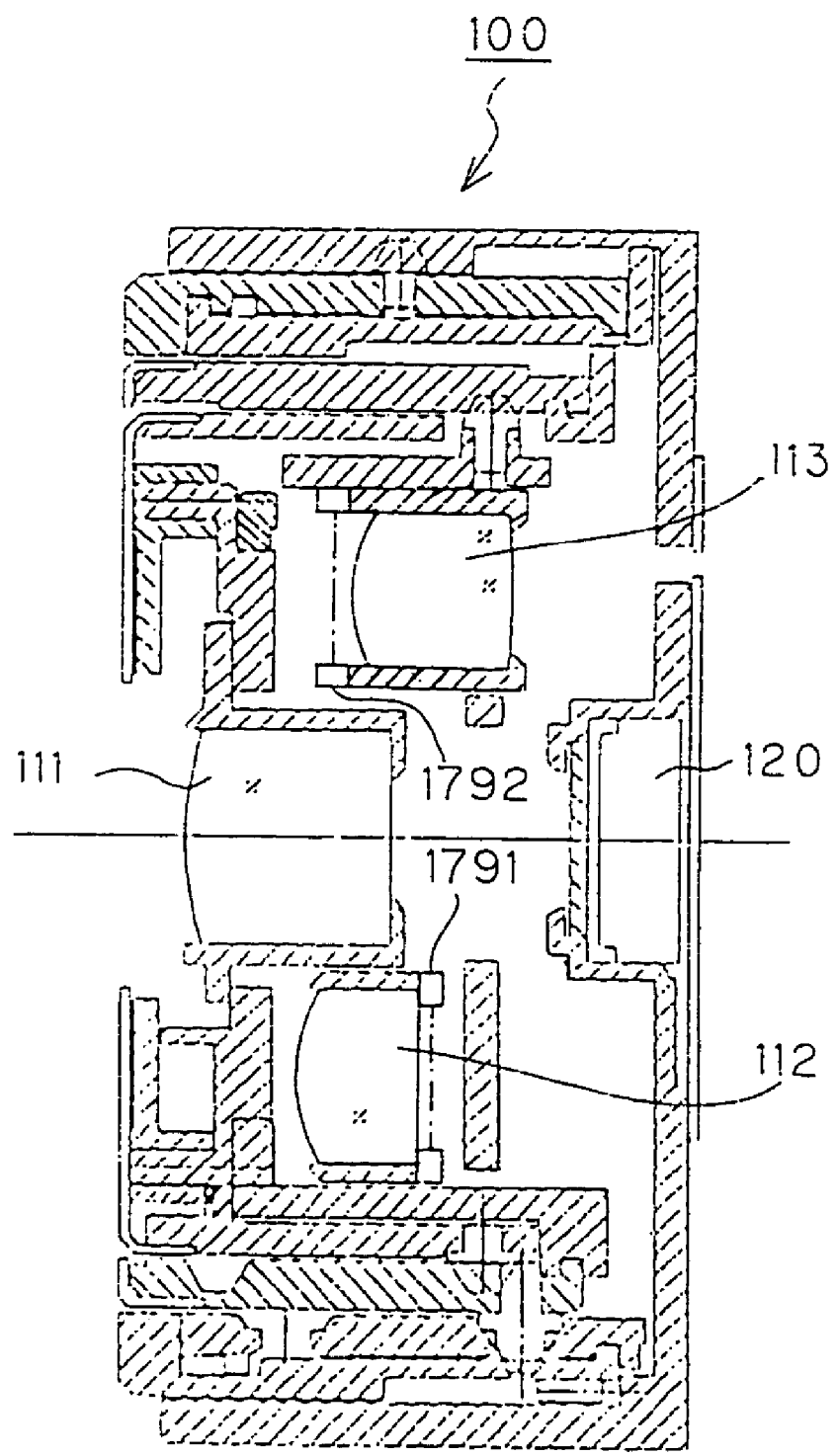
FIG. 43 is a sectional view showing a collapsed state of the digital camera of the seventh embodiment, taken along an optical axis.

FIG. 41 is a sectional view showing a state of a tele-edge where the focal length is longest, of a digital camera of the seventh fourth embodiment. FIG. 42 is a sectional view showing a state of a wide-edge where the focal length is shortest, of the digital camera of the seventh embodiment. FIG. 43 is a sectional view showing a collapsed state of the digital camera of the seventh embodiment, taken along an optical axis.

FIG. 41, FIG. 42 and FIG. 43 correspond to FIG. 22, FIG. 23 and FIG. 27, respectively, which relate to the second embodiment. A different point from the second embodiment is as follows. According to the second embodiment, in a similar fashion to that of the first embodiment, the shutter unit 179 is fixed on the rear elements guide frame 170. On the other hand, according to the seventh embodiment, in a similar fashion to that of the sixth embodiment, the aperture unit 1791 incorporating an aperture and the shutter unit 1792 are fixed on the rear elements holding frame 172 and the focus lens holding frame 134, respectively. The aperture unit 1791 is disposed backward in the optical axis direction of the rear elements lens 112. The shutter unit 1792 is disposed forward in the optical axis direction of the focus lens 113. Also in the seventh embodiment, in a similar fashion to that of the fifth embodiment, both the aperture unit 1791 and the shutter unit 1792 are concerned with a system in which a light quantity is controlled using an electrooptical element such as a liquid crystal and a PLZT (a polarizing plate).

The aperture unit 1791 incorporating an aperture and the shutter unit 1792 are fixed on the rear elements holding frame 172 for holding the rear elements lens 112, and the focus lens holding frame 134 for holding the focus lens 113, respectively. And thus at the time of the collapse, as shown in FIG. 43, the aperture unit 1791 and the shutter unit 1792 save to the rear elements saving position and the focus lens saving position set up to a position parallel to the front elements lens 111 together with the rear elements lens 112 and the focus lens 113, respectively, and at the time of the extension, as shown in FIG. 41 and FIG. 42, the aperture unit 1791 and the shutter unit 1792 advance on the optical axis together with the rear elements lens 112 and the focus lens 113.

The mechanism for the save and advance involved in the collapse and extension is the same as that of the first embodiment, and thus redundant explanation will be omitted.

According to the sixth embodiment and the seventh embodiment, the aperture unit 1791 is fixed on the rear elements holding frame 172 and the shutter unit 1792 is fixed on the focus lens holding frame 134. Oppositely, however, it is acceptable that the shutter unit 1792 is fixed on the rear elements holding frame 172 and the aperture unit 1791 is fixed on the focus lens holding frame 134.

Figure 44:
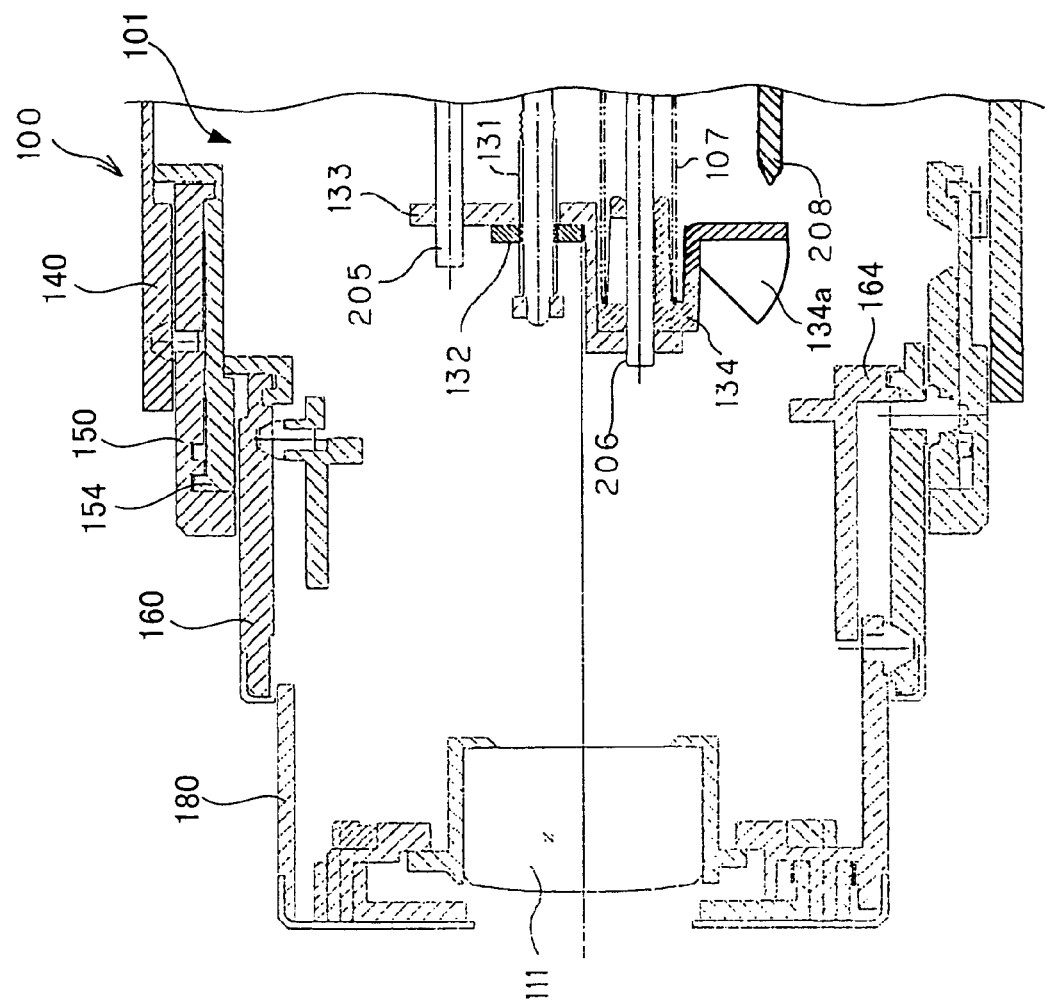
FIG. 44 is a sectional view showing main parts in a state of an extension of the digital camera of an eighth embodiment of the present invention.

FIG. 44 is a sectional view showing main parts in a state of an extension of the digital camera of an eighth embodiment of the present invention.

According to the eighth embodiment shown in FIG. 44, geometry of members, which are utilized when the focus lens is saved from the optical axis, is different from geometry of the members utilized in the first embodiment. Hereinafter, there will be explained only this point. In FIG. 20, the same parts are denoted by the same reference numbers as those of the figures related to the first embodiment.

As explained in connection with the first embodiment, the focus lens holding frame 134 for holding the focus lens 113 is pivotally supported by a rotary shaft 206 so as to be rotatably movable around the rotary shaft 206. And a coil spring enables the focus lens 113 in such a direction that the focus lens 113 is located on the optical axis of the image taking lens 110.

On the wall member 103 defining the rear of the internal space 101 of the lens barrel 100, there is formed the convex portion 208, which projects into the internal space 101, in the collapse direction travelling tracks of the engagement section 134a of the focus lens holding frame 134.

The engagement section 134a of the eighth embodiment is a guard spirally projecting out of a substantially cylinder-like shaped boss section that is a rotatably movable engagement section with the rotary shaft 206. This guard is inclined with respect to the wall member 103.

Figure 45:
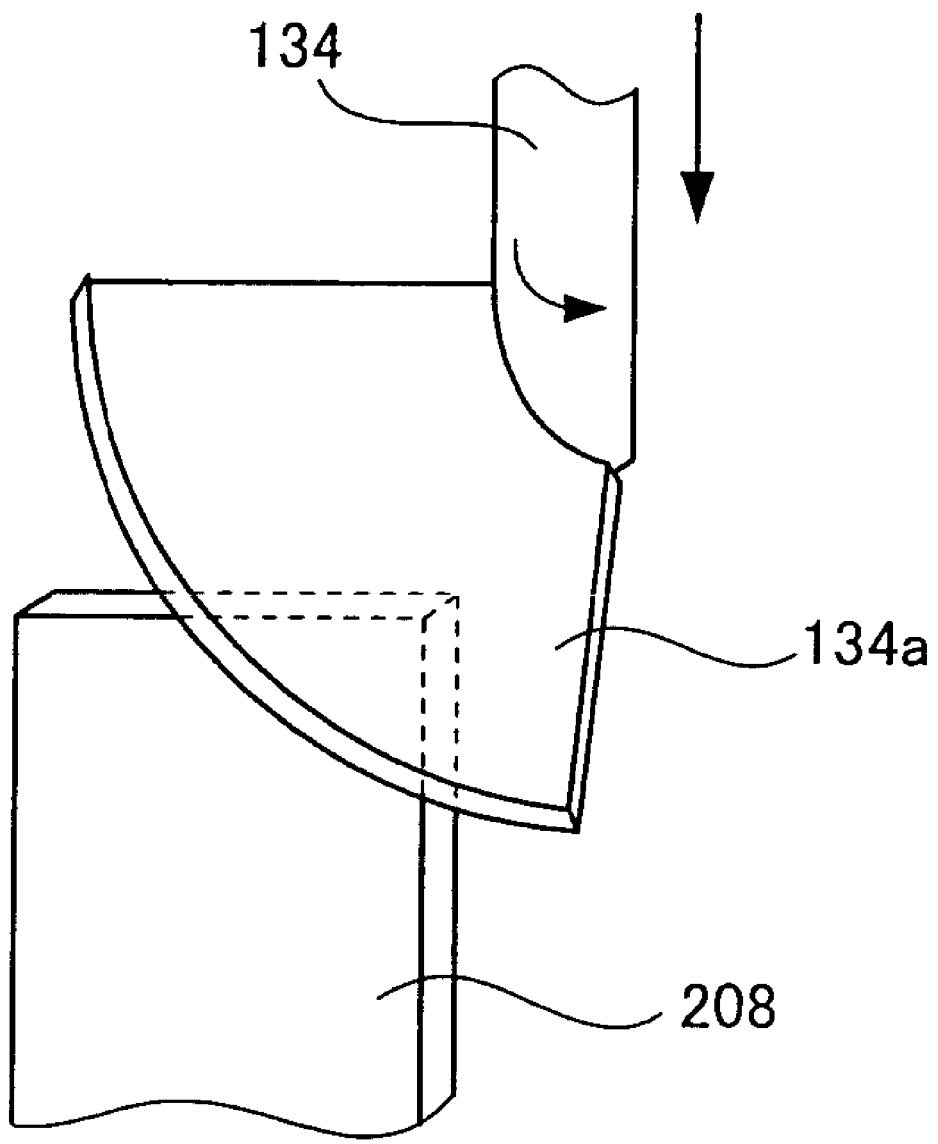
FIG. 45 is an illustration corresponding to FIG. 17 in the first embodiment.

FIG. 45 is an illustration corresponding to FIG. 17 in the first embodiment. That is, FIG. 45 is a typical illustration showing a convex portion provided on a wall member and an engagement section of a focus lens holding frame, looking from the direction different by 90 degree from the direction showing in FIG. 44.

FIG. 45 shows the convex portion 208 provided on the wall member, which is the engagement section 134a of the focus lens holding frame 134. The engagement section 134a is inclined with respect to the convex portion 208 provided on the wall member.

According to the digital camera of the eighth embodiment, when the feed screw 131 rotates so that the focus lens 113 moves in a direction approaching the CCD 120, the engagement section 134a of the focus lens holding frame 134 is in contact with the convex portion 208. Thus, the focus lens holding frame 134 rotatably moves around the rotary shaft 206, so that the focus lens 113 held in the focus lens holding frame 134 revolves getting out of the position on the optical axis of the image taking lens 110 and moves to a focus lens saving position which is set up to the hollow portion 104 beside the CCD 120. When the focus lens 113 moves from the collapsed state in the extension direction, the convex portion 208 projecting from the wall member 103 is disengaged from the focus lens holding frame 134, so that the focus lens holding frame 134 rotatably moves by the enabling force of the coil spring 107. Thus, the focus lens 113 revolves from the focus lens saving position to the position on the optical axis.

Incidentally, according to the third embodiment to the seventh embodiment, as the shutter unit 179 (or the aperture unit 1791 and the shutter unit 1792), there is used an electrooptical element such as a liquid crystal and a PLZT (a polarizing plate). However, there is no need that the shutter unit 179 (or the aperture unit 1791 and the shutter unit 1792), which is saved together with the rear elements lens (or the focus lens), is not always one using the electrooptical element, and it is acceptable to adopt a mechanical shutter for mechanically controlling an aperture caliber and a shutter speed or an iris shutter (or the aperture) unit in which a predetermined aperture of iris is saved and advanced on the optical axis.

Further, according to the present embodiments, there are provided both the aperture and the shutter. However, it is acceptable that there is provided a unit used both as the aperture and the shutter. In this respect, also in case of the shutter unit using the electrooptical element, it is acceptable that there is provided a unit used both as the aperture and the shutter, using the electrooptical element.

According to the first embodiment, the second embodiment and the eighth embodiment, the shutter unit 179 remains on the optical axis without saving at the time of the collapse. While the explanation of the first embodiment, the second embodiment and the eighth embodiment is silent on the structure of the shutter unit 179, also in case of the shutter unit remaining on the optical axis at the time of the collapse, it is acceptable to adopt the shutter unit using the electrooptical element, a mechanical shutter or an iris shutter unit.

While the respective embodiments as mentioned above are explained taking into consideration a digital camera for a still picture photography of the digital cameras, the present invention is applicable to a digital camera for a dynamic picture photography or a digital camera for both the still picture photography and the dynamic picture photography. Further, according to the embodiments as mentioned above, as the image taking lens, by way of example, there is raised such a type of image taking lens, which is variable in a focal length, comprising three groups of a front elements lens, a rear elements lens, and a focus lens in the named order with respect to the optical axis direction, wherein the focusing is performed by a movement of the focus lens located at the back with respect to the optical axis. However, the present invention is not restricted to these embodiments. And the present invention is widely applicable to a digital camera having such a type of image taking lens, wherein the focusing is performed by a movement of the focus lens not located at the back with respect to the optical axis. Furthermore, according to the embodiments as mentioned above, there is raised such an example that the guide frame and the holding frame are used for advancing and saving of the image taking lens on the optical axis, and there is provided an object shaped as a plate to rotate around the periphery of the convex portion 208 having the taper on the top by means of running the member to the convex portion 208 or pushing to the convex portion 208, and there is provided the driving source for rotatably moving the holding frame. However, the present invention is not restricted to this arrangement. Any one is acceptable, as the digital camera of the present invention, which uses the guide frame and the holding frame to advance and save the image taking lens on the optical axis. Furthermore, any one other than the use of the guide frame and the holding frame is acceptable, as the digital camera of the present invention, which is capable of advancing and saving the image taking lens between the image taking lens optical axis and the saving position.

As mentioned above, according to the present invention, of the image taking lenses, the rear elements lens and the focus lens are saved to a suitable position at the time of collapse, and thus it is possible to contribute to implementing further thinness of the lens structure as compared with the conventional ones.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A digital camera that creates an image signal through catching a subject light, the digital camera comprising:

an image taking lens, which is variable in a focal length, comprising three lens groups of a first lens group, a second lens group, and a third lens group in the named order with respect to an optical axis direction;

a lens barrel that incorporates therein the image taking lens, having in front an aperture through which the image taking lens appears and having in rear an internal space defined by a wall, the lens barrel being free in extension and collapse and performing a focal length control; and a solid state imaging device that receives the subject light formed by the image taking lens to create the image signal, the solid state imaging device being supported by the wall, wherein the lens barrel has:

a second lens group advancing and saving mechanism in which at the time of the collapse of the lens barrel, the second lens group is saved to a second lens group saving position out of an optical axis of the image taking lens, and at the time of the extension of the lens barrel, the second lens group is advanced onto the optical axis of the image taking lens; and a third lens group advancing and saving mechanism in which at the time of the collapse of the lens barrel, the third lens group is saved to a third lens group saving position out of the optical axis of the image taking lens, and at the time of the extension of the lens barrel, the third lens is advanced onto the optical axis of the image taking lens, and the third lens group is rotated about a shaft fixed to the wall of the lens barrel, wherein the lens barrel has:

a second lens group guide frame that moves in the optical axis direction in accordance with the extension, the collapse and the focal length control so as to determine a position related to the optical axis direction of the second lens group; and a second lens group holding frame that holds the second lens group and is pivotally supported by the second lens group guide frame, the second lens group holding frame causing the second lens group to revolve on the optical axis of the image taking lens at the time of the extension, and the second lens group holding frame causing the second lens group to revolve on the second lens group saving position at the time of the collapse, and wherein the lens barrel has:

a third lens group guide frame that moves in the optical axis direction in accordance with the extension, the collapse and the focusing so as to determine a position related to the optical axis direction of the third lens group; and a third lens group holding frame that holds the third lens group and is pivotally supported by the third lens group guide frame, the third lens group holding frame causing the third lens group to revolve on the optical axis of the image taking lens at the time of the extension, and the third lens group holding frame causing the third lens group to revolve onto the third lens group saving position at the time of the collapse.

2. A digital camera according to claim 1, wherein the second lens group holding frame is enabled in a direction that the second lens group is revolved on the optical axis of the image taking lens, the wall has a revolving affecting section having a geometry projecting into the internal space, the revolving affecting section being in contact with the second lens group holding frame at the time of the collapse to affect revolving of the second lens group holding frame, and the second lens group holding frame has an affect receiving section that is pushed by the revolving affecting section at the time of the collapse so that the second lens group revolves into the second lens group saving position.

3. A digital camera according to claim 2, wherein the second lens group holding frame causes the second lens group to advance onto the optical axis of the image taking lens by affect of the enabling, at the time of the extension, in such a manner that the affect receiving section is separated from the revolving affecting section.

4. A digital camera according to claim 2, wherein the revolving affecting section has a taper on the top, and
the affect receiving section causes the second lens group to be saved from the optical axis of the image taking lens to the second lens group saving position through revolving by means of pushing by the taper of the revolving affecting section, at the time of the collapse.

5. A digital camera according to claim 1, wherein the third lens group holding frame is enabled in a direction that the third lens group is revolved on the optical axis of the image taking lens,
the wall has a revolving affecting section having a geometry projecting into the internal space, the revolving affecting section being in contact with the third lens group holding frame at the time of the collapse to affect revolving of the third lens group holding frame, and
the third lens group holding frame has an affect receiving section that is pushed by the revolving affecting section at the time of the collapse so that the third lens group revolves into the third lens group saving position.

6. A digital camera according to claim 5, wherein the third lens group holding frame causes the third lens group to advance onto the optical axis of the image taking lens by affect of the enabling, at the time of the extension, in such a manner that the affect receiving section is separated from the revolving affecting section.

7. A digital camera according to claim 5, wherein the affect receiving section is an object shaped as a plate moving to the wall side while rotating around the periphery of the revolving affecting section through pushing by the revolving affecting section, at the time of the collapse, the object shaped as a plate being inclined with respect to the optical axis.

8. A digital camera according to claim 5, wherein the revolving affecting section has a taper on the top, and
the affect receiving section causes the third lens group to be saved from the optical axis of the image taking lens to the third lens group saving position through revolving by means of pushing by the taper of the revolving affecting section, at the time of the collapse.

9. A digital camera according to claim 1, wherein the solid state imaging device being disposed at a position projecting from the wall to the internal space and being supported by the wall, and
the second lens group holding frame and the third lens group holding frame cause the second lens group and the third lens group to revolve onto the second lens group saving position set up to a hollow portion divided by the solid state imaging device and the wall beside the solid state imaging device and the third lens group saving position, respectively, at the time of the collapse.

10. A digital camera according to claim 1, wherein the second lens group holding frame and the third lens group holding frame have their centers of rotatable movement with respect to the second lens group guide frame and the third lens group guide frame at mutually opposite positions with respect to the optical axis.

11. A digital camera that creates an image signal through catching a subject light, the digital camera comprising:
an image taking lens, which is variable in a focal length, comprising three lens groups of a front elements lens, a rear elements lens, and a focus lens in the named order with respect to an optical axis direction, wherein a focusing is performed by a movement of the focus lens;
a lens barrel that incorporates therein the image taking lens, having in front an aperture through which the image taking lens appears and having in rear an internal space defined by a wall, the lens barrel being free in extension and collapse and performing a focal length control: and
a solid state imaging device that receives the subject light formed by the image taking lens to create the image signal, the solid state imaging device being supported by the wall,
wherein the lens barrel has:
a rear elements lens advancing and saving mechanism in which at the time of the collapse of the lens barrel, the rear elements lens is saved to a rear elements lens saving position out of an optical axis of the image taking lens, and at the time of the extension of the lens barrel, the rear elements lens is advanced onto the optical axis of the image taking lens; and
a focus lens advancing and saving mechanism in which at the time of the collapse of the lens barrel, the focus lens is saved to a focus lens saving position out of the optical axis of the image taking lens, and at the time of the extension of the lens barrel, the focus lens is advanced onto the optical axis of the image taking lens, and
the focus lens is rotated about a shaft fixed to the wall of the lens barrel,
wherein the lens barrel has:
a rear elements guide frame that moves in the optical axis direction in accordance with the extension, the collapse and the focal length control so as to determine a position related to the optical axis direction of the rear elements lens; and a rear elements holding frame that holds the rear elements lens and is pivotally supported by the rear elements guide frame, the rear elements holding frame causing the rear elements lens to revolve on the optical axis of the image taking lens at the time of the extension, and the rear elements holding frame causing the rear elements lens to revolve on the rear elements lens saving position at the time of the collapse, and
wherein the lens barrel has:
a focus lens guide frame that moves in the optical axis direction in accordance with the extension, the collapse and the focusing so as to determine a position related to the optical axis direction of the focus lens; and a focus lens holding frame that holds the focus lens and is pivotally supported by the focus lens guide frame, the focus lens holding frame causing the focus lens to revolve on the optical axis of the image taking lens at the time of the extension, and the focus lens holding frame causing the focus lens to revolve onto the focus lens saving position at the time of the collapse.

12. A digital camera according to claim 11, wherein the solid state imaging device being disposed at a position projecting from the wall to the internal space and being supported by the wall, and
the rear elements holding frame and the focus lens holding frame cause the rear elements lens and the focus lens to revolve onto the rear elements lens saving position set up to a hollow portion divided by the solid state imaging device and the wall beside the solid state imaging device and the focus lens saving position, respectively, at the time of the collapse.

13. A digital camera according to claim 11, wherein the rear elements holding frame and the focus lens holding frame have their centers of rotatable movement with respect to the rear elements guide frame and the focus lens guide frame at mutually opposite positions with respect to the optical axis.

* * * * *